United States Patent
Calendrille, Jr.

(10) Patent No.: US 7,918,145 B1
(45) Date of Patent: Apr. 5, 2011

(54) COMBINATION SHIFT AND BRAKE LEVER ARRANGEMENT FOR A BICYCLE

(76) Inventor: John L. Calendrille, Jr., Coram, NY (US)

( * ) Notice: Subject to any disclaimer, the term of this patent is extended or adjusted under 35 U.S.C. 154(b) by 982 days.

(21) Appl. No.: 11/434,324

(22) Filed: May 15, 2006

Related U.S. Application Data

(60) Provisional application No. 60/681,980, filed on May 18, 2005.

(51) Int. Cl.
- F16C 1/00 (2006.01)
- F16C 1/16 (2006.01)
- G05G 11/00 (2006.01)
- G05G 13/00 (2006.01)

(52) U.S. Cl. .......... 74/502.2; 74/488; 74/489; 74/501.6

(58) Field of Classification Search ............ 74/488, 74/489, 502.2, 501.6, 473.3, 473.13, 473.14
See application file for complete search history.

(56) References Cited

U.S. PATENT DOCUMENTS

| | | |
|---|---|---|
| 4,100,820 A | 7/1978 | Evett |
| 4,132,296 A | 1/1979 | Evett |
| 4,319,673 A | 3/1982 | Kojima |
| 4,532,825 A | 8/1985 | Nagano |
| 5,241,878 A | 9/1993 | Nagano |
| 5,257,683 A | 11/1993 | Romano |
| 5,400,675 A | 3/1995 | Nagano |
| 5,479,776 A | 1/1996 | Romano |
| 5,921,138 A * | 7/1999 | Kojima et al. ............ 74/473.13 |
| 6,095,309 A * | 8/2000 | Mione ............................ 74/489 |
| 6,553,860 B2 | 4/2003 | Blaschke |
| 6,647,823 B2 | 11/2003 | Tsumiyama et al. |
| 6,691,591 B2 * | 2/2004 | Tsumiyama et al. ........ 74/502.2 |
| 6,848,335 B1 * | 2/2005 | Kawakami .................. 74/502.2 |
| 2004/0144193 A1 * | 7/2004 | Sato et al. .................... 74/502.2 |

* cited by examiner

Primary Examiner — Richard W Ridley
Assistant Examiner — Daniel Yabut
(74) Attorney, Agent, or Firm — Richard M. Goldberg

(57) ABSTRACT

A combination shift and brake lever arrangement for a bicycle, includes a single lever. A braking arrangement mounts the single lever for movement in a first pivoting direction to perform a braking operation, and a first shifting arrangement mounts the single lever for movement in a second different pivoting direction. A shift control mechanism controls shifting of gears of the bicycle in a first shifting direction upon movement of the single lever in the second pivoting direction. A second shifting arrangement mounts at least a portion of a reverse shifting lever for linear movement in a first linear direction. A reverse control changes over the shift control mechanism to control shifting of the gears of the bicycle in a second opposite shifting direction upon linear movement of the at least a portion of the reverse shifting lever in the first linear direction.

7 Claims, 65 Drawing Sheets

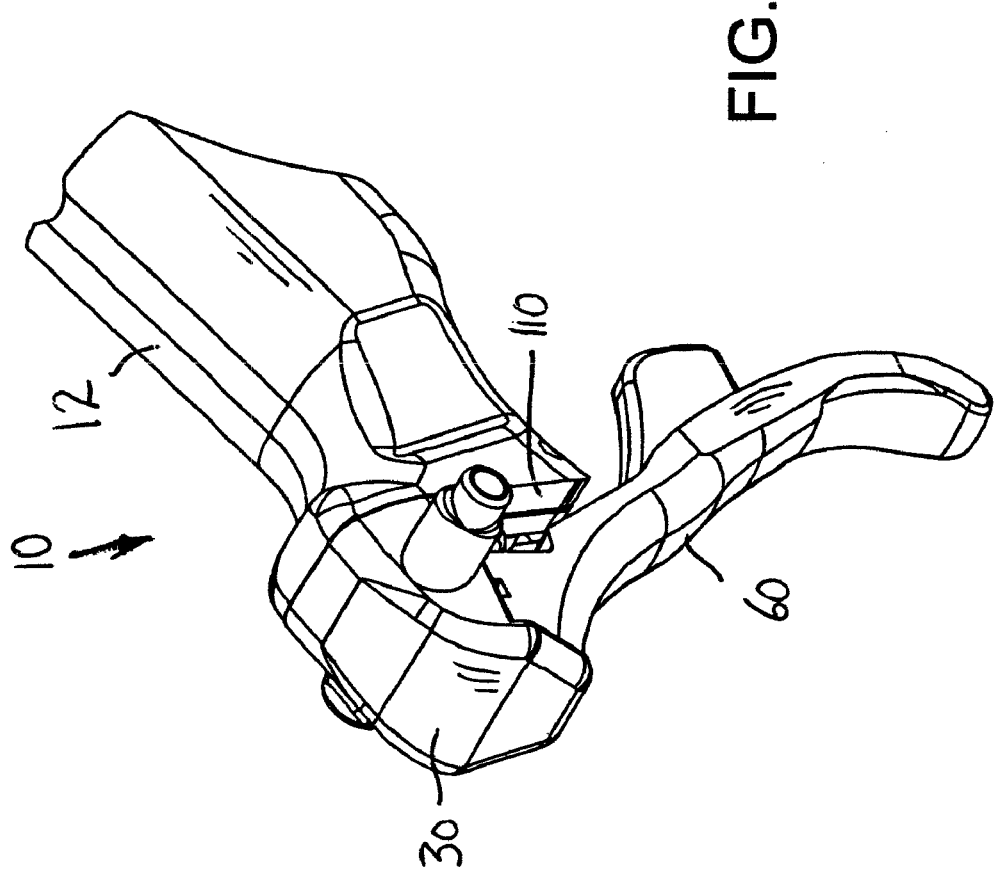

FIG. 47
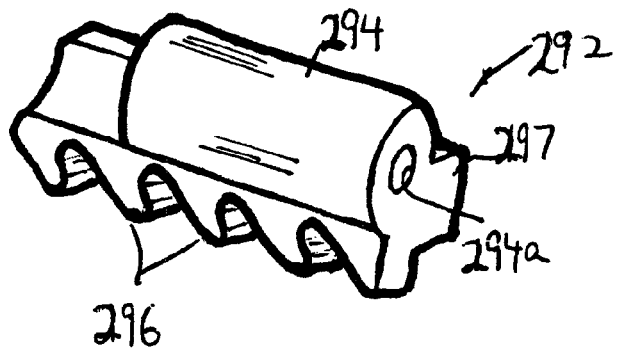

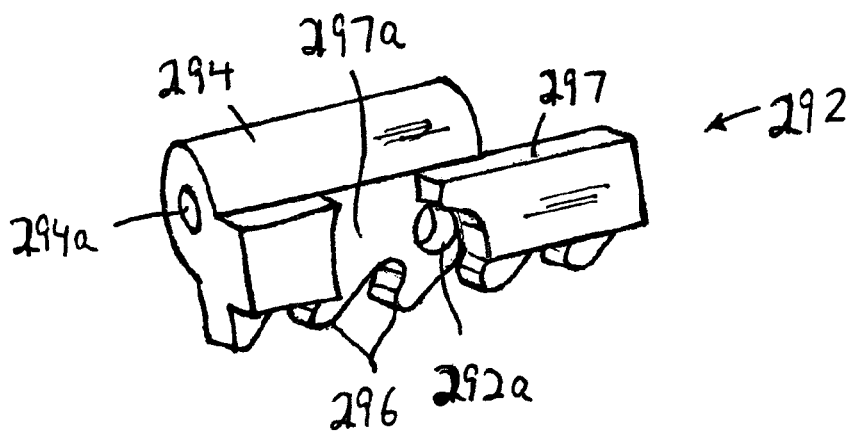
FIG. 48

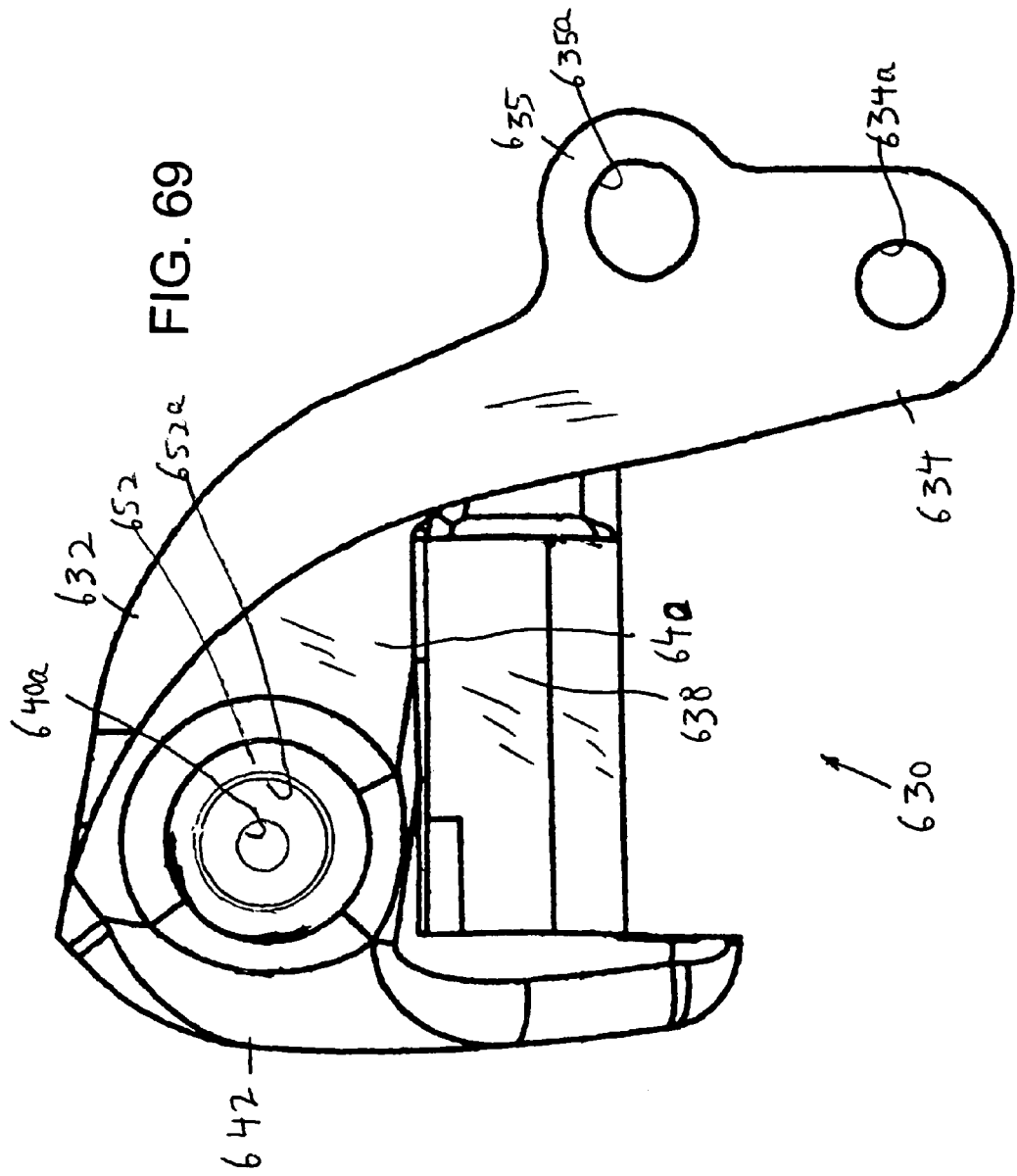

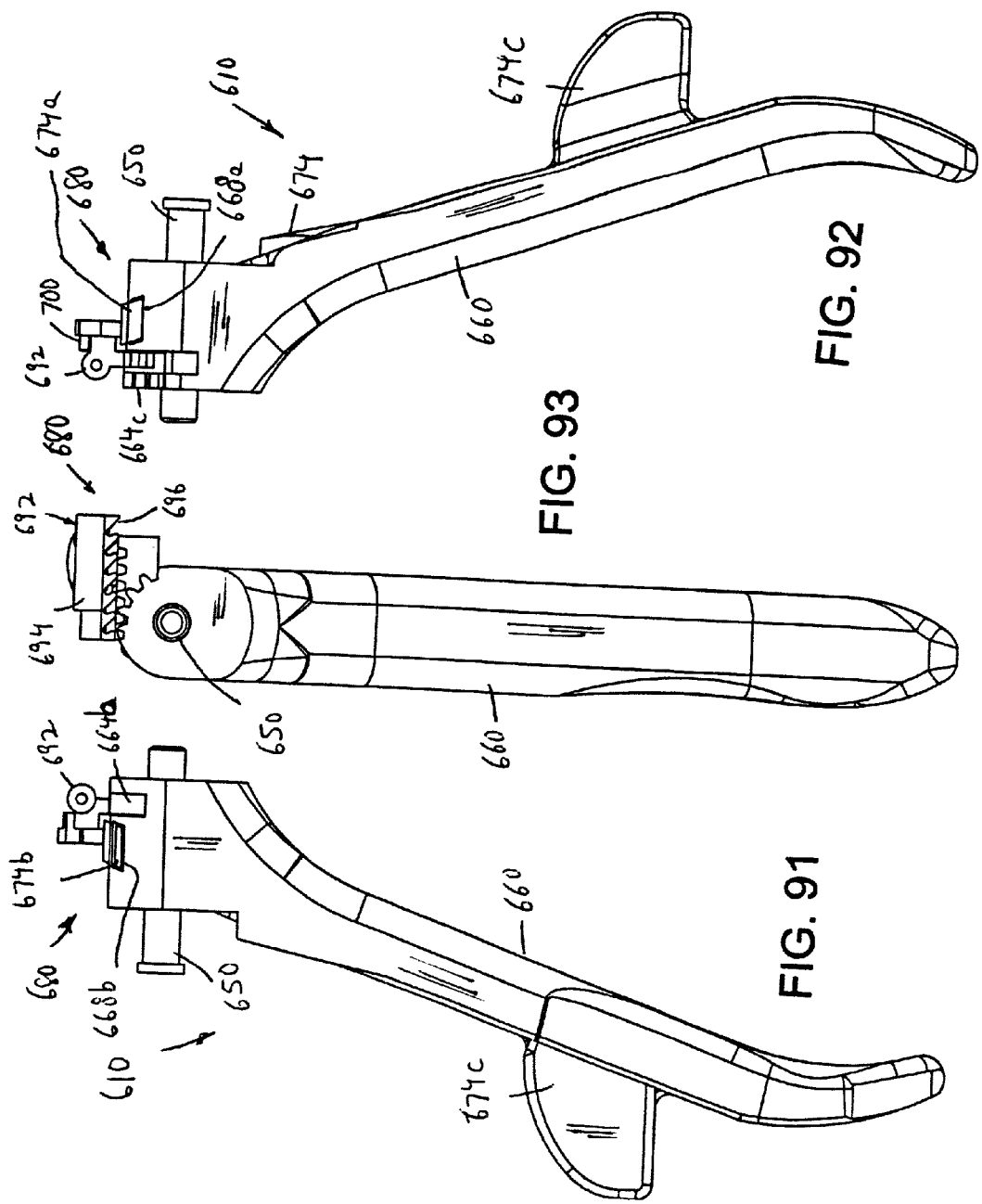

COMBINATION SHIFT AND BRAKE LEVER ARRANGEMENT FOR A BICYCLE

REFERENCE TO RELATED APPLICATION

The present application claims priority from U.S. Provisional Application No. 60/681,980, filed May 18, 2005.

BACKGROUND OF THE INVENTION

The present invention relates generally to bicycle shifters and brake levers, and more particularly, is directed to a combination shift and brake lever arrangement for a bicycle using a single lever movable along two axes for braking and shifting.

Conventionally, shifters for bicycles have been mounted on the handlebar, separate and apart from the brake levers.

For example, Campagnolo S.r.l of Vicenza, Italy manufactures and sells a bicycle brake mechanism and a bicycle shift mechanism in which there are three levers, a brake lever, a separate shift lever that shifts sideways for changing gears in a first direction, and a third thumb lever for changing gears in a second opposite direction. This, however, in manufacture and use, becomes complicated and burdensome to use.

Serenissima World Cycle Diffusion srl of San Vendemiano, Italy manufactures and sells a bicycle brake mechanism and a bicycle shift mechanism under the trademark "MODOLO" in which there is a brake lever and two separate thumb levers for performing a shifting operation in opposite directions. This, again, in manufacture and use, becomes complicated and burdensome to use.

SRAM Corporation of Chicago, Ill. manufactures and sells a bicycle brake mechanism and a bicycle shift mechanism in which there is a first lever for braking and a second shift lever. Depending upon how far the lever is pushed will depend on the direction of shifting.

However, recently, shift levers have been combined with brake levers. For example, Shimano Inc. of Osaka, Japan manufactures and sells a bicycle brake mechanism and a bicycle shift mechanism in which a common lever is used for both braking and shifting gears in a first direction.

However, there is a second lever for shifting gears in the second opposite direction. This, again, in manufacture and use, becomes complicated and burdensome to use.

U.S. Pat. No. 6,647,823 to Tsumiyama et al and owned by Shimano Inc. discloses a single lever used for braking and for shifting and both directions. The brake lever is pivoted in a first forward to back direction for braking, a second clockwise side to side movement for shifting in a first direction and a third counterclockwise side to side movement for shifting in a second opposite direction. However, the rider must remember which direction to pivot the lever in the side to side direction for shifting.

OBJECTS AND SUMMARY OF THE INVENTION

Accordingly, it is an object of the present invention to provide a combination shift and brake lever arrangement for a bicycle that overcomes the problems with the aforementioned prior art.

It is another object of the present invention to provide a combination shift and brake lever arrangement for a bicycle that uses a single lever for braking and for shifting in both directions.

It is still another object of the present invention to provide a combination shift and brake lever arrangement for a bicycle in which the lever moves in a front to back pivoting motion for braking, a side to side pivoting motion for gear switching in one direction, and a vertically linear motion for gear switching in the opposite direction.

It is a further object of the present invention to provide a combination shift and brake lever arrangement for a bicycle that is compact, economical and easy to use.

In accordance with an aspect of the present invention, a combination shift and brake lever arrangement for a bicycle, includes a single lever. A braking arrangement mounts the single lever for movement in a first pivoting direction to perform a braking operation, and a first shifting arrangement mounts the single lever for movement in a second pivoting direction different from the first pivoting direction. A shift control mechanism controls shifting of gears of the bicycle in a first shifting direction upon movement of the single lever in the second pivoting direction. A second shifting arrangement mounts at least a portion of a reverse shifting lever for linear movement in a first linear direction. A reverse control changes over the shift control mechanism to control shifting of the gears of the bicycle in a second opposite shifting direction upon linear movement of the at least a portion of the reverse shifting lever in the first linear direction.

The first pivoting direction is a front to back direction, and the second pivoting direction is a side to side direction. The first shifting arrangement includes at least one housing and a pivot arrangement for pivotally mounting the single lever to the at least one housing for pivotal movement in the second pivoting direction.

A first housing mounts the combination shift and brake lever arrangement to a handlebar of a bicycle.

In a first group of embodiments, the first shifting arrangement includes a brake housing pivotally mounted to the first housing for pivotal movement in the first pivoting direction, and a carrier housing mounts to the brake housing in a linearly displaceable manner and houses the shift control mechanism, with the first lever being pivotally mounted to the carrier housing for pivotal movement in the second pivoting direction.

In the embodiments of the first group, the at least a portion of the reverse shifting lever includes the single lever, and the second shifting arrangement includes an engagement arrangement for engagement with the reverse control to change over the shift control mechanism to control shifting of the gears of the bicycle in the second shifting direction upon linearly displaceable movement of the single lever and the carrier housing relative to the brake housing. The reverse control includes an extension on the brake housing which engages with the shift control mechanism to control shifting of the gears of the bicycle in a second opposite shifting direction upon linear displacement of the single lever and the carrier housing relative to the brake housing.

In such embodiments, the shift control mechanism includes a first actuator coupled with the single lever for moving in response to pivotal movement of the single lever in the second pivoting direction, a second actuator coupled with a shift cable of a bicycle for changing a gear of a derailleur of a bicycle, an engagement arrangement associated with the first and second actuators for shifting the second actuator in response to movement of the first actuator, and the extension of the reverse control, upon linear displacement of the single lever and the carrier housing relative to the brake housing, engages with either the second actuator or the engagement arrangement.

The single lever includes a first set of teeth, the first actuator includes an actuating rack having a second set of teeth for meshing with the first set of teeth such that pivotal movement of the single lever results in translation movement of the actuating rack, the second actuator includes a cable carrier rack having a third set of teeth, and the engagement arrangement includes a first pawl mounted to the actuator rack for engaging with the third set of teeth to move the cable carrier rack with the actuator rack upon pivotal movement of the single lever. The third set of teeth are inclined in a first direction of movement of the cable carrier rack.

In one embodiment of the first set, the cable carrier rack includes a fourth set of teeth, the engagement arrangement includes a second pawl mounted to the carrier housing for engaging with the fourth set of teeth to releasably lock the cable carrier rack in a desired position after the cable carrier rack has been moved with the actuator rack upon pivotal movement of the single lever, and the cable carrier rack includes a fifth set of teeth which are engaged by the extension of the reverse control upon linear displacement of the single lever and the carrier housing relative to the brake housing.

In a second embodiment of the first set, the shift control mechanism includes a grate having a plurality of openings therein mounted in the carrier housing, and the engagement arrangement includes a second pawl mounted to the cable carrier rack for engagement with the openings in the grate to releasably lock the cable carrier rack in a desired position after the cable carrier rack has been moved with the actuator rack upon pivotal movement of the single lever. The reverse control includes an arrangement for disengaging the second pawl from the openings in the grate and for engaging the second pawl after the cable carrier rack has been moved upon linear displacement of the single lever and the carrier housing relative to the brake housing.

Specifically, the arrangement for disengaging includes a grate release movable with the carrier housing between a first position out of engagement with the grate and a second position in engagement with the openings in the grate so as to move the second pawl from the openings in the grate after the cable carrier rack has been moved with the actuator rack upon linear displacement of the single lever and the carrier housing relative to the brake housing and for engaging the second pawl after the second pawl has been removed from the openings, and wherein at such time, the extension on the brake housing engages with the grate to prevent movement thereof.

In a second set of embodiments, the first shifting arrangement includes a carrier housing pivotally mounted to the first housing for pivotal movement in the first pivoting direction, the carrier housing the shift control mechanism, and the first lever being pivotally mounted to the carrier housing for pivotal movement in the second pivoting direction.

In one embodiment of the second set, the at least a portion of the reverse shifting lever includes the single lever, and the second shifting arrangement mounts the single lever for linear movement in the first linear direction in the carrier housing.

Specifically, the reverse control includes a first extension on the carrier housing which engages with the shift control mechanism to control shifting of the gears of the bicycle in the second opposite shifting direction upon linear displacement of the single lever in the carrier housing.

The shift control mechanism includes a first actuator coupled with the single lever for moving in response to pivotal movement of the single lever in the second pivoting direction, a second actuator coupled with a shift cable of a bicycle for changing a gear of a derailleur of a bicycle, an engagement arrangement associated with the first and second actuators for shifting the second actuator in response to movement of the first actuator, and the first extension of the reverse control, upon linear displacement of the single lever and the carrier housing relative to the brake housing, engages with the second actuator.

The single lever includes a first set of teeth, the first actuator includes an actuating rack having a second set of teeth for meshing with the first set of teeth such that pivotal movement of the single lever results in translation movement of the actuating rack, the second actuator includes a cable carrier rack having a third set of teeth, and the engagement arrangement includes a first pawl mounted to the actuator rack for engaging with the third set of teeth to move the cable carrier rack with the actuator rack upon pivotal movement of the single lever. The third set of teeth are inclined in a first direction of movement of the cable carrier rack.

The cable carrier rack includes a fourth set of teeth, the engagement arrangement includes a second pawl mounted to the carrier housing for engaging with the fourth set of teeth to releasably lock the cable carrier rack in a desired position after the cable carrier rack has been moved with the actuator rack upon pivotal movement of the single lever, and the cable carrier rack includes a fifth set of teeth which are engaged by the first extension of the reverse control upon linear displacement of the single lever relative to the carrier housing. The reverse control includes a second extension on the carrier housing for engaging with the second pawl to disengage the second pawl from the fourth set of teeth upon linear displacement of the single lever relative to the carrier housing.

The second shifting arrangement includes a knuckle slidably mounted in the carrier housing, and the first shifting arrangement includes a pivot that pivotally mounts the single lever to the knuckle.

In a second embodiment of the second set, the at least a portion of the reverse shifting lever includes an arm mounted to the single lever for linear movement in the first linear direction, the second shifting arrangement mounts the arm for linear movement in the first linear direction to the single lever.

The shift control mechanism includes a first actuator coupled with the single lever for moving in response to pivotal movement of the single lever in the second pivoting direction, a second actuator coupled with a shift cable of a bicycle for changing a gear of a derailleur of a bicycle, an engagement arrangement associated with the first and second actuators for shifting the second actuator in response to movement of the first actuator, and the arm, upon linear displacement of the arm relative to the single lever, engages with both the second actuator and the engagement arrangement.

In such case, the single lever includes a first set of teeth, the first actuator includes an actuating rack having a second set of teeth for meshing with the first set of teeth such that pivotal movement of the single lever results in translation movement of the actuating rack, the second actuator includes a cable carrier rack having a third set of teeth, and the engagement arrangement includes a first pawl mounted to the actuator rack for engaging with the third set of teeth to move the cable carrier rack with the actuator rack upon pivotal movement of the single lever. The third set of teeth are inclined in a first direction of movement of the cable carrier rack.

The cable carrier rack includes a fourth set of teeth, the engagement arrangement includes a second pawl mounted to the carrier housing for engaging with the fourth set of teeth to releasably lock the cable carrier rack in a desired position after the cable carrier rack has been moved with the actuator rack upon pivotal movement of the single lever, and upon linear displacement of the arm relative to the single lever, the arm engages the cable carrier rack to hold the cable carrier rack in place, and disengages the second pawl from the fourth set of teeth.

In one embodiment viewed in a different manner, the at least a portion of the reverse shifting lever includes the single lever, and the reverse control includes an engagement arrangement for changing over the shift control mechanism to control shifting of the gears of the bicycle in the second shifting direction upon linearly displaceable movement of the single lever. In another embodiment, the at least a portion of the reverse shifting lever includes a linearly displaceable actuating bar connected with the single lever, and the reverse control includes an engagement arrangement for changing over the shift control mechanism to control shifting of the gears of the bicycle in the second shifting direction upon linearly displaceable movement of the actuating bar. In a third embodiment, the at least a portion of the reverse shifting lever includes a second linearly displaceable lever, and the reverse control includes an engagement arrangement for changing over the shift control mechanism to control shifting of the gears of the bicycle in the second shifting direction upon linearly displaceable movement of the second lever.

The above and other objects, features and advantages of the invention will become readily apparent from the following detailed description thereof which is to be read in connection with the accompanying drawings.

BRIEF DESCRIPTION OF THE DRAWINGS

FIG. 1A is a perspective view of a combination shift and brake lever arrangement for a bicycle according to a first embodiment of the present invention;

FIG. 26 is a top plan view of the combination shift/brake lever;

FIG. 47 is a left side perspective view of the cable carrier rack of the second embodiment;

FIG. 48 is a right side perspective view of the cable carrier rack of FIG. 47;

FIG. 69 is a right side elevational view of the carrier housing of FIG. 67;

FIG. 91 is a right side elevational view of the combination shift and brake lever arrangement of FIG. 88;

FIG. 92 is a left side elevational view of the combination shift and brake lever arrangement of FIG. 88;

FIG. 93 is a front elevational view of the combination shift and brake lever arrangement of FIG. 88.

DETAILED DESCRIPTION

Figures 1B, 1C:
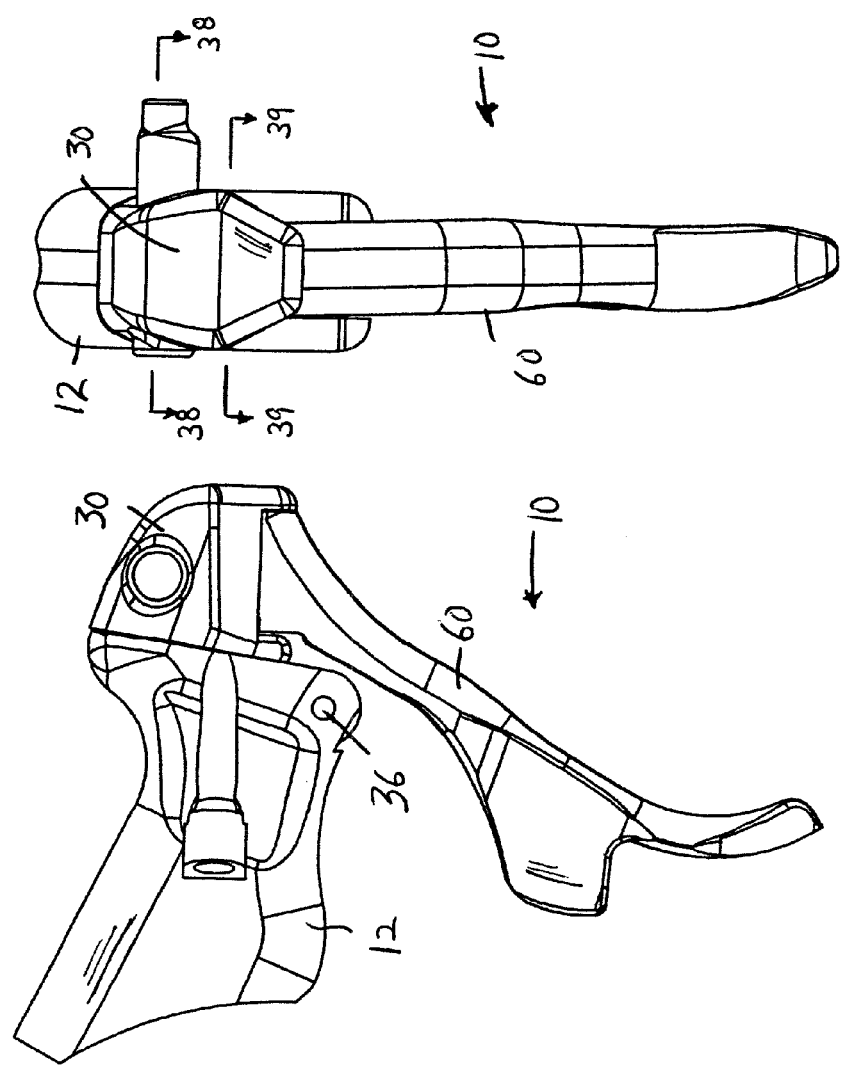
FIG. 1B is a left side elevational view of the combination shift and brake lever arrangement of FIG. 1A.
FIG. 1C is a front elevational view of the combination shift and brake lever arrangement of FIG. 1A.
Figure 2:
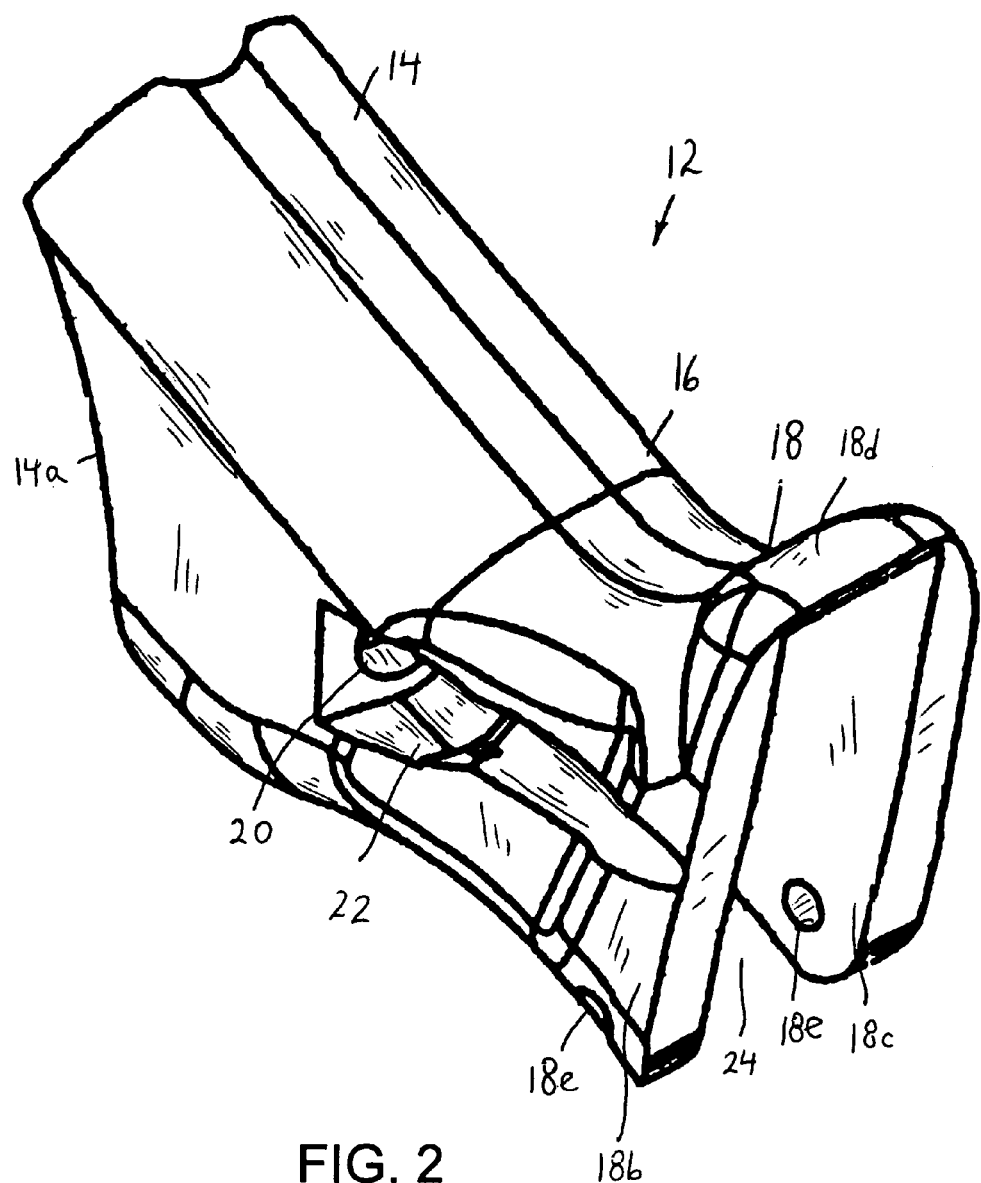
FIG. 2 is a perspective view of the main housing from the top, left side.
Figure 3:
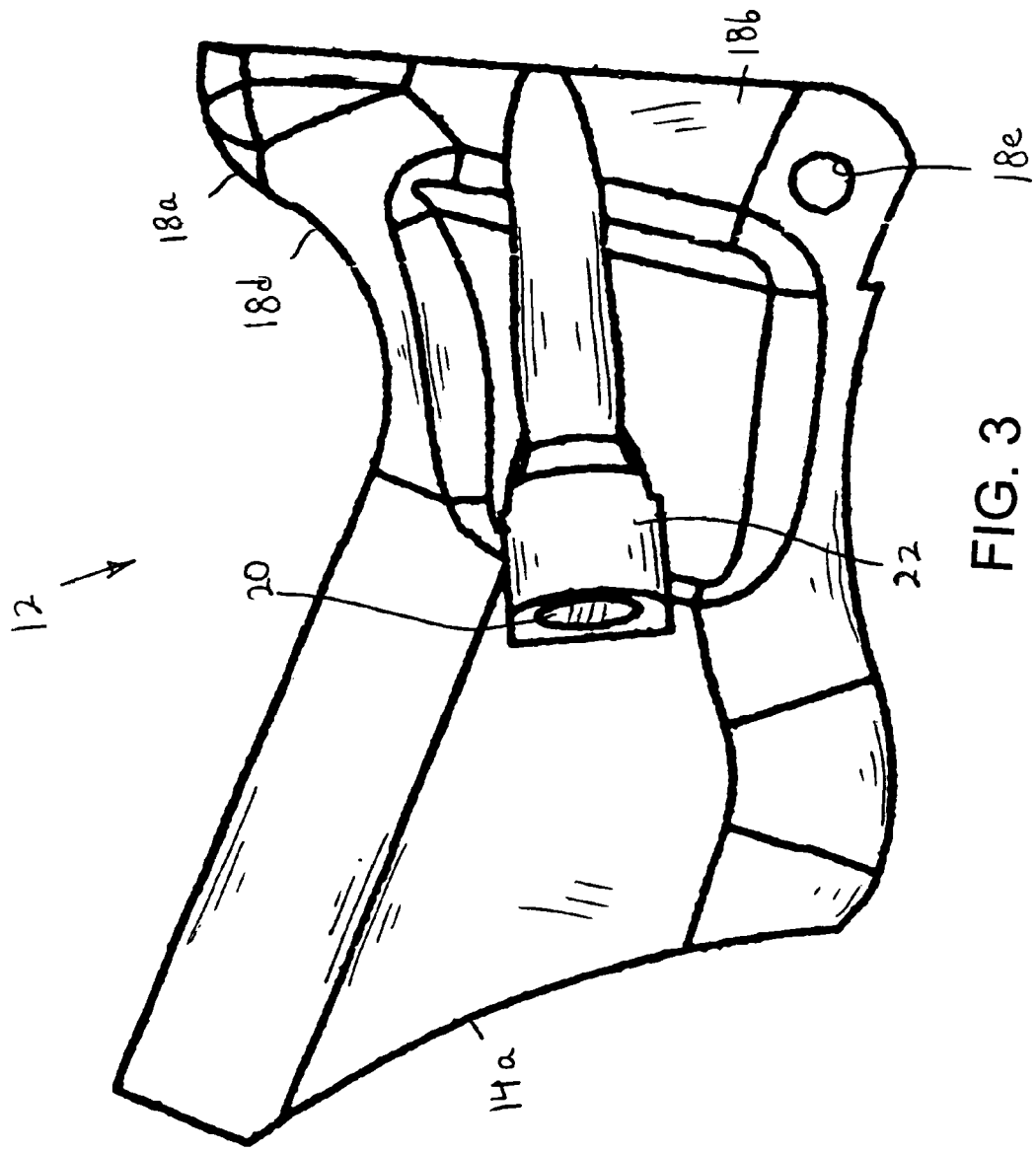
FIG. 3 is a left side elevational view of the main housing.
Figure 4:
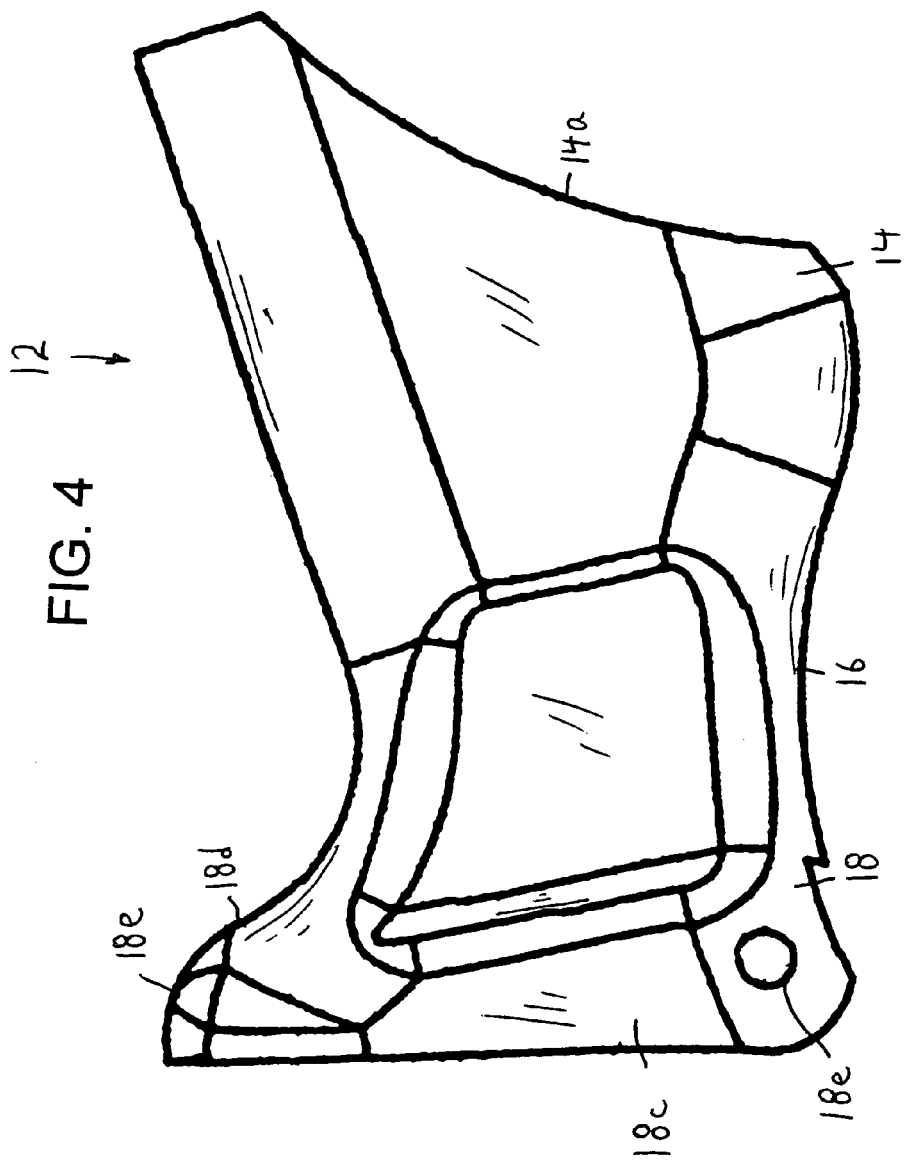
FIG. 4 is a right side elevational view of the main housing.
Figure 5:
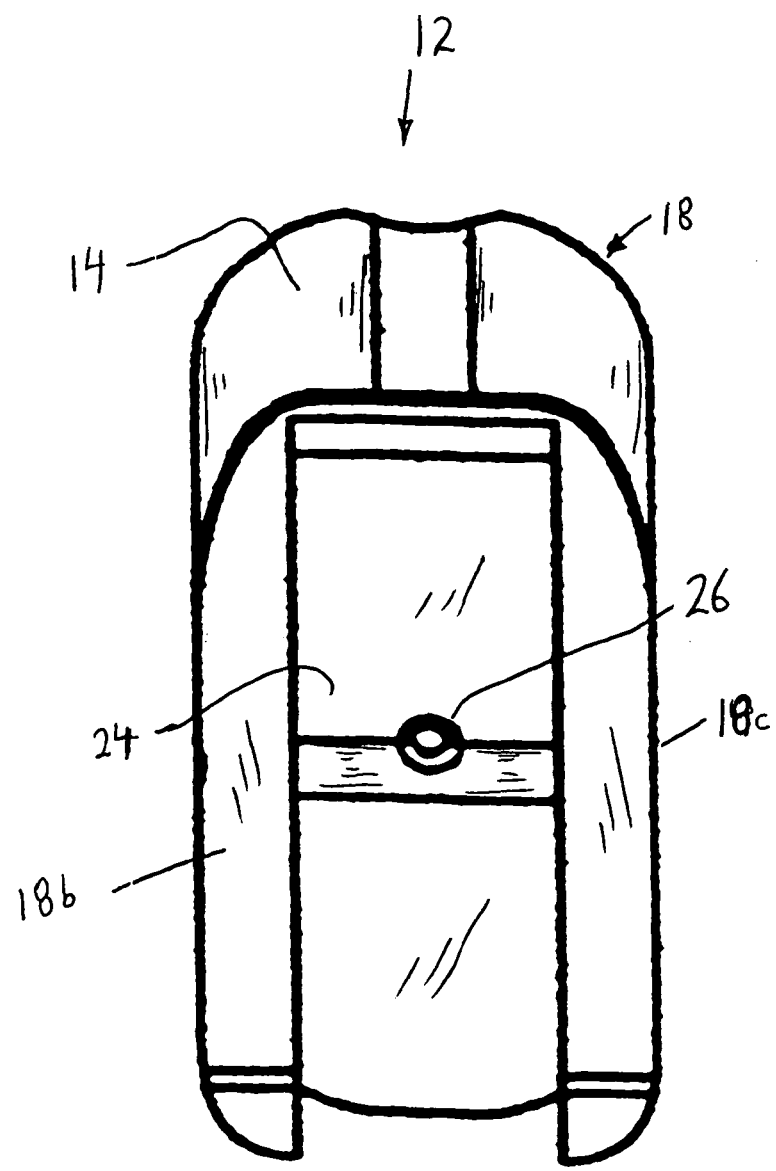
FIG. 5 is a front elevational view of the main housing.

Referring to the drawings in detail, and initially to FIGS. 1A-1C, a combination shift and brake lever arrangement 10 for a bicycle according to the present invention, to be mounted on the handlebar of a bicycle, includes a main housing 12 to be secured to a handlebar of a bicycle.

Figure 7:
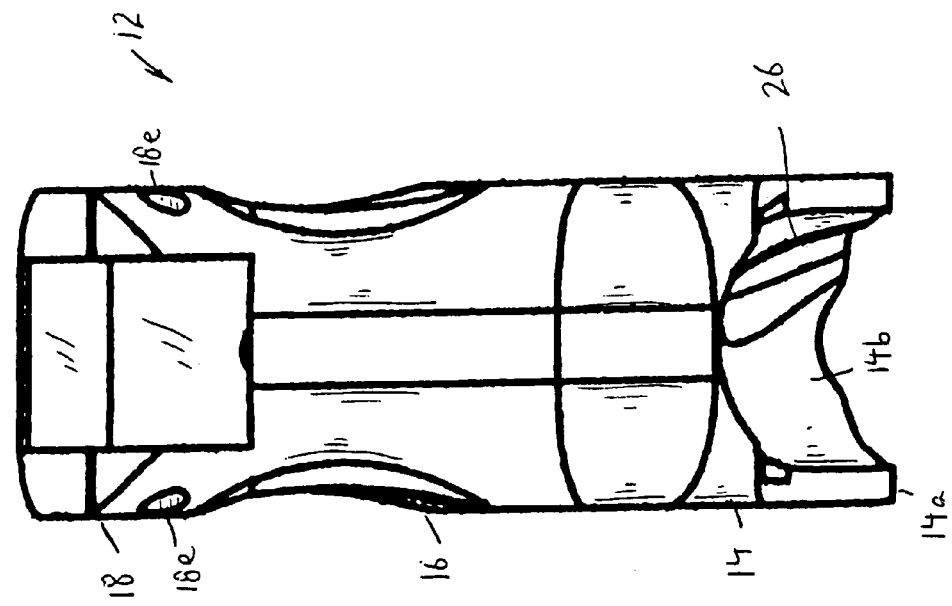
FIG. 7 is a bottom plan view of the main housing.
Figure 6:
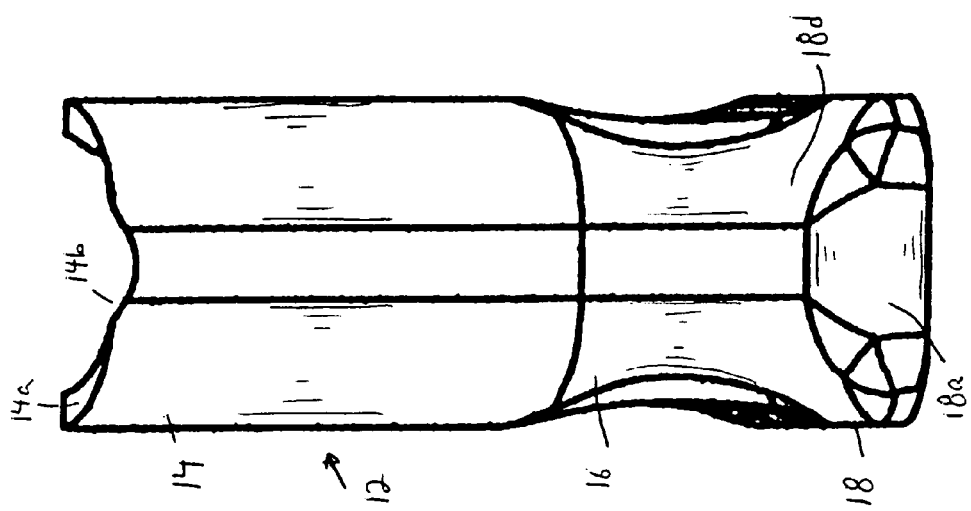
FIG. 6 is a top plan view of the main housing.
Figure 8:
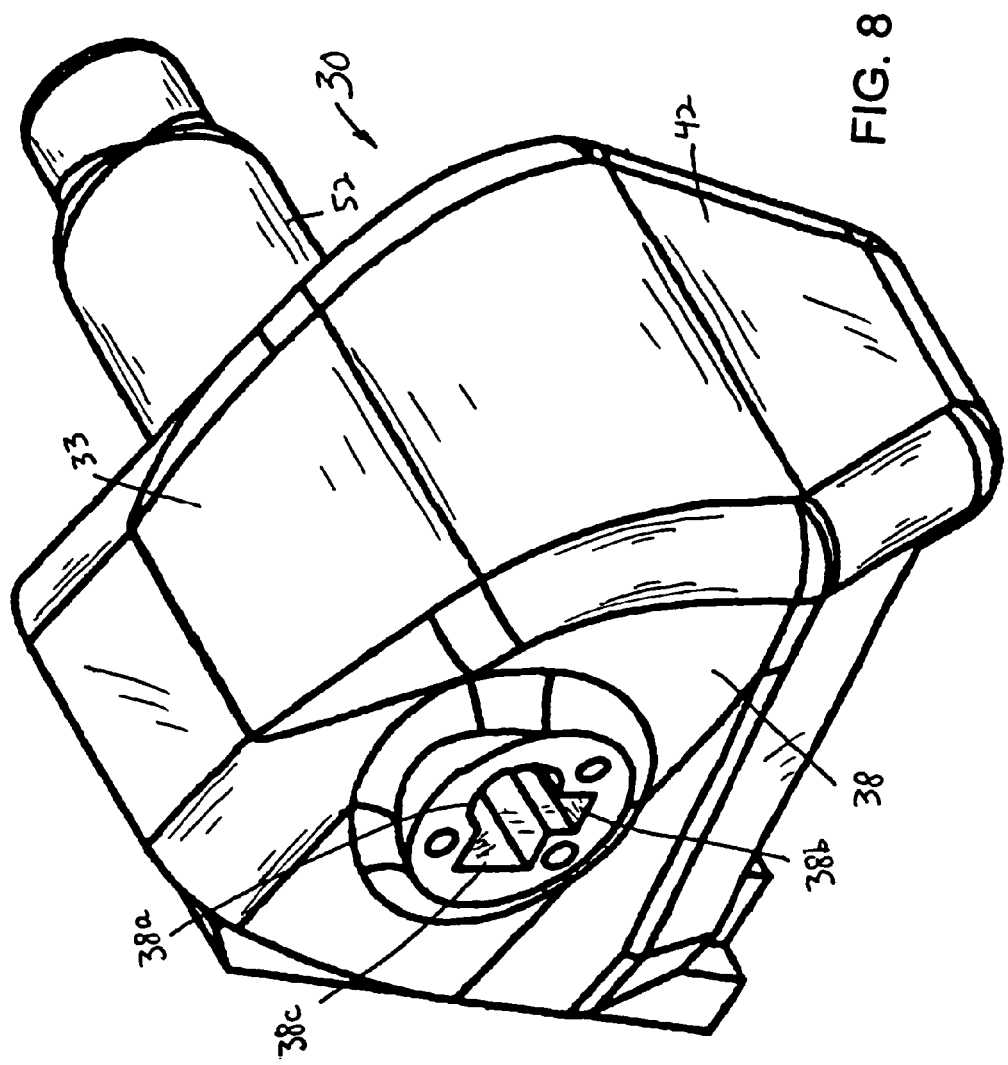
FIG. 8 is a perspective view of the carrier housing from the top front, left side.
Figure 9:
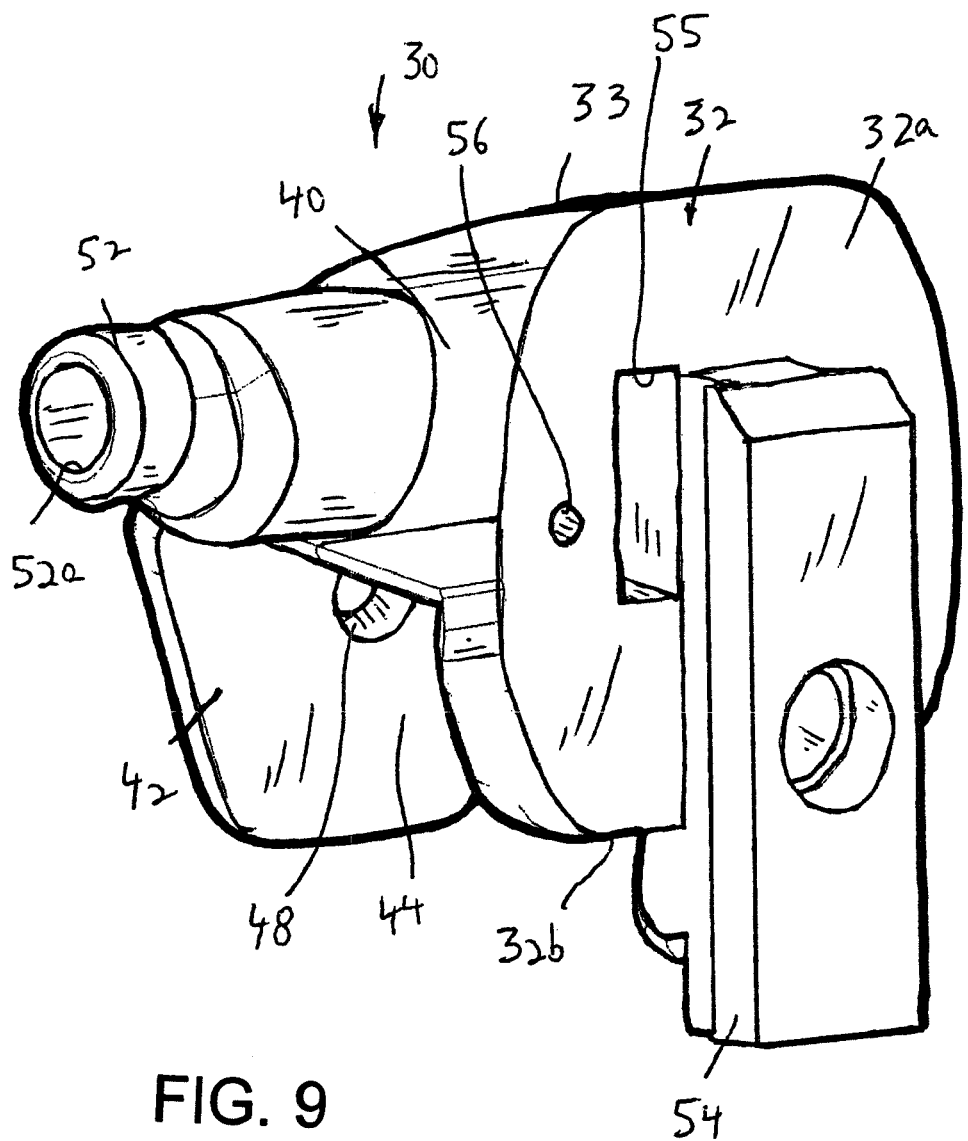
FIG. 9 is a perspective view of the carrier housing from the top rear, right side.
Figure 10:
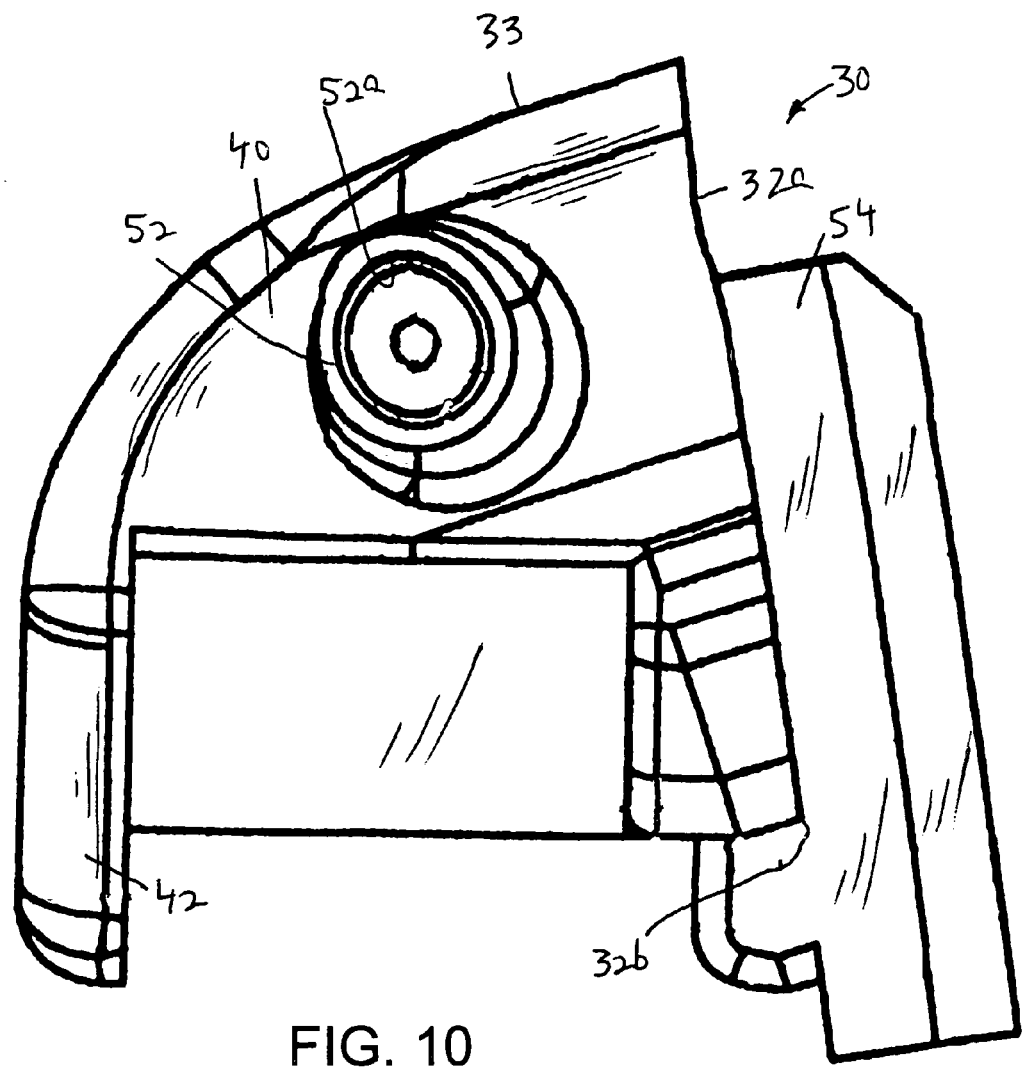
FIG. 10 is a right side elevational view of the carrier housing.
Figure 11:
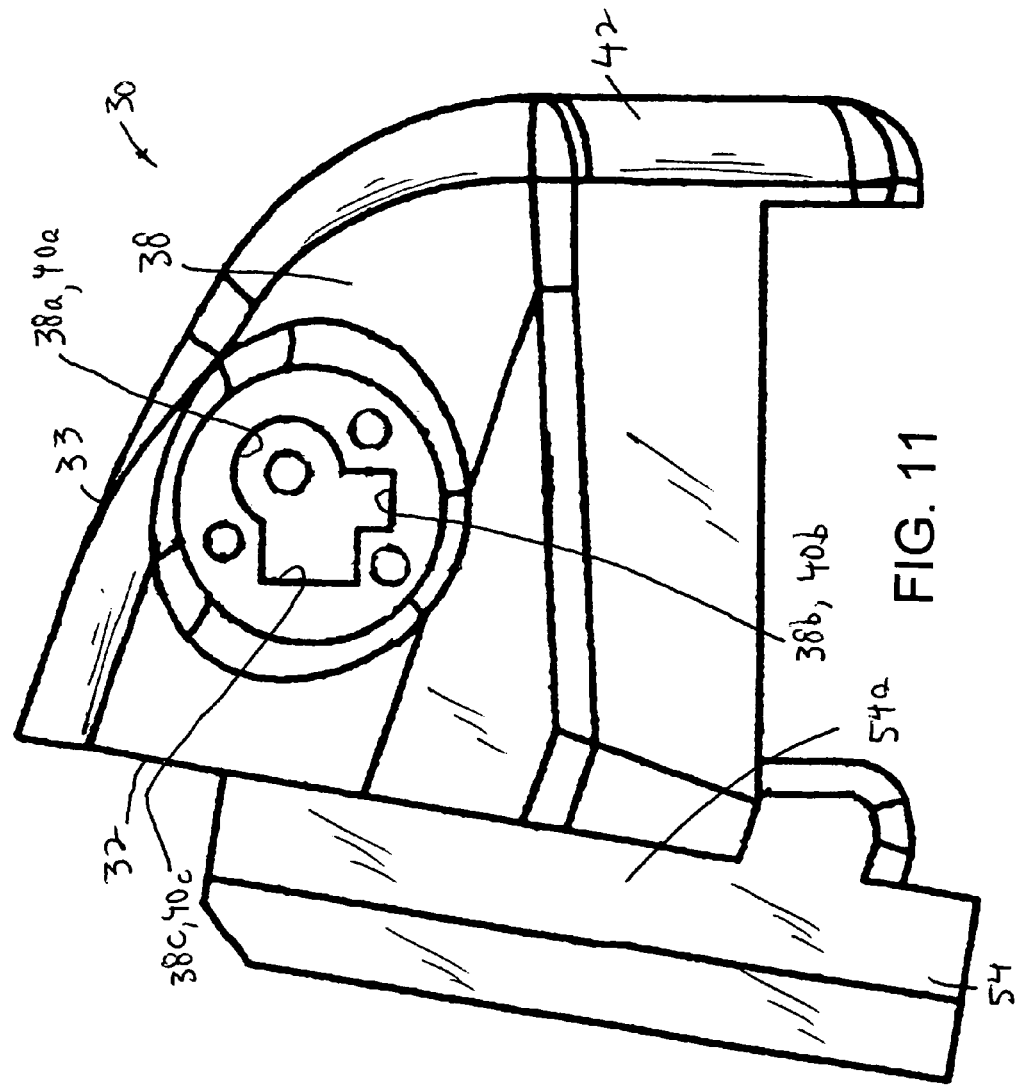
FIG. 11 is a left side elevational view of the carrier housing.
Figure 12:
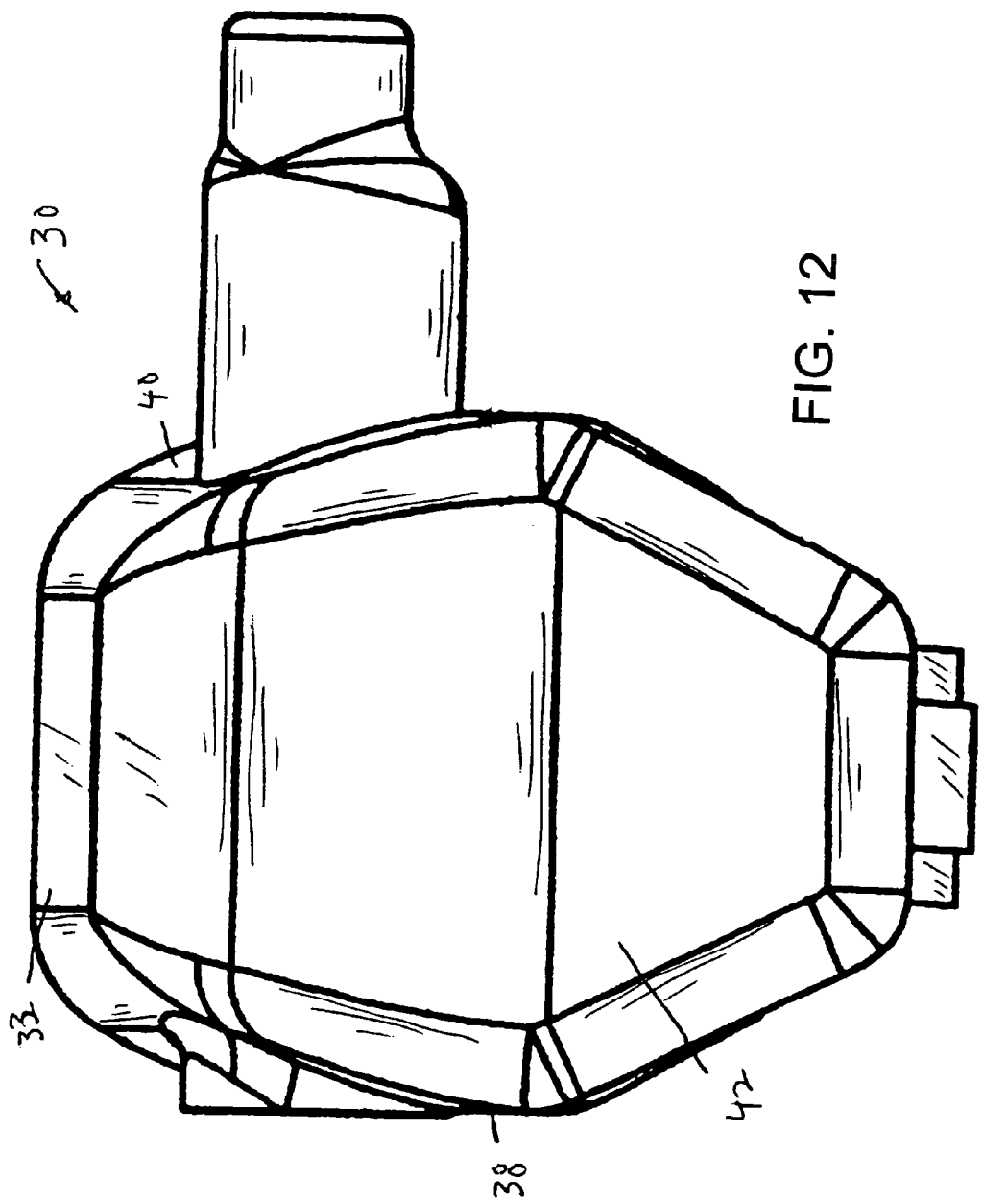
FIG. 12 is a front elevational view of the carrier housing.
Figure 13:
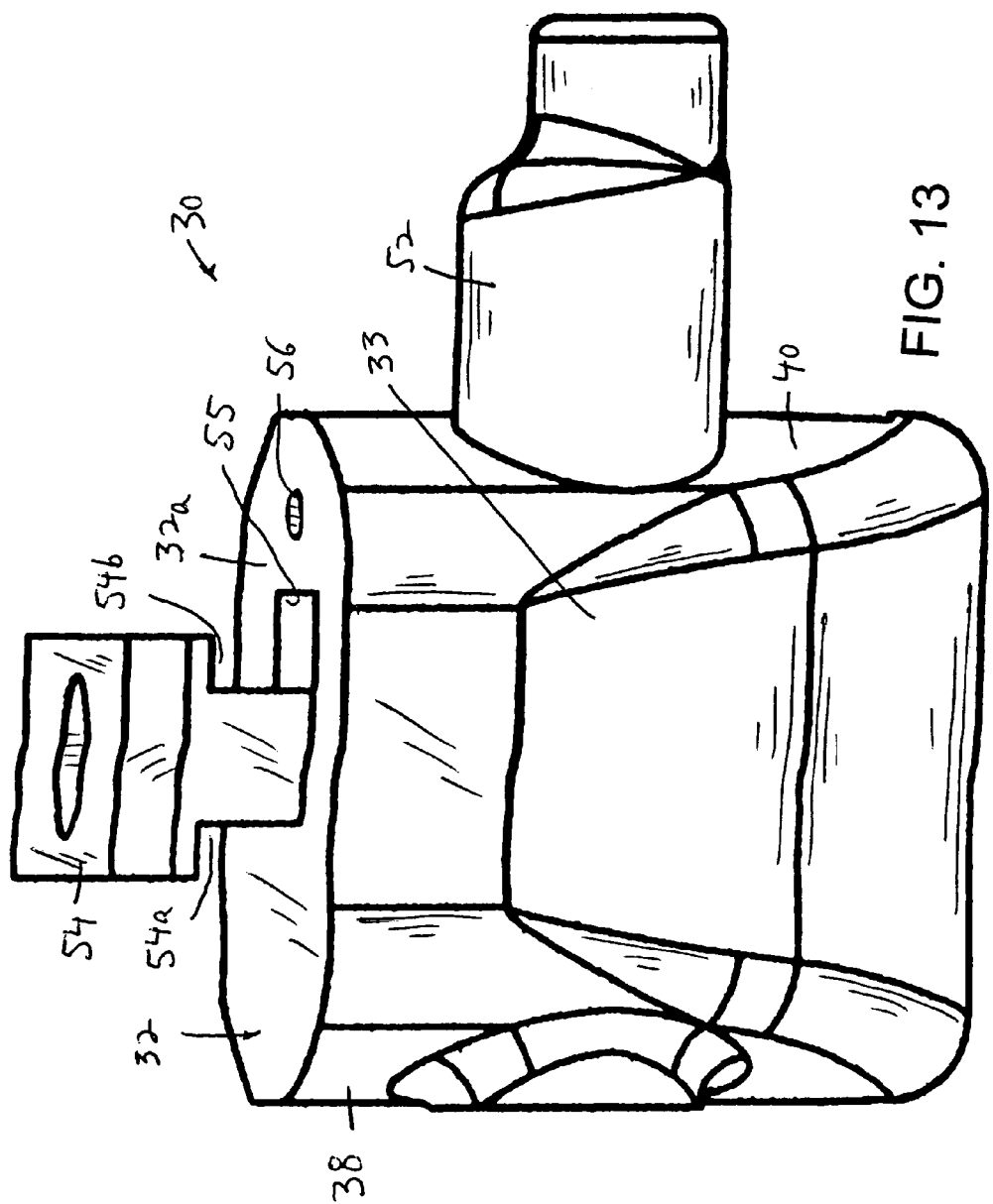
FIG. 13 is a top plan view of the carrier housing.
Figure 14:
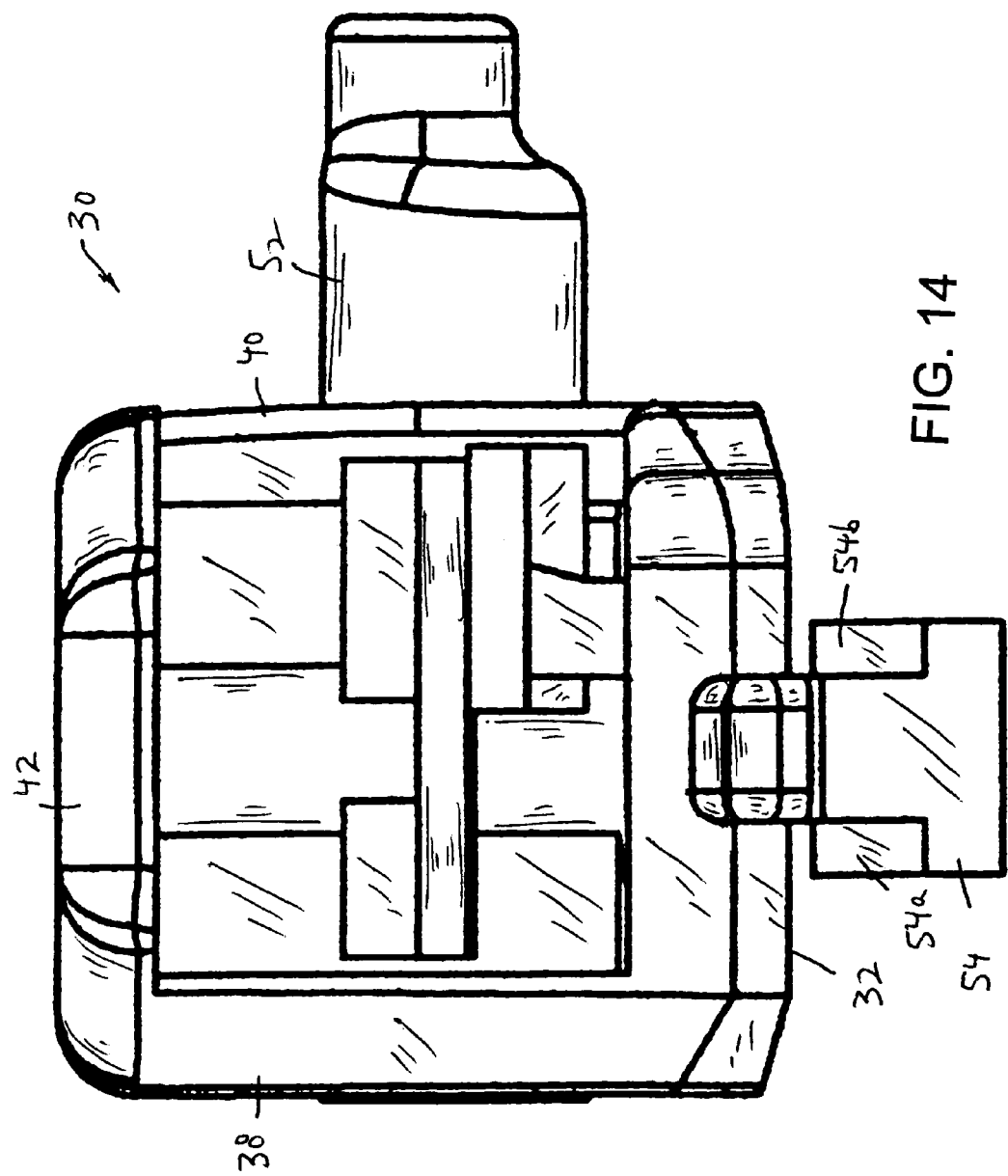
FIG. 14 is a bottom plan view of the carrier housing.

Specifically, as shown best in FIGS. 2-8, main housing 12 has a somewhat hyperboloid configuration (FIGS. 4 and 5) with a generally rectangular configuration when viewed from the top in FIG. 7. In this regard, main housing 12 includes a rear section 14 having a generally rectangular transverse cross-section which tapers in dimensions down to a central section 16 having a generally rectangular transverse cross-section, and then expands out in dimension to a front section 18 also having a generally rectangular transverse cross-section. Rear section 14 has an arcuate end face 14a that seats flush on a curved section of the handlebar of a bicycle, as is well known. Rear section 14 has an open cut-out area 14b at the lower portion of end face 14a. A through bore 20 extends through main housing 12 and connects cut-out area 14b with a recess 22 in the left side outer face of central section 16. In this manner, a clamp (not shown) which is wrapped around the handlebar extends within cut-out area 14, with the clamp having an outwardly extending bolt (not shown) that extends into through bore 20 and is threadedly secured in a hollow internally threaded bolt (not shown) that acts as a nut and that extends through the opposite end of through bore 20 at recess 22 in order to secure main housing 12 to the handlebar. Such securing arrangement is well known, for example, in the shift brake/lever arrangement of the Model ST-R600 sold by Shimano, Inc. of Japan.

Front section 18 includes an upwardly extending peak section 18a. A central recess 24 is formed in front section 18 and is defined by two parallel, spaced apart side walls 18b and 18c, and a combined arcuate back/top wall 18d. A through bore 26 extends from arcuate back/top wall 18d, through central section 16 and out at rear section 14. A brake cable (not shown) extends through bore 26 and is connected to either the rear or front brake assembly, in a known manner. Further, the lower end of each side wall 18b and 18c includes an opening 18e, the purpose for which will be explained hereafter.

As shown best in FIGS. 8-15, a carrier housing 30 includes a rear wall 32 and a top wall 33 that is downwardly inclined from the upper edge of rear wall 32. Carrier housing 30 further includes two substantially planar side walls 38 and 40 of a substantially quarter circular shape and which are connected to the side edges of rear wall 32 and top wall 33, and extend to a front wall 42 that is connected to the front edge of top wall 33. As a result, a large open area 44 is defined between rear wall 32, top wall 33, left and right side walls 38 and 40, and front wall 42 for housing the shift control mechanism to be described hereafter.

A through bore 46 is formed in rear wall 32, and a circular recess 48 is formed in front wall 42 in alignment with through bore 46. A pivot pin 50 is connected therebetween for pivotally supporting the shift/brake lever in left and right directions for a shifting operation, as will be understood from the explanation hereafter.

Left side wall 38 includes a circular opening 38a, a lower rectangular guide 38b in open communication with circular opening 38a at around the seven o'clock position thereof, and a rear rectangular guide 38c in open communication with circular opening 38a at around the nine o'clock position thereof. Right side wall 40 in like manner includes a circular opening 40a in alignment with opening 38a, a lower rectangular guide 40b in open communication with circular opening 40a at around the five o'clock position thereof and in alignment with lower rectangular guide 38b, and a rear rectangular guide 40c in open communication with circular opening 40a at around the three o'clock position thereof and in alignment with rear rectangular guide 38c. A tubular guide 52 extends outwardly from right side wall 40 and has an opening 52a in alignment with opening 40a in right side wall 40.

A T-shaped parallelepiped guide 54 is integrally formed as one-piece at the outer surface 32a of rear wall 32 and extends vertically down below the lower edge 32b of rear wall 32 so as to form guide tracks 54a and 54b at opposite sides of guide 54. A rectangular opening 55 is provided in rear wall 32 adjacent guide track 54a, and a small through bore 56 is provided in rear wall 32 at the side of rectangular opening 55 which is opposite to guide 54.

Figure 15:
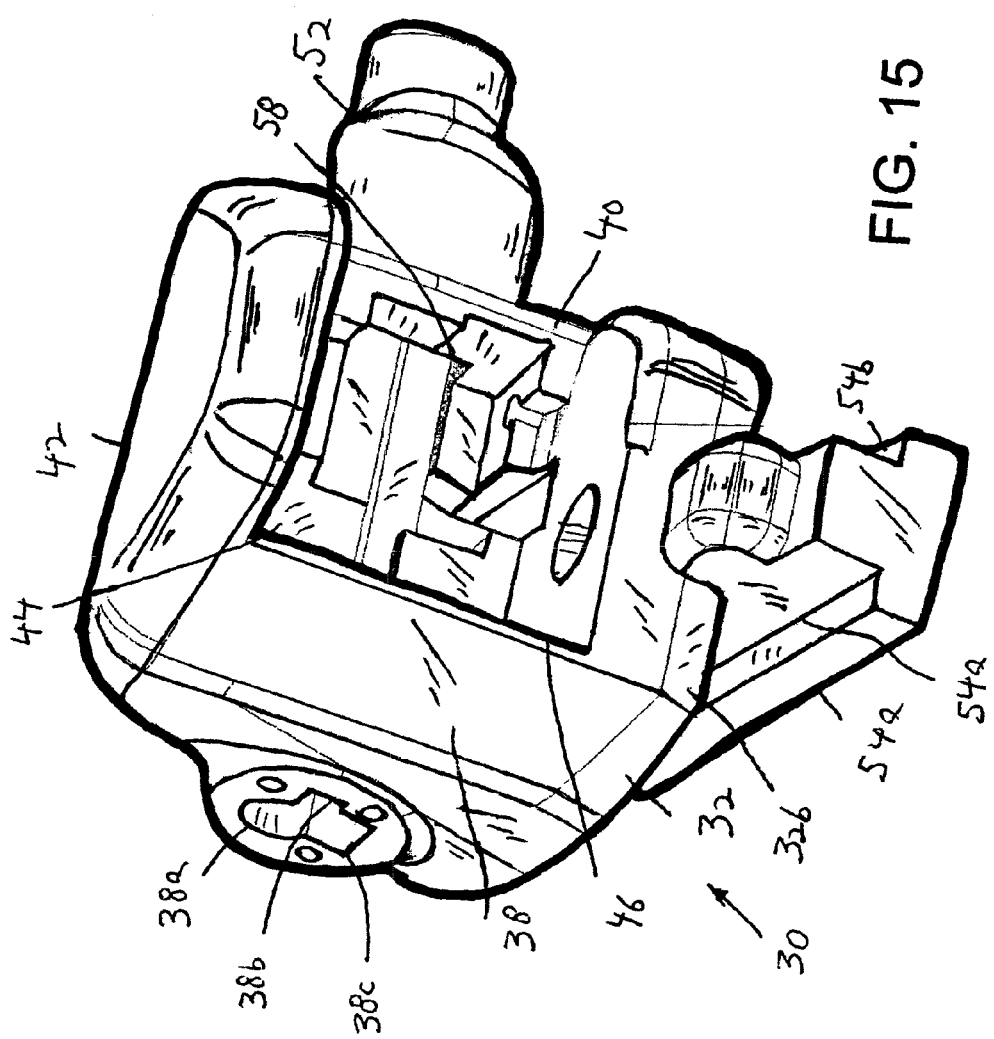
FIG. 15 is a perspective view of the carrier housing from the bottom.
Figure 16:
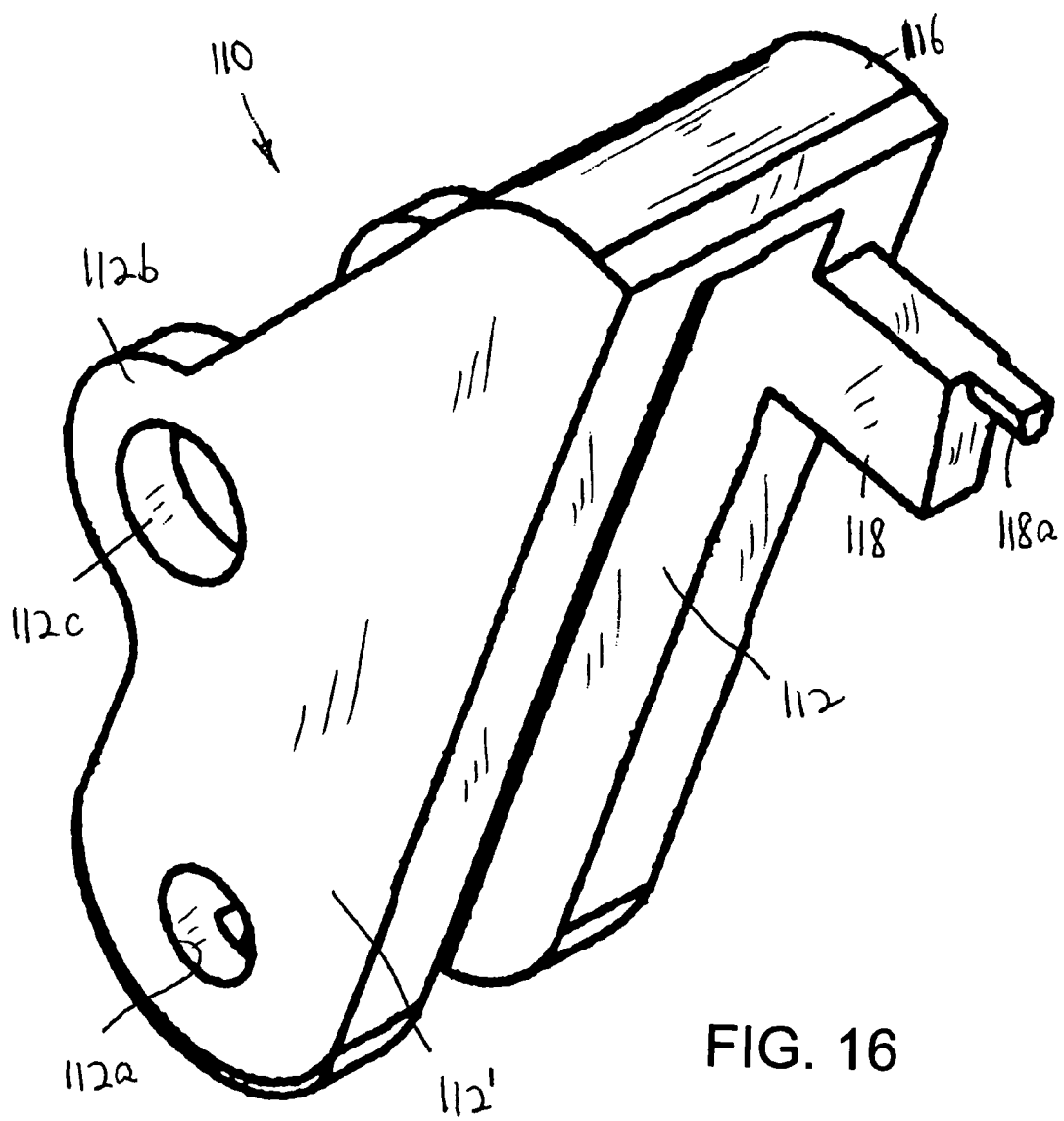
FIG. 16 is a perspective view of the brake housing from the top rear side.
Figure 18:
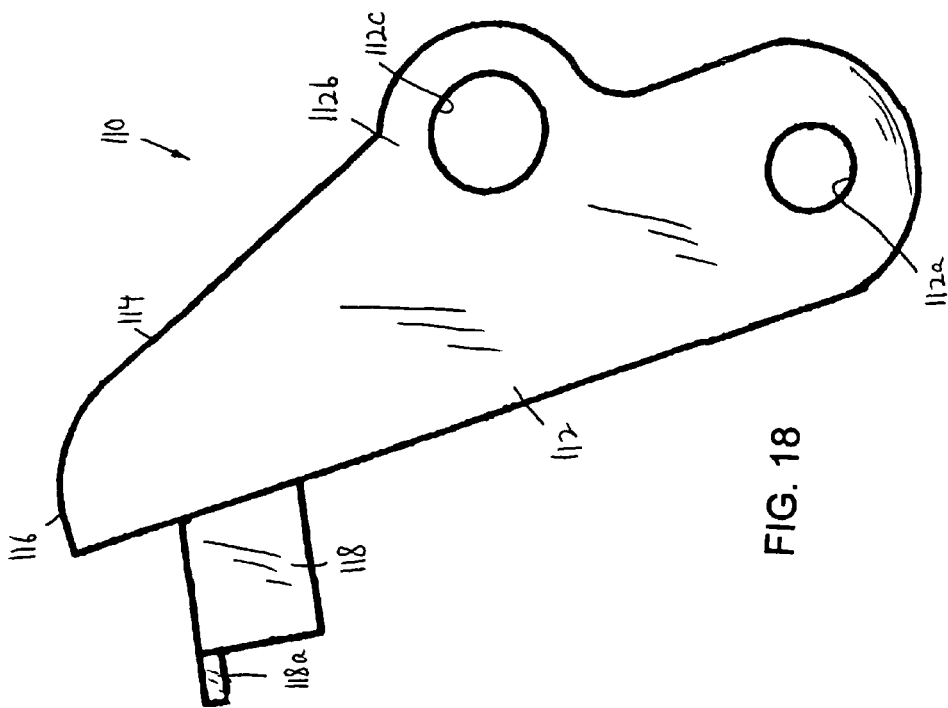
FIG. 18 is a left side elevational view of the carrier housing.
Figure 17:
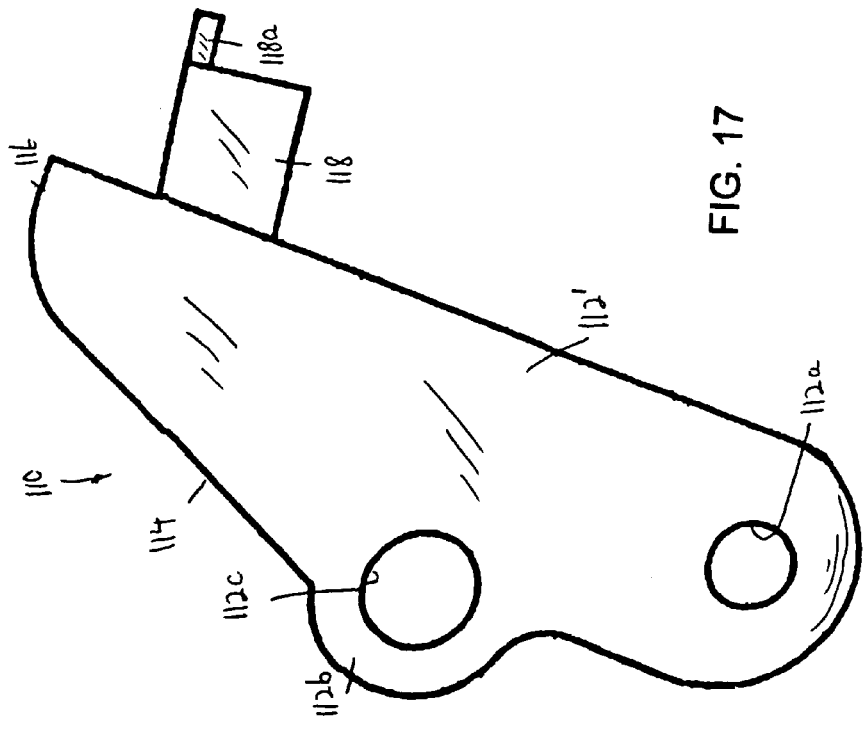
FIG. 17 is a right side elevational view of the carrier housing.

As shown in FIG. 15, carrier housing 30 also includes a hold down wall 58 at the inner surface of right side wall 40, and adjacent the lower rectangular guide 40b therein, the purpose for which will become apparent from the discussion hereafter.

Figure 19:
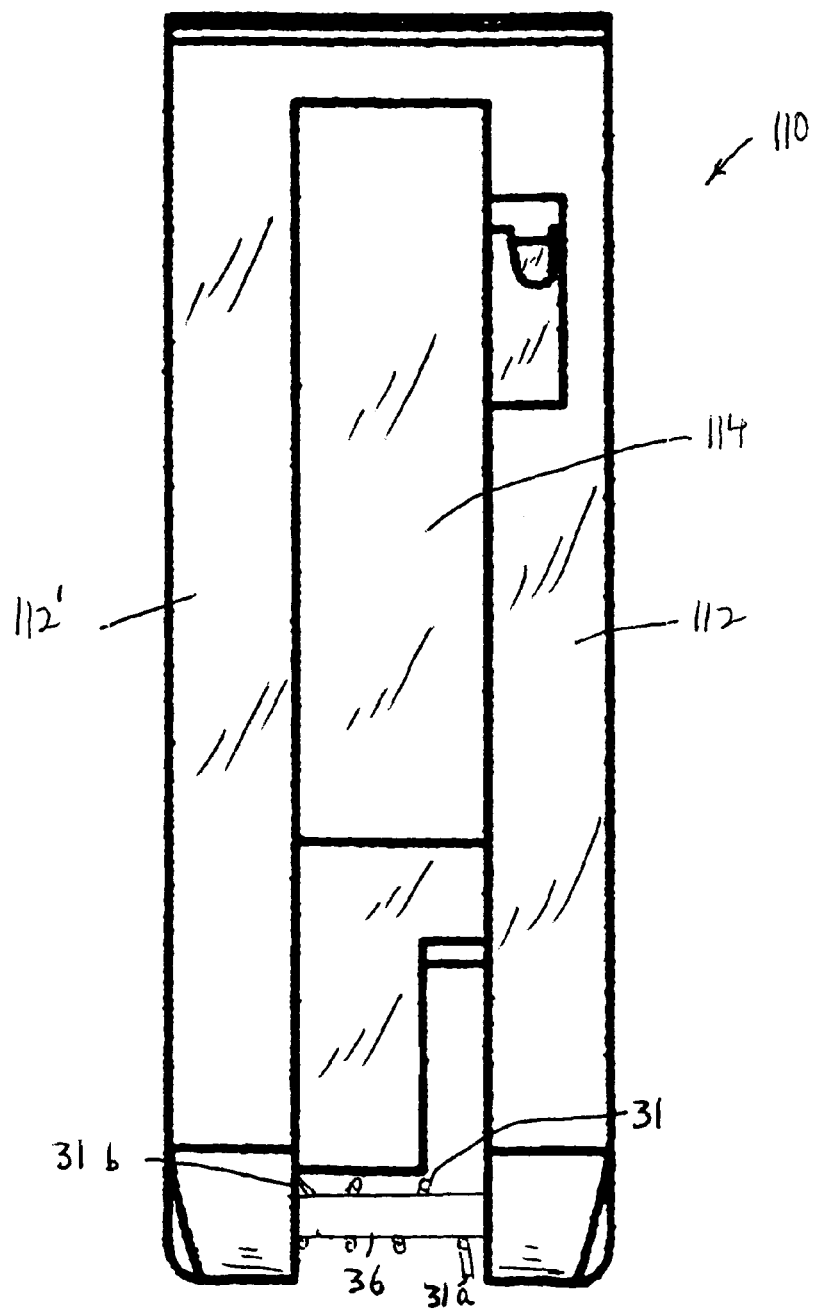
FIG. 19 is a front elevational view of the carrier housing.
Figure 20:
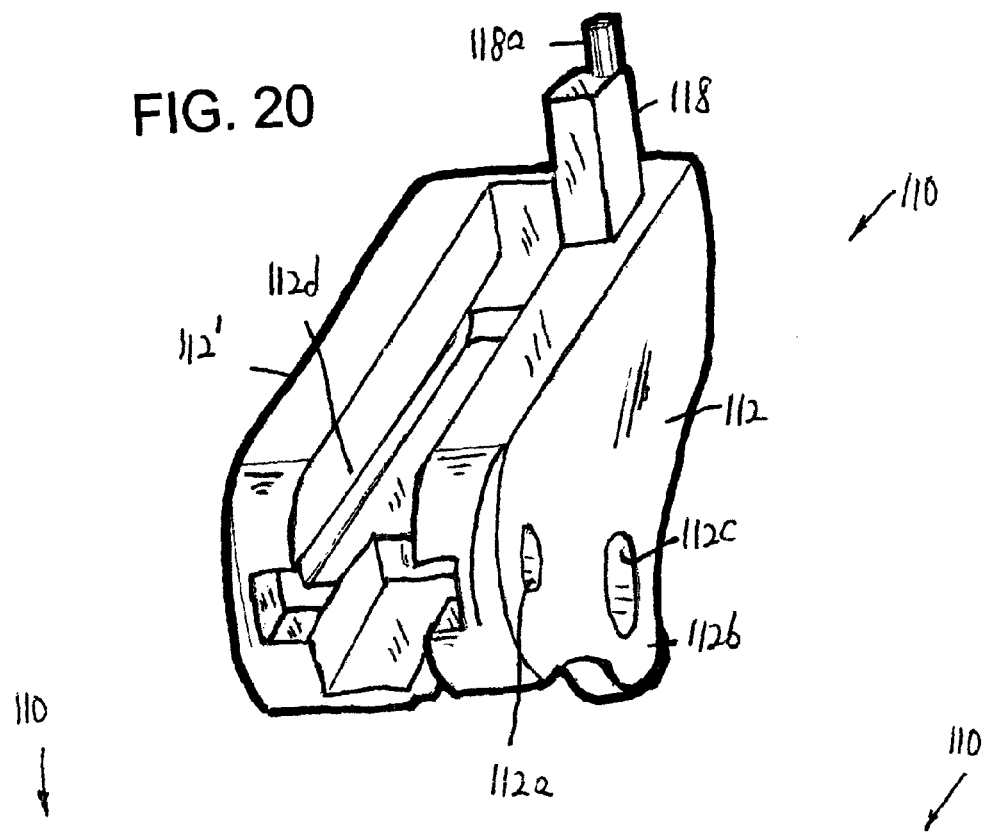
FIG. 20 is a perspective view of the brake housing from the bottom rear side.
Figure 21:
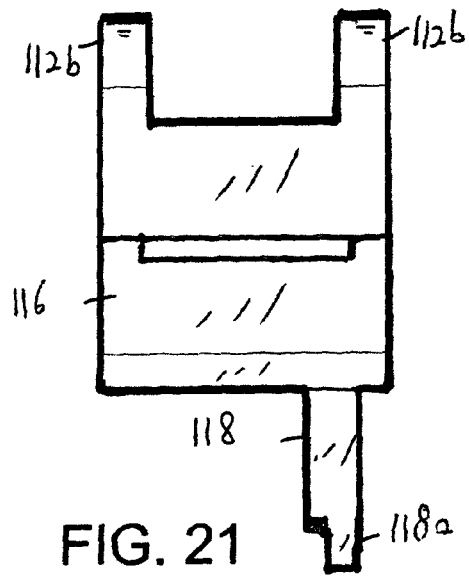
FIG. 21 is a top plan view of the carrier housing.
Figure 22:
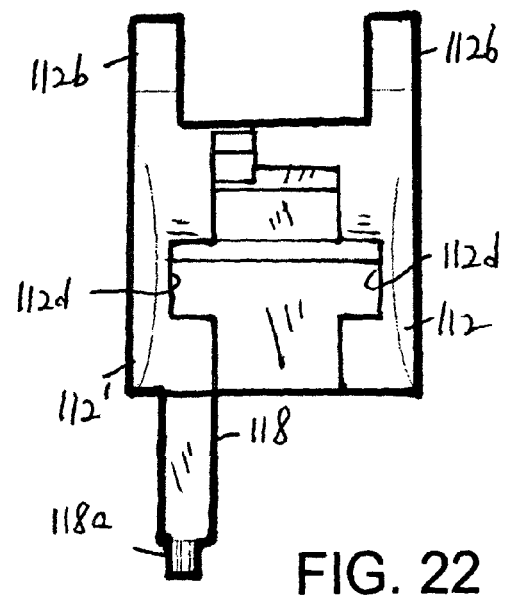
FIG. 22 is a bottom plan view of the carrier housing.
Figure 23:
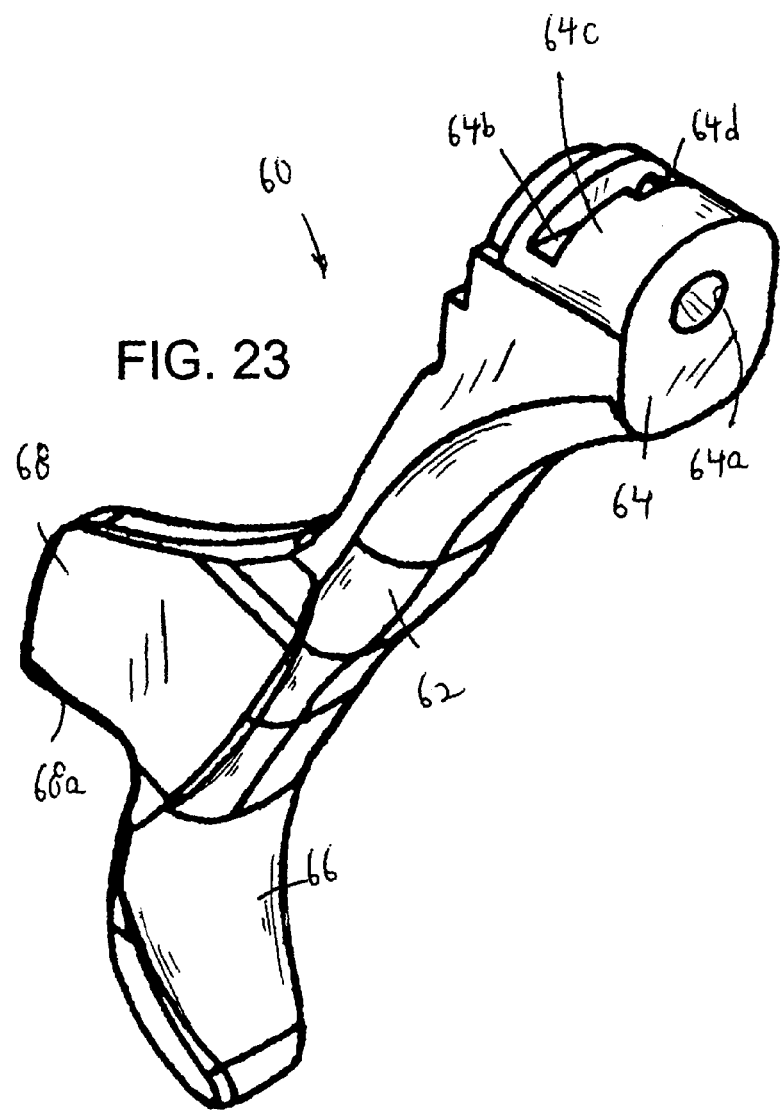
FIG. 23 is a perspective view of the combination shift/brake lever from the top and front.
Figure 24:
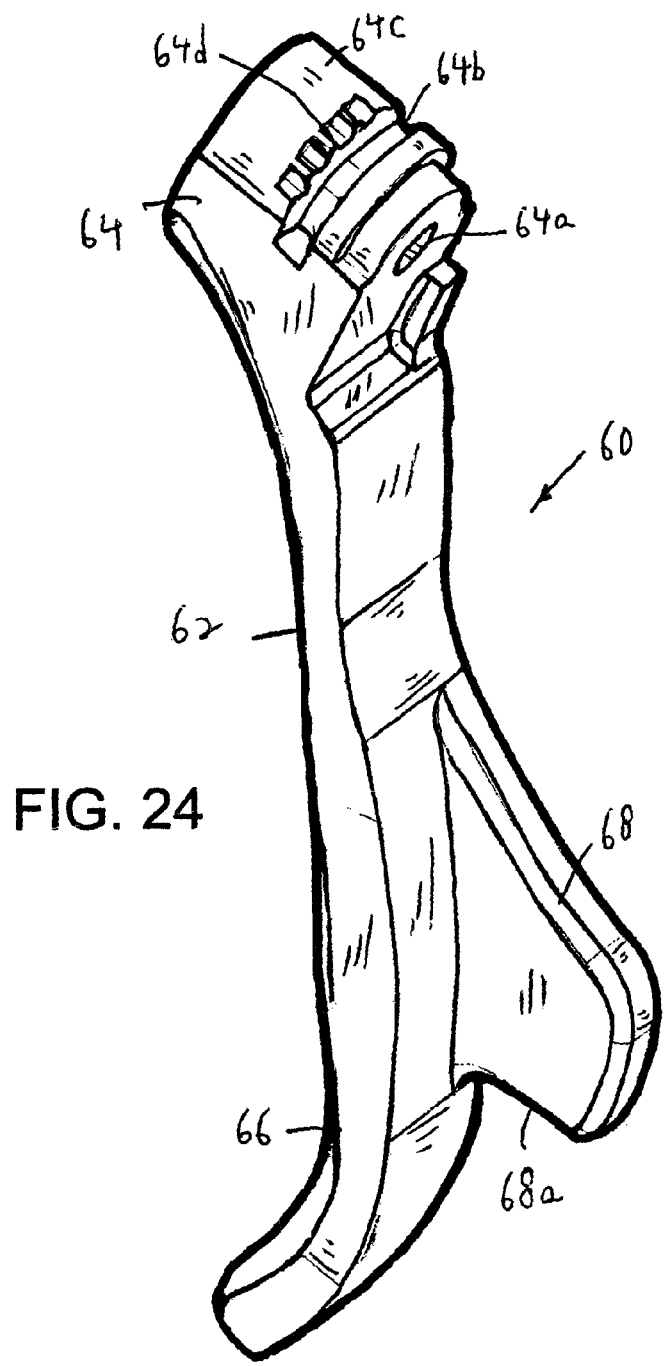
FIG. 24 is a perspective view of the combination shift/brake lever from the top and rear.
Figure 25:
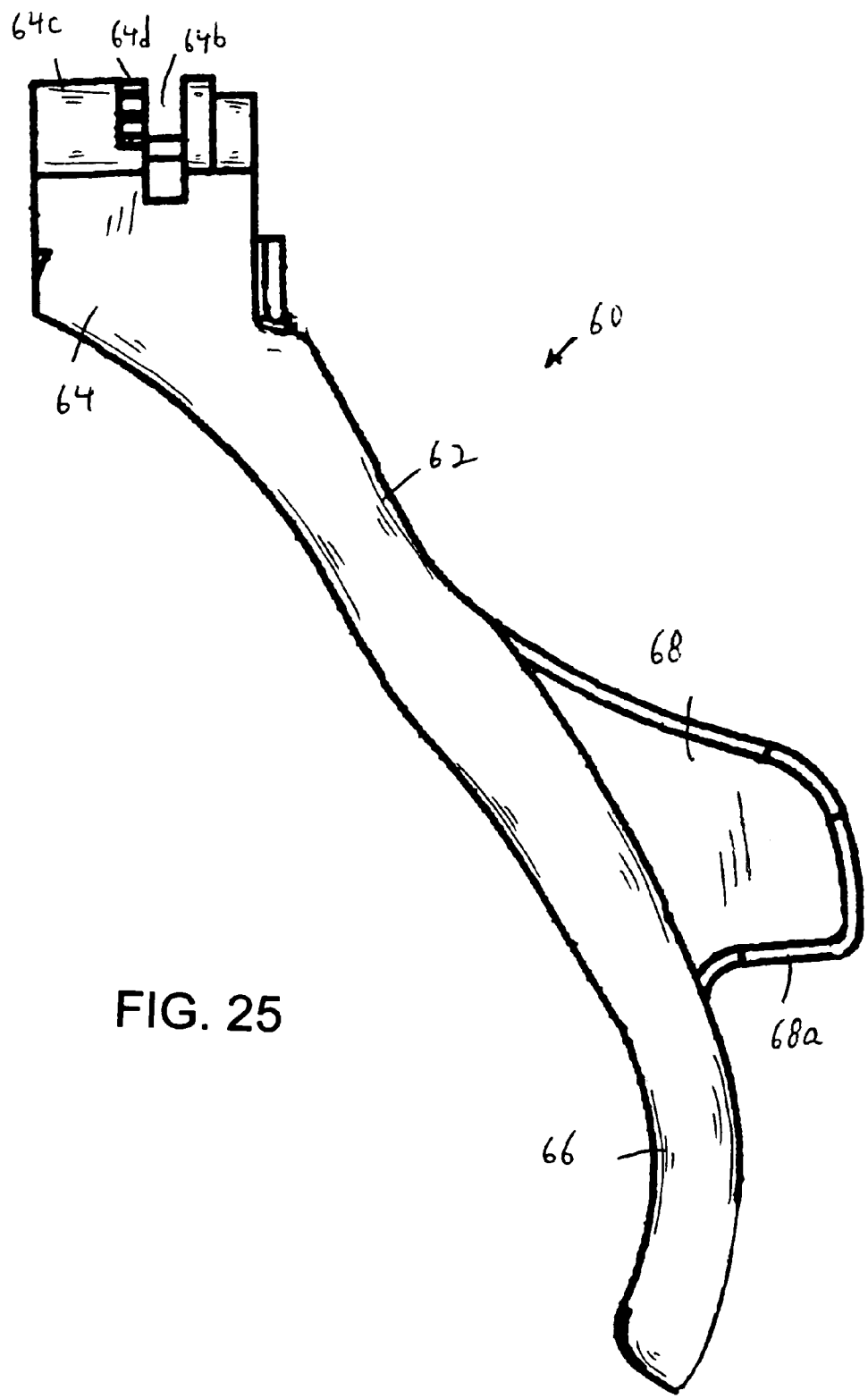
FIG. 25 is a right side elevational view of the combination shift/brake lever.
Figure 26:
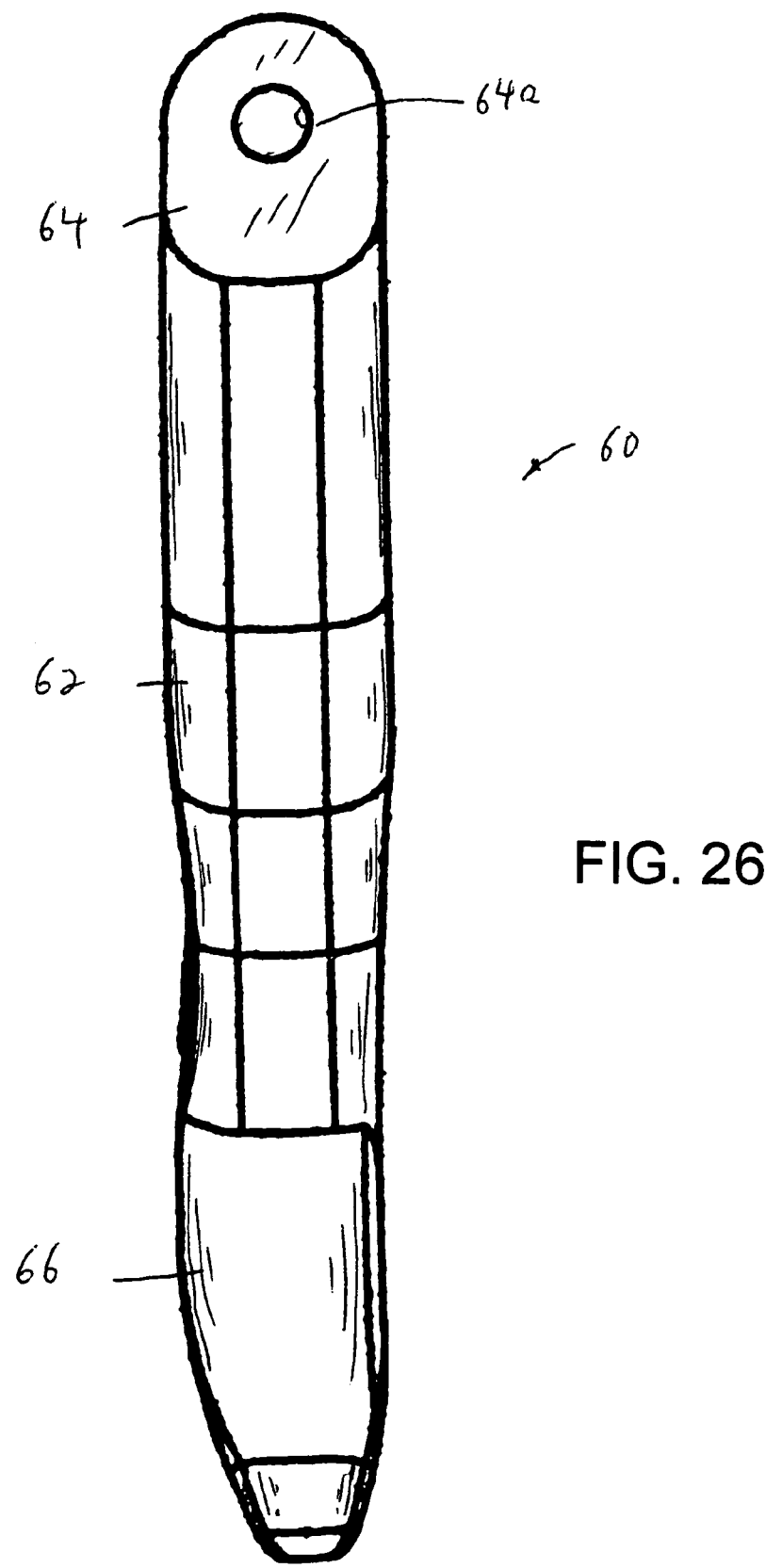
FIG. 26 is a front elevational view of the combination shift/brake lever.

A brake housing 110 is slidably mounted on carrier housing 30. Specifically, as shown best in FIGS. 16-22, brake housing 110 includes two elongated parallel, spaced apart side walls 112 and 112' that fit within side walls 18b and 18c of main housing 12 and which are each provided with aligned openings 112a at their lower ends. Openings 112a are in alignment with openings 18e, and a pivot pin 36 (FIGS. 1B and 19) is mounted therethrough to pivotally connect brake housing 110 to main housing 12.

Side walls 112 and 112' further include two parallel, spaced apart arcuate extension walls 112b which extend rearwardly out from a mid-section of side walls 112 and 112' and are in parallel planar relation to side walls 112 and 112'. Each extension wall 112b includes an opening 112c, with openings 112c of both extension walls 112b being in alignment with each other. A yoke (not shown) is connected between openings 112c in a known manner, and a brake cable (not shown) is tied at one end to the yoke, extends through bore 26 and is connected to either the rear or front brake assembly, in a known manner.

Each side wall 112 and 112' further includes a central longitudinal recess 112d along the inner surface thereof, such that each side wall 112 and 112' has a generally U-shaped cross-sectional configuration. In this manner, recesses 112d receive guide tracks 54a and 54b such that carrier housing 30 and brake housing 110 are slidable relative to each other. It will be appreciated, however, that because carrier housing 30 and brake housing 110 are mounted in main housing 12, they cannot escape from each other, and such sliding movement is limited to a small extent.

Side walls 112 and 112' are connected at one longitudinal edge thereof by a rear wall 114 and an integral, continuous top wall 116.

Still further, a hold down extension 118 extends forwardly in an almost perpendicular manner from an upper portion of the front edge of the right side wall 112, and includes a hold down pin 118a that extends forwardly from a front surface of extension 118.

A combination shift/brake lever 60 is mounted to brake housing 110. Specifically, as shown best in FIGS. 23-26, shift/brake lever 60 includes an elongated body 62 having a substantially cylindrical shaped enlarged head 64 at the upper end thereof and a substantially foot shaped lower end 66. Enlarged head 64 has a front to back through bore 64a through which pivot pin 50 extends for pivotally supporting shift/brake lever 60 in left and right, that is, side to side, directions of carrier housing 30 for a shifting operation. With this arrangement, when shift/brake lever 60 is grasped and pulled toward the person, carrier housing 30 and connected brake housing 110 are caused to pivot relative to main housing 12 around pivot pin 36. This results in a pulling of the brake cable connected to carrier housing 30, and a resultant braking operation. A torsion spring 31 (FIG. 19) has one end 31a connected to main housing 12 and an opposite end 31b connected to brake housing 110 to normally bring shift/brake lever 60 and brake housing 110 (and carrier housing 30 therewith) back to a neutral position after a pivoting force applied by the user thereto to perform a braking operation is removed.

Enlarged head 64 has an arcuate transverse groove 64b at the upper surface thereof, at a position above through bore 64a so as not to interfere with the side to side pivoting action of shift/brake lever 60 around pivot pin 50. As a result, a rear arcuate wall 64c is formed as one boundary of transverse groove 64b. A plurality of gear teeth 64d are formed on the upper surface of arcuate wall 64c, the purpose for which will be understood from the description hereafter.

Elongated body 62 further includes a rear finger extension 68 having a concave underside 68a which can be engaged by a person's finger to bias combination shift/brake lever 60 in an upward direction.

Figure 27:
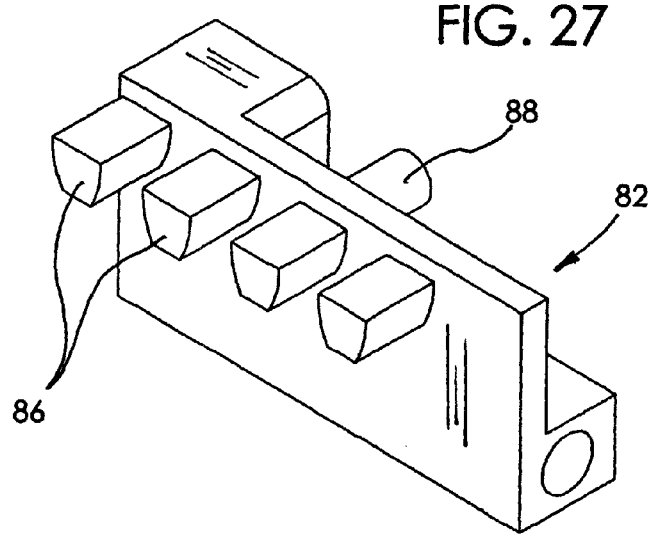
FIG. 27 is a perspective view of the actuating rack viewed from the left side.
Figure 28:
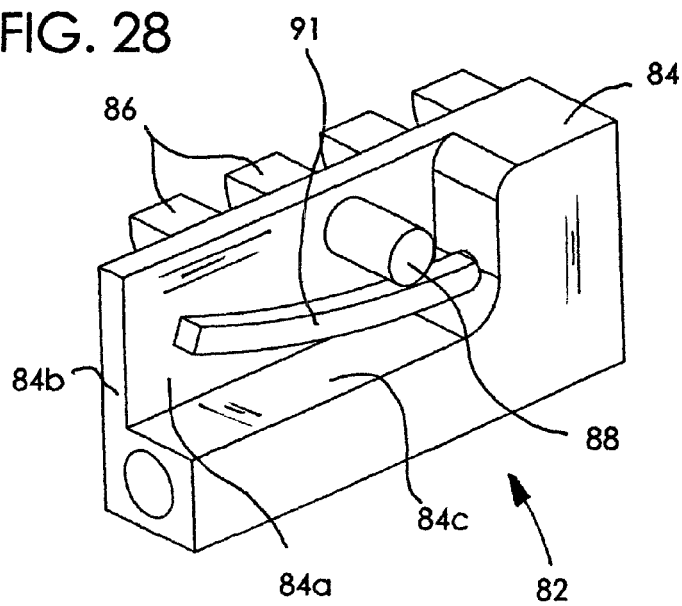
FIG. 28 is a perspective view of the actuating rack viewed from the right side.

In accordance with the present invention, a shift control mechanism 80 is provided which includes an elongated actuating rack 82, shown best in FIGS. 27 and 28, formed by a substantially rectangular block 84 having gear teeth 86 extending outwardly in a perpendicular manner from the upper end at the left side thereof. Rectangular block 84 is slidably held in lower rectangular guides 38b and 40b, and extends into transverse groove 64b of enlarged head 64 of shift/brake lever 60 for sliding movement therein. Gear teeth 86 engage with gear teeth 64d of enlarged head 64 of shift/brake lever 60. In this manner, when shift/brake lever 60 is rotated about pivot pin 50 against the force of torsion spring 31, gear teeth 64*d* which are engaged with gear teeth 86, slidably move actuating rack 82 in one direction from its neutral position.

Rectangular block 84 has a substantially rectangular cutaway section 84*a* at the side opposite to gear teeth 86. Cutaway section 84*a* extends about three-fourths of the way down from the upper edge and about two-thirds of the way from the edge 84*b* that extends out of transverse groove 64*b*, and is cut-away to a depth of about two-thirds the depth of rectangular block 84. Cut-away section includes a floor 84*c*. A post 88 extends out from a side wall 84*d* of cut-away section 84*a* at a position near the upper edge of rectangular block 84 and substantially midway along the length thereof.

Figure 29:
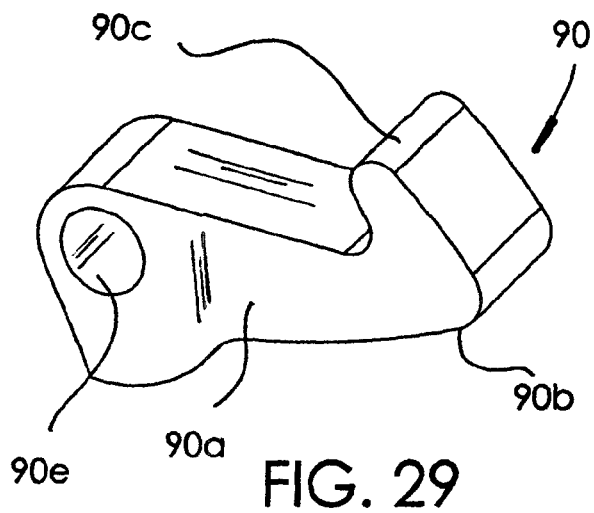
FIG. 29 is a perspective view of the carrier pull pawl.

A carrier pull pawl 90 shown best in FIG. 29 is rotatably mounted on post 88 of actuating rack 82. Carrier pull pawl 90 includes a pawl lever 90*a* having an opening 90*e* at one end thereof which is mounted on post 88. A leaf spring 91 (FIG. 28) is associated with post 88 between actuating rack 82 and pawl lever 90*a* for normally biasing pawl lever 90*a* in an upward direction. The lower end surface 90*b* of pawl lever 90*a* is inclined at about 135 degrees from the lengthwise axis of pawl lever 90*a* in order to rest flush on the floor 84*c* of cut-away section 84*a* in the lowered position. An upwardly inclined pawl catch 90*c* is provided at the lower end 90*b* of pawl lever 90*a* for engaging with gear teeth to be described hereafter, and includes an upper inclined surface 90*d*.

Figure 36:
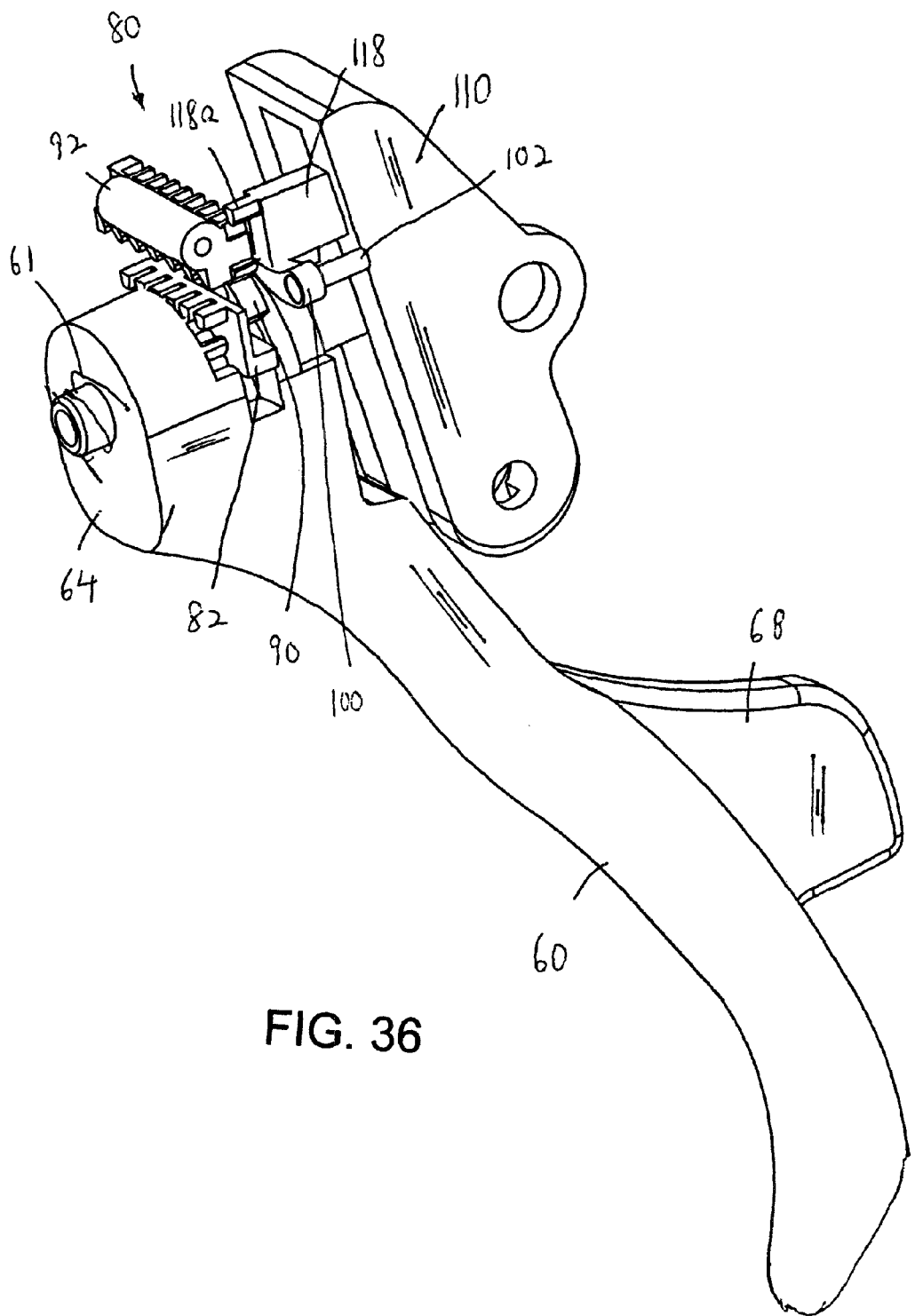
FIG. 36 is a perspective view showing the relation of the shift control mechanism and the brake housing relative to the combination shift/brake lever, viewed from the front and top.

In the neutral position of shift/brake lever 60, upwardly inclined surface 90*d* is engaged by hold down wall 58 of carrier housing 30. However, when shift/brake lever 60 is pivoted about pivot pin 50, gear teeth 64*d* of enlarged head 64 of shift/brake lever 60 engage with gear teeth 86 of actuating rack 82 to move actuating rack 82 in transverse groove 64*b* of enlarged head 64. As a result, carrier pull pawl 90 is no longer restrained by hold down tab 58, so that spring 91 associated therewith rotates pawl lever 90*a* about post 88 to move pawl catch 90*c* upwardly to engage gear teeth to be described hereafter. When the biasing force on shift/brake lever 60 is released, a torsion spring 61 (FIG. 36) associated therewith moves shift/brake lever 60 back to its neutral position. At this time, gear teeth 64*d* of enlarged head 64 of shift/brake lever 60 engage with gear teeth 86 of actuating rack 82 to move actuating rack 82 back to its original position in transverse groove 64*b* of enlarged head 64, where hold down wall 58 engages upwardly inclined surface 90*d* of pawl 90 to rotate pawl lever 90 in the opposite direction such that pawl catch 90*c* is moved down and lower end surface 90*b* is once again held on floor 84*c* of rectangular cut-away section 84*a*.

Figure 30:
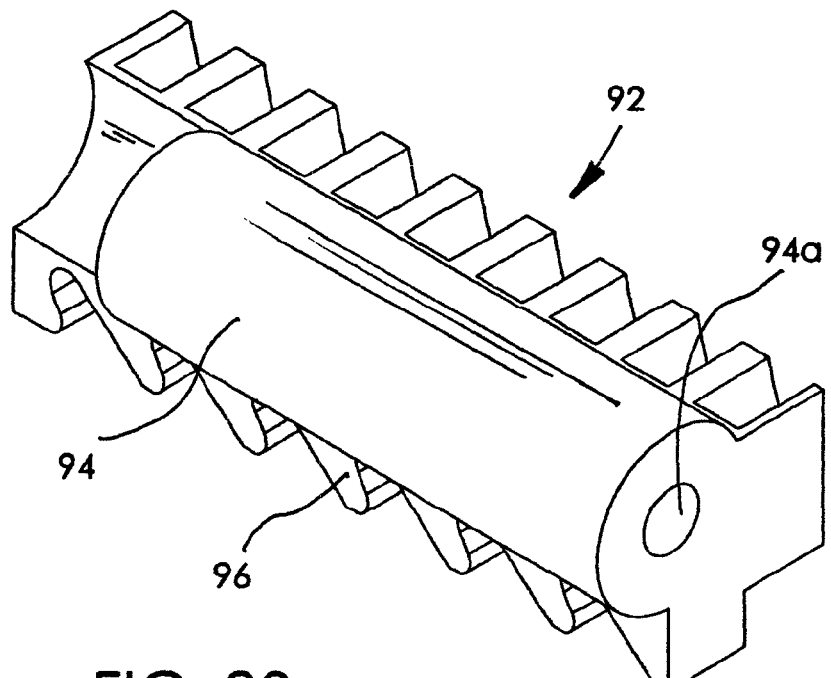
FIG. 30 is a perspective view of the cable carrier rack viewed from the right side.
Figure 31:
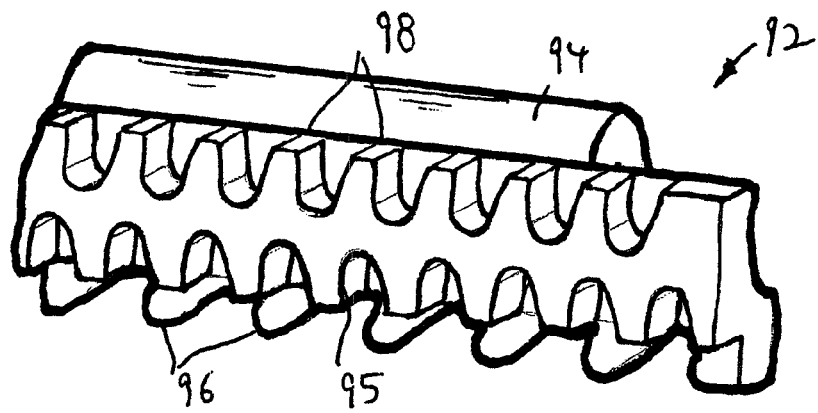
FIG. 31 is a perspective view of the cable carrier rack viewed from the left side.
Figure 32:
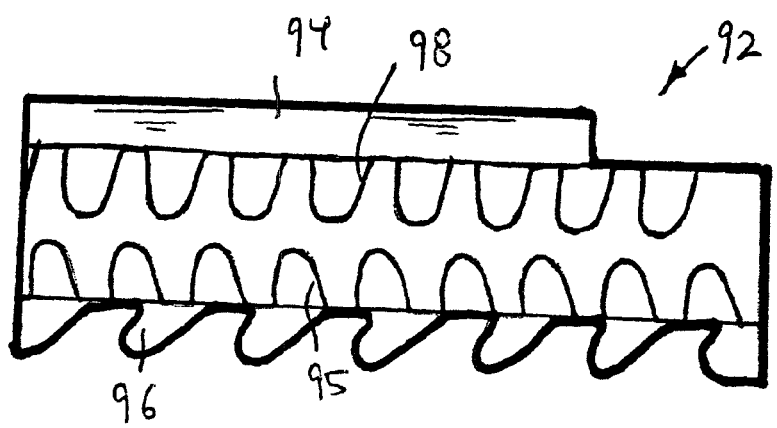
FIG. 32 is a side elevational view of the cable carrier rack viewed from the left side.

Shift control mechanism 80 further includes an elongated cable carrier rack 92, as best shown in FIGS. 30-32, slidably held in rear rectangular guides 38*c* and 40*c*. Cable carrier rack 92 is formed by a substantially cylindrical block 94 having a central through bore 94*a*. A shift cable (not shown) extends from a derailleur through tubular guide 52 and then through cylindrical block 94 where it is tied. As a result, movement of cable carrier rack 92 also results in movement of the shift cable in order to change gears at the derailleur. Inclined gear teeth 96 extend downwardly from the lower side of cylindrical block 94, with gear teeth 96 having the same angle of inclination as pawl catch 90*c* and being adapted to be engaged by pawl catch 90*c*. Cable carrier rack 92 also includes upper gear teeth 98 on the opposite side thereof. Upper gear teeth 98 have a generally U-shaped cross-sectional profile. Cable carrier rack 92 further includes a second set of lower gear teeth 95 directly below upper gear teeth 98 and which have a generally inverted U-shaped cross-sectional profile.

Figure 33:
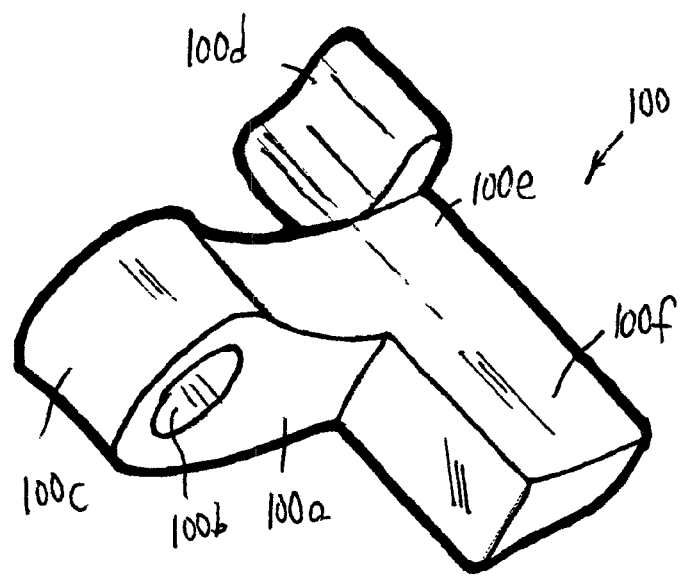
FIG. 33 is a perspective view of the cable carrier pawl viewed from the left side.
Figure 34:
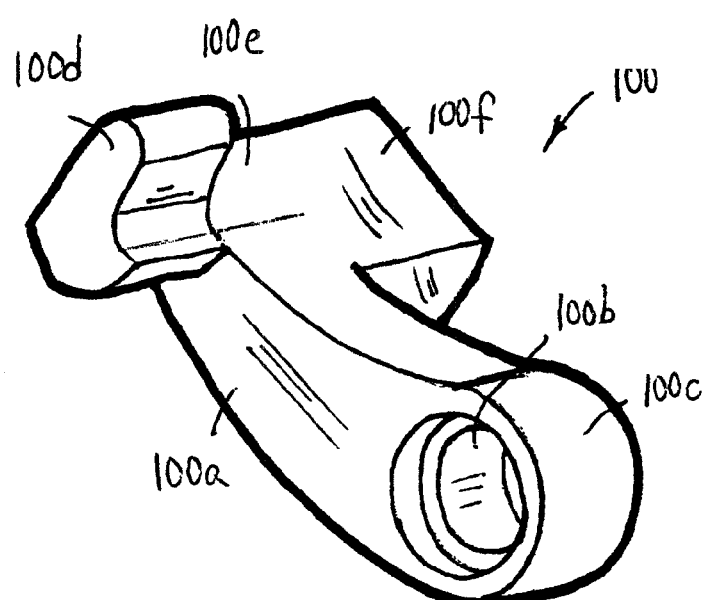
FIG. 34 is a perspective view of the cable carrier pawl viewed from the right side.

A cable carrier pawl 100, shown best in FIGS. 33 and 34, is provided for engaging lower gear teeth 95. Specifically, cable carrier pawl 100 includes a curved lever 100*a* having an opening 100*b* at one end 100*c* thereof which is fixedly mounted on a post 102. Alternatively, post 102 can be made an integral part of cable carrier pawl 100. An upwardly extending catch 100*d* is formed at the opposite end 100*e* of curved upper lever 100*a* and extends from one side therefrom. Cable carrier pawl 100 further includes a generally rectangular parallelepiped extension 100*f* which extends from the opposite side of end 100*e*.

Figure 37:
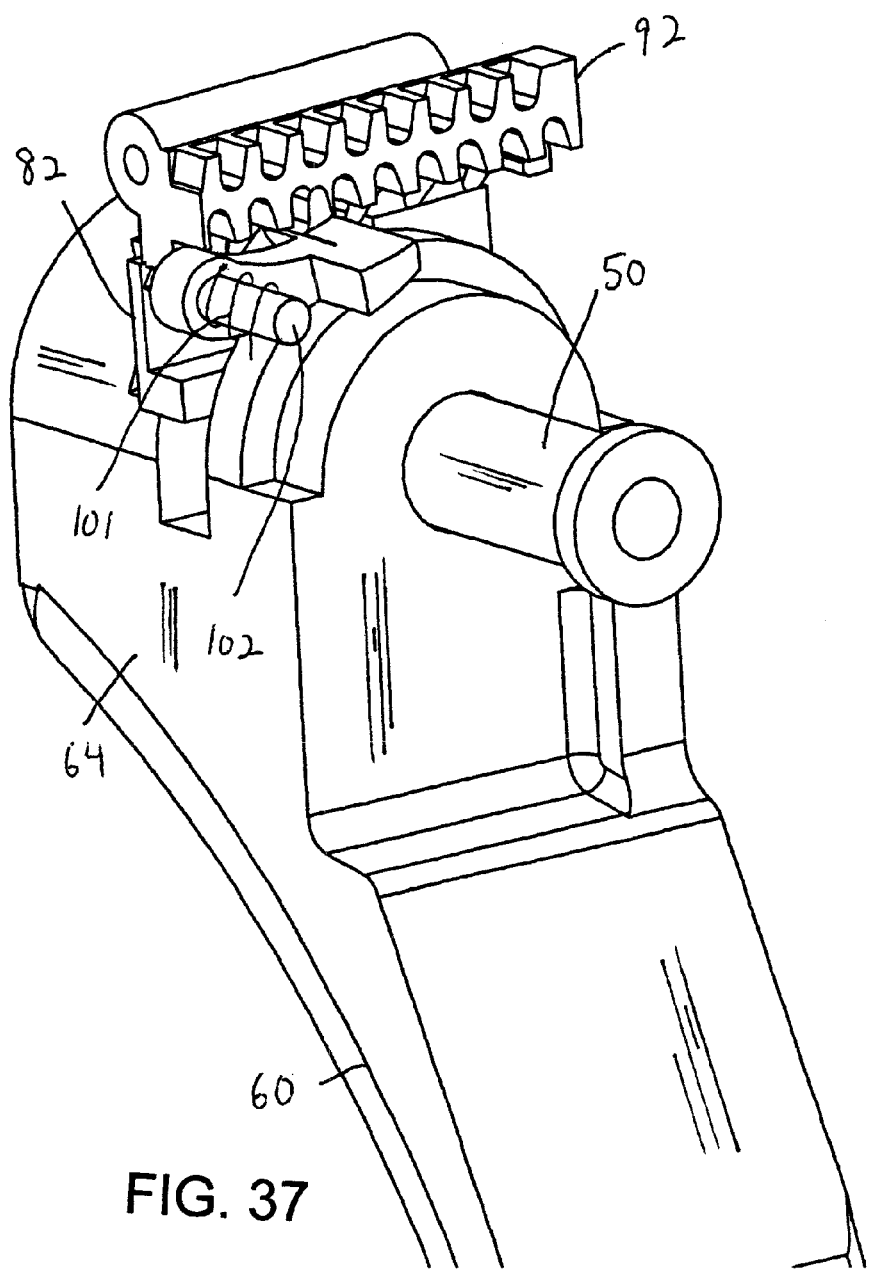
FIG. 37 is a perspective view showing the relation of the shift control mechanism relative to the combination shift/brake lever, viewed from the rear and right side.
Figure 38:
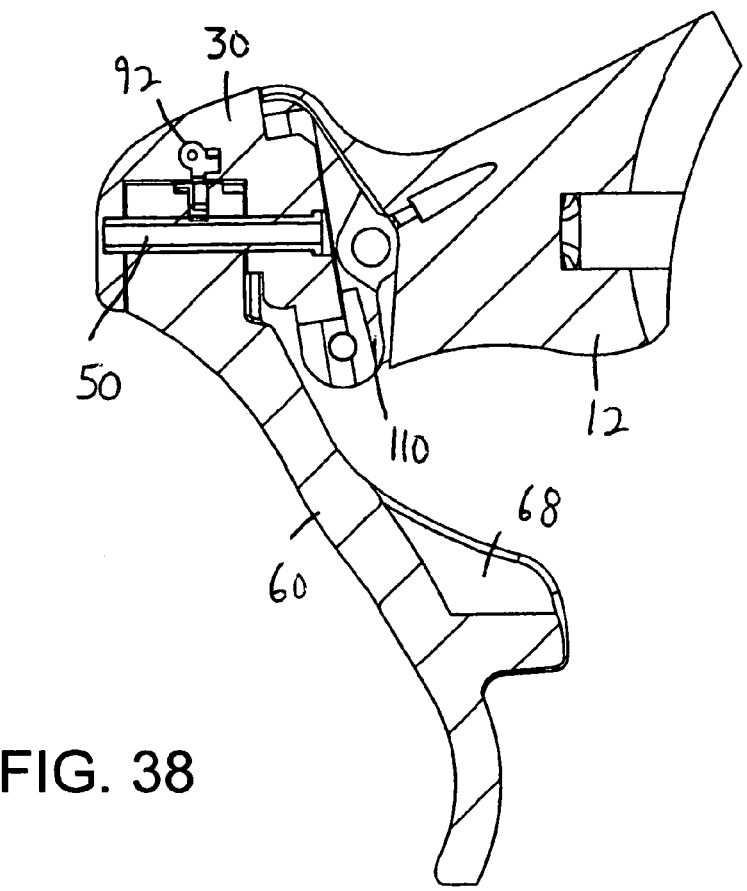
FIG. 38 is a cross-sectional view of the combination shift and brake lever arrangement, taken along line 38-38 of FIG. 1C.
Figure 39:
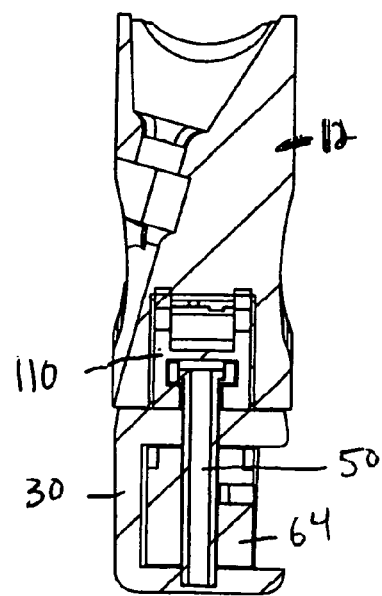
FIG. 39 is a cross-sectional view of the combination shift and brake lever arrangement, taken along line 39-39 of FIG. 1C.
Figure 40:
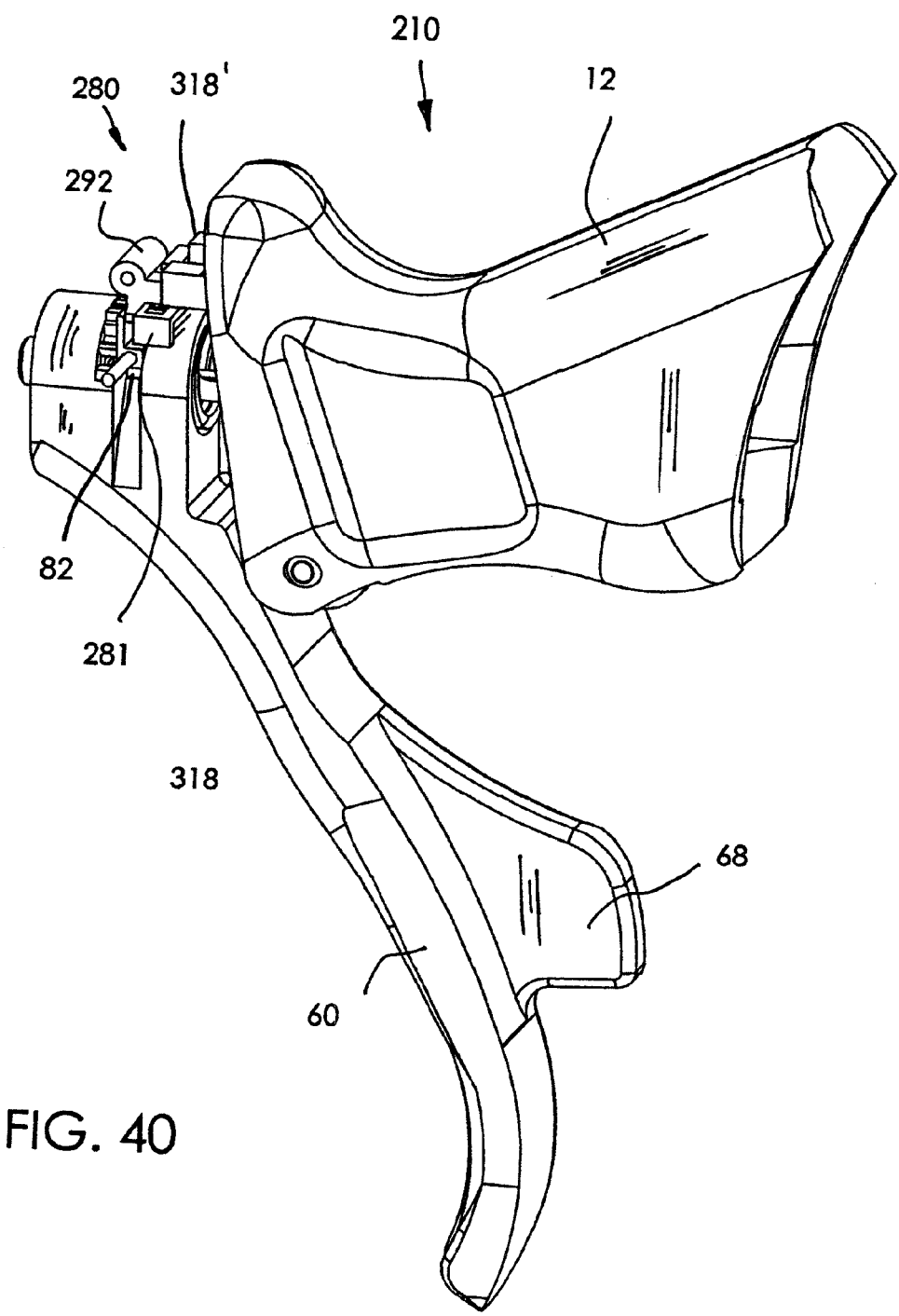
FIG. 40 is a perspective view of a combination shift and brake lever arrangement for a bicycle according to a second embodiment of the present invention, viewed from the top and right side thereof, with the carrier housing removed.
Figure 41:
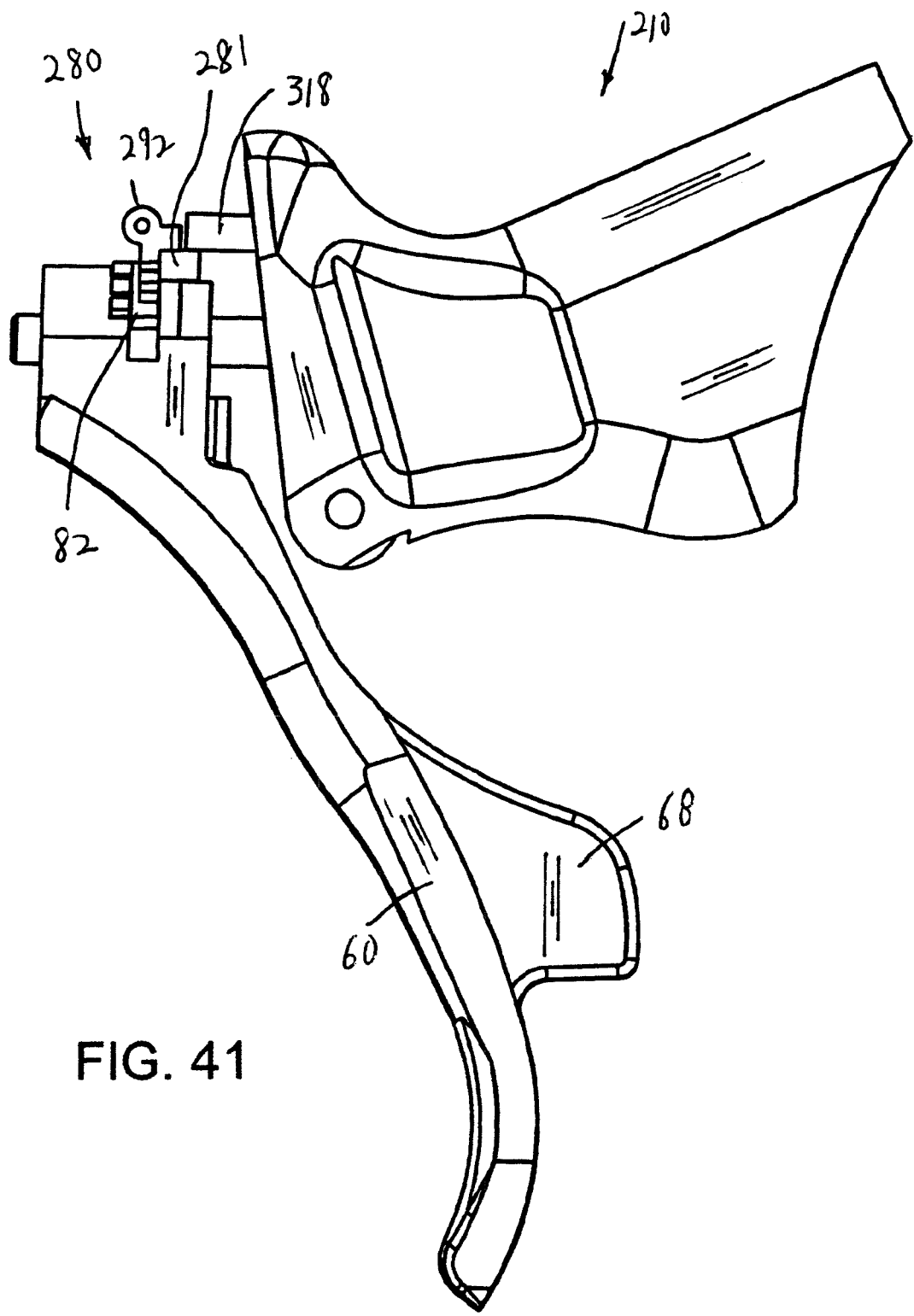
FIG. 41 is a right side elevational view of the combination shift and brake lever arrangement of FIG. 40.
Figure 42:
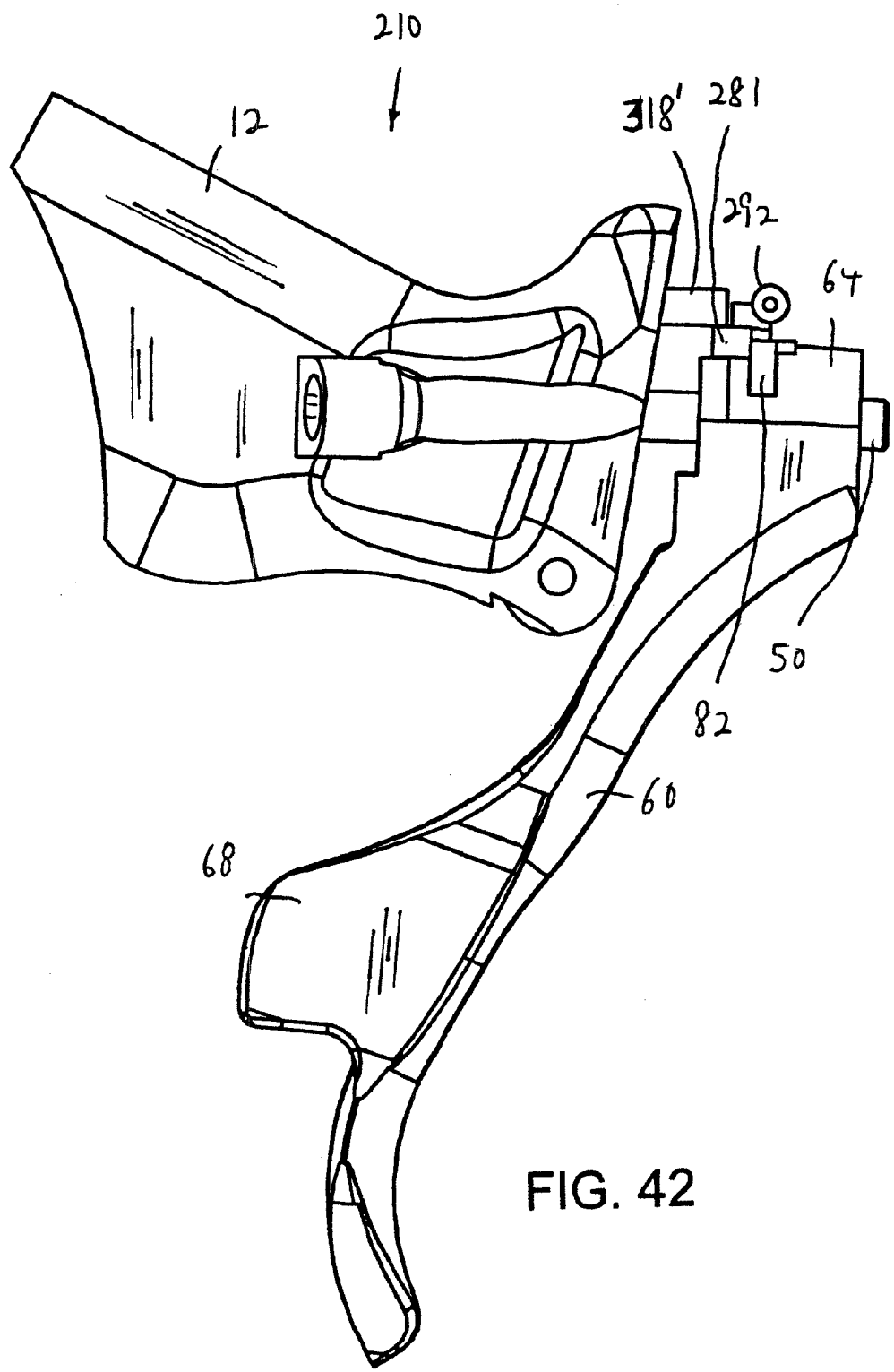
FIG. 42 is a left side elevational view of the combination shift and brake lever arrangement of FIG. 40.
Figures 43, 44:
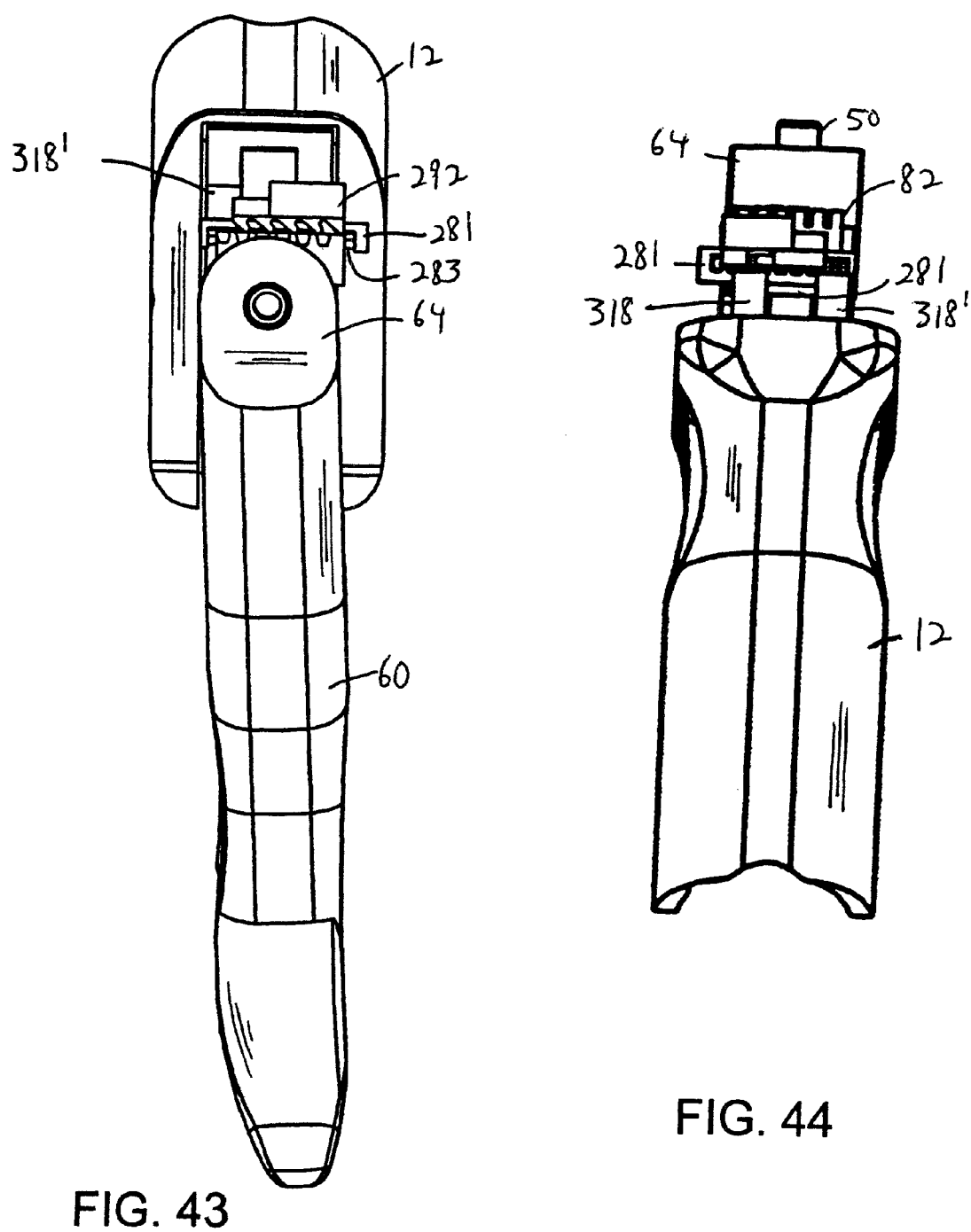
FIG. 43 is a front elevational view of the combination shift and brake lever arrangement of FIG. 40.
FIG. 44 is a top plan view of the combination shift and brake lever arrangement of FIG. 40.
Figure 45:
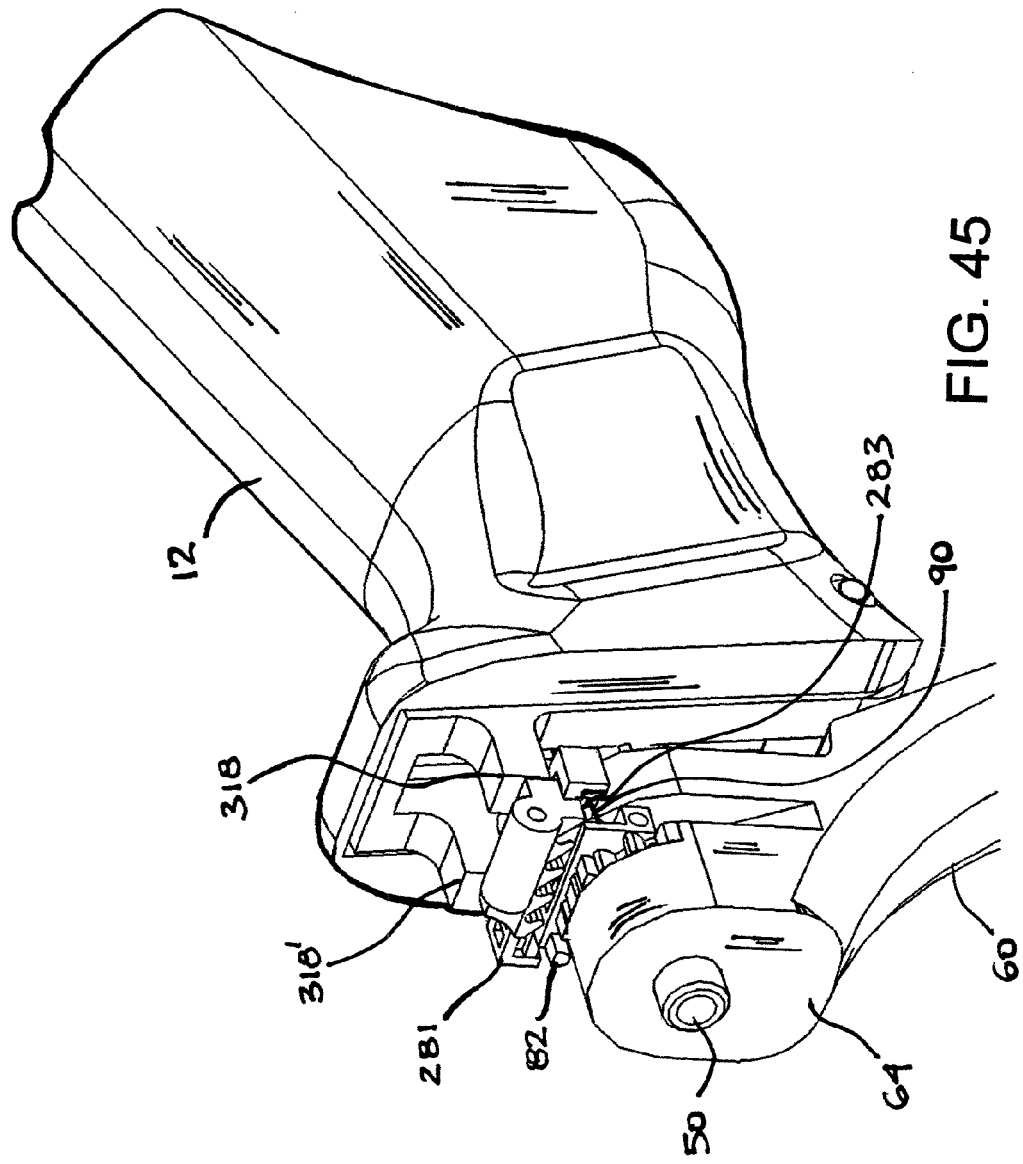
FIG. 45 is an enlarged perspective view of the combination shift and brake lever arrangement of FIG. 40, viewed from the front and right side.
Figure 46:
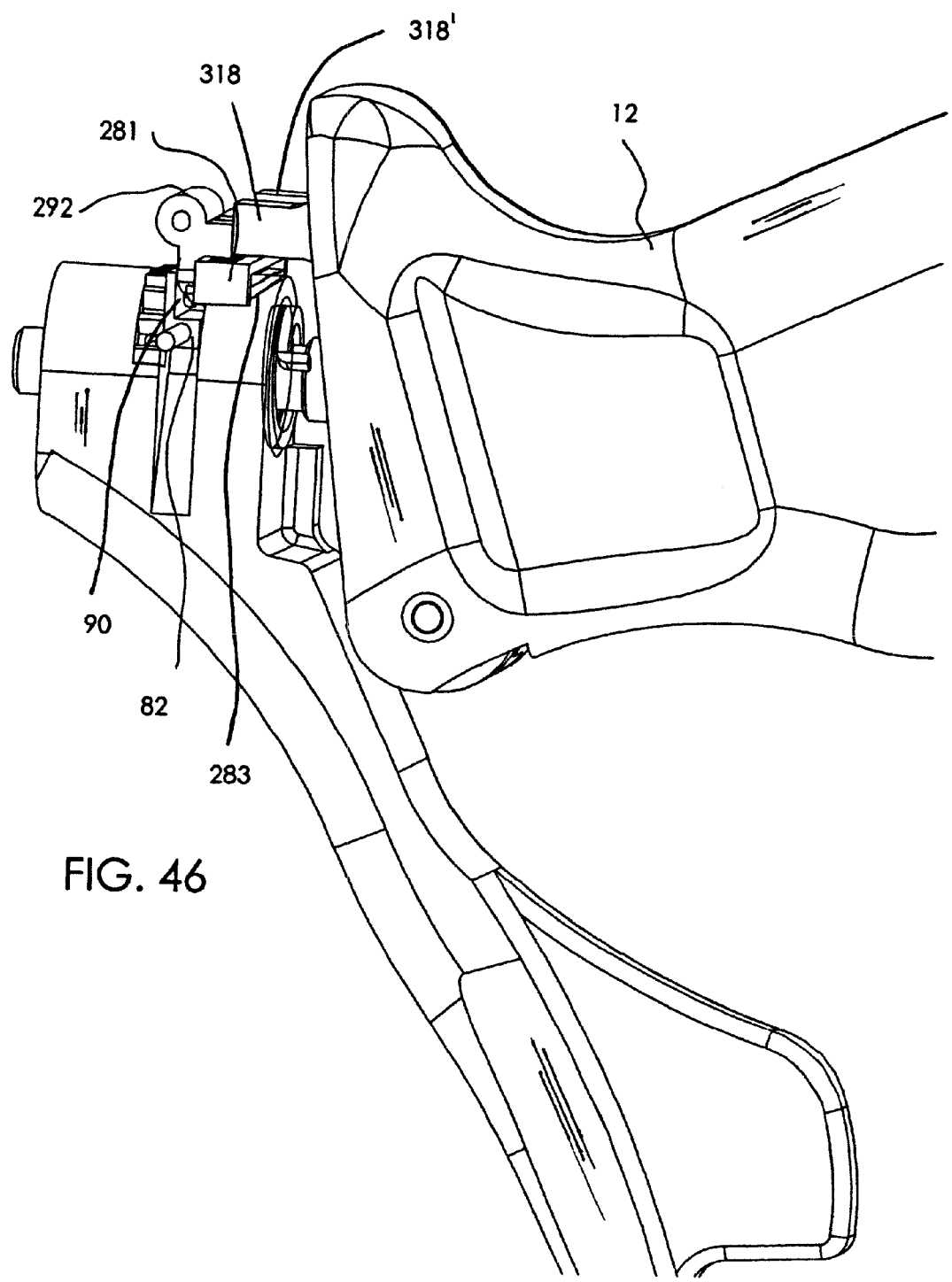
FIG. 46 is an enlarged perspective view of the combination shift and brake lever arrangement of FIG. 40, viewed from the rear and right side.

Post 102 is rotatably mounted in small through bore 56, such that catch 100*d* is positioned below lower gear teeth 95 of cable carrier rack 92 for engagement therewith. A torsion spring 101 (FIG. 37) is also mounted between carrier housing 30 and cable carrier pawl 100 for normally biasing catch 100*d* in an upward direction into engagement with lower gear teeth 95.

Figure 35:
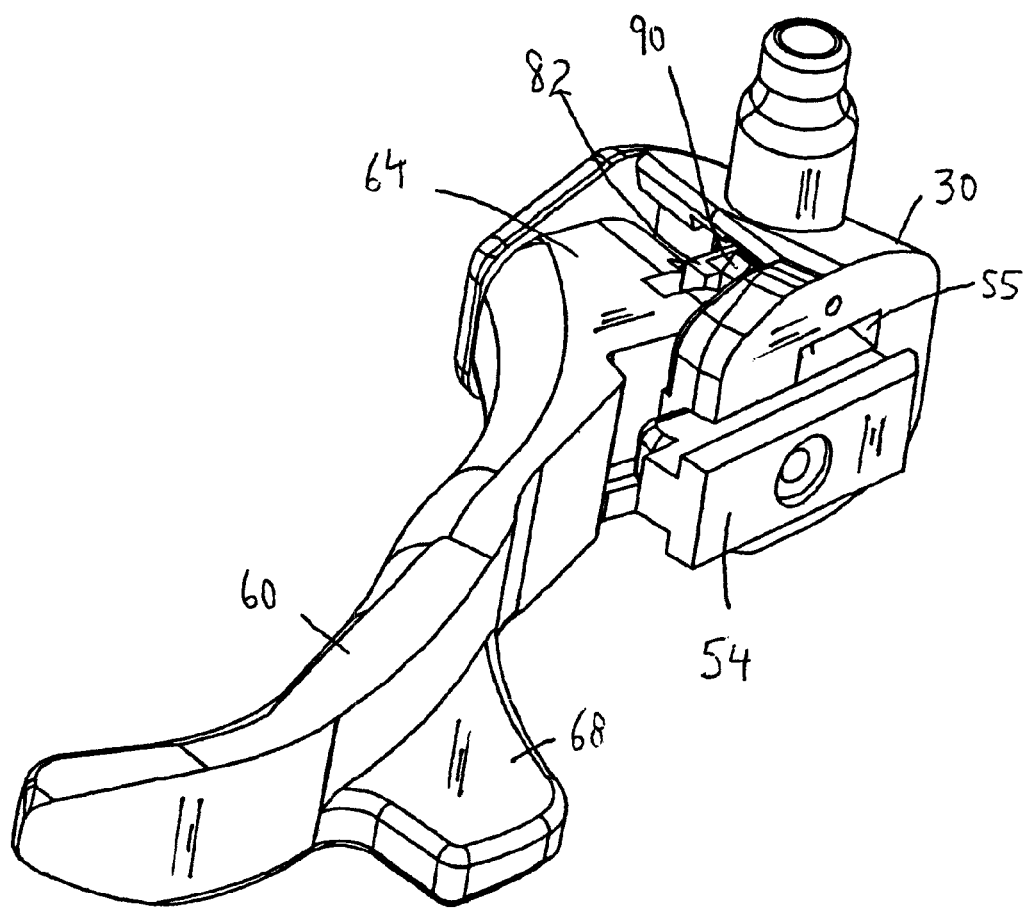
FIG. 35 is a perspective view showing the relation of the shift control mechanism and carrier housing relative to the combination shift/brake lever, viewed from bottom.

Further, in this arrangement, hold down pin 118*a* of brake housing 110 is positioned immediately above upper gear teeth 98. A coil spring (not shown) between the carrier housing 30 and brake housing 110 normally biases carrier housing 30 down relative to brake housing 110. This can be positioned, for example, in rectangular opening 55. It will be appreciated that shift/brake lever 60 is also biased down with carrier housing 30. As a result, hold down pin 118*a* is normally out of engagement with upper gear teeth 98. However, catch 100*d* of cable carrier pawl 100 is normally in engagement with a lower gear tooth 95 to hold actuating rack 82 in position corresponding to a fixed bicycle gear. Hold down extension 118 is positioned directly above extension 100*f* of cable carrier pawl 100, but does not interfere with the tooth engagement by cable carrier pawl 100 at this time. The operation of combination shift and brake lever arrangement 10 will now be discussed in relation to FIGS. 34-36.

First, for a braking operation, when shift/brake lever 60 is grasped and pulled toward the person, carrier housing 30 is caused to pivot relative to main housing 12 around pivot pin 36. This results in a pulling of the brake cable connected to the yoke in brake housing 110, and a resultant braking operation. Torsion spring 31 connected between main housing 12 and brake housing 110 normally brings shift/brake lever 60, along with carrier housing 30 and brake housing 110 back to a neutral position shown in FIG. 1A after a pivoting force which has been applied by the user thereto to perform a braking operation is removed.

Second, for a shifting operation in a first direction, when a person pivots combination shift/brake lever 60 about pivot pin 50, gear teeth 64*d* of enlarged head 64 of shift/brake lever 60 engage with gear teeth 86 of actuating rack 82 to move actuating rack 82 in transverse groove 64*b* of enlarged head 64. As a result, carrier pull pawl 90 is no longer restrained by hold down tab 58, so that spring 91 associated therewith rotates pawl lever 90*a* about post 88 to move pawl catch 90*c* upwardly to engage inclined gear teeth 96 of cable carrier rack 92. As actuating rack 82 continues moving, carrier pull pawl 90 pulls cable carrier rack 92 with it. At this time, because of the U-shaped inclination of lower gear teeth 95 of cable carrier rack 92, this movement of cable carrier rack 92 forces catch 100*d* of cable carrier pawl 100 out of engagement with its then engaged lower gear tooth 95 and into engagement with the next lower gear tooth 95.

When the biasing force on shift/brake lever 60 is released, torsion spring 61 associated therewith moves shift/brake lever 60 back to its neutral position. At this time, gear teeth 64*d* of enlarged head 64 of shift/brake lever 60 engage with gear teeth 86 of actuating rack 82 to move actuating rack 82 back to its original position in transverse groove 64b of enlarged head 64. Because of the inclination of gear teeth 96, pawl catch 90c of pawl 90 rides over teeth 96 in a ratchet like manner until shift/brake lever 60 returns to its neutral unbiased position where hold down wall 58 once again engages upwardly inclined surface 90d of pawl 90 to rotate pawl lever 90 in the opposite direction such that lower end surface 90b once again rests on floor 84c of rectangular cut-away section 84a. As a result, pawl catch 90c is moved down out of engagement with inclined gear teeth 96. However, at this time, cable carrier rack 92 has already moved the distance of one gear, where it is locked in position by catch 100d. As a result of this operation, cable carrier rack 92 has been moved by a distance of one tooth 95 which changes the tension on the shift cable, causing a change of one gear at the respective derailleur.

Third, to provide a reverse shifting operation, the person's thumb pushes up on concave underside 68a of rear finger extension 68. At this time, carrier pull pawl 90 is held down by hold down wall 58. Because of the sliding relation between carrier housing 30 and brake housing 110 through T-shaped parallelepiped guide 54 and central longitudinal recesses 112, shift/brake lever 60 and carrier housing 30 slide up relative to brake housing 110. At this time, hold down extension 118 of brake housing 110 engages extension 100f of cable carrier pawl 100 during its upward travel with carrier housing 30, and thereby disengages catch 100d thereof from lower gear teeth 95. At the same time, however, hold down pin 118a is moved into locking engagement with one upper gear tooth 98. It will be appreciated that hold down pin 118a is offset by one-half of a gear tooth 98. As a result, during this engagement of an upper gear tooth 98 by hold down pin 118a, hold down pin 118a serves to move cable carrier rack 92 by one half gear tooth. When shift/brake lever 60 is released, the coil spring between carrier housing 30 and brake housing 110 pushes carrier housing 30 and shift/brake lever 60 back down relative to brake housing 110. This means that hold down pin 118a disengages from upper gear teeth 98. However, at the same time, extension 110f of cable carrier pawl 100 is no longer held down by hold down extension 118.

The tension on the shift cable connected to cable carrier rack 92 results in cable carrier rack 92 being moved in the reverse direction. At this time, torsion spring 101 associated therewith biases catch 100d of cable carrier pawl 100 into engagement with the next lower gear tooth 95. Because of the one-half gear differential position between catch 100d and hold down pin 118a, catch 100d is one-half gear out of position. Therefore, when it engages with the next lower gear tooth 95, it moves cable carrier rack 92 another one-half gear step, and locks cable carrier rack 92 in position thereat. As a result of the two half gear movements of cable carrier rack 92, caused by hold down pin 118a and then by catch 100d, cable carrier rack 92 has been moved back by one gear.

It will therefore be appreciated that a single lever is provided for the three functions of braking, shifting gears in a first direction and shifting gears in a second opposite direction, thereby greatly simplifying the exposed construction and the operation thereof.

Further, although shift control mechanism 80 has been shown by pawls and racks, other internal shift control mechanisms can be used, for example, electronic, pneumatic or hydraulic.

Referring now to FIGS. 40-51, a combination shift and brake lever arrangement 210 including a shift control mechanism 280 according to a second embodiment of the present invention will now be discussed, in which elements corresponding to combination shift and brake lever arrangement 10 of the first embodiment are identified by the same reference numerals, but augmented by 200.

Specifically, shift control mechanism 280 includes a main housing 12, carrier housing 30, combination shift/brake lever 60, actuating rack 82 and carrier pull pawl 90 which are identical with the corresponding elements of shift control mechanism 80 and are therefore numbered the same. Accordingly, a detailed discussion thereof will be omitted for the sake of brevity.

Cable carrier rack 292, on the other hand, differs from cable carrier rack 92 by the omission of lower gear teeth 95 and upper gear teeth 98. Cable carrier rack 292 is slidably held in rear rectangular guides 38c and 40c. As shown best in FIGS. 47 and 48, cable carrier rack 292 is formed by a substantially cylindrical block 294 having a central through bore 294a. A shift cable-(not shown) extends from a derailleur through tubular guide 52 and then through cylindrical block 294 where it is tied. As a result, movement of cable carrier rack 292 also results in movement of the shift cable in order to change gears at the derailleur. Inclined gear teeth 296 extend downwardly from the lower side of cylindrical block 294, with gear teeth 296 having the same angle of inclination as the pawl catch 90a of pawl 90 and being adapted to be engaged by the pawl catch 90a of pawl 90. Cable carrier rack 292 also includes a rectangular parallelepiped block 297 on the opposite side thereof, which has a cut-out area 297a through which a transverse opening 292a is exposed.

Figure 49:
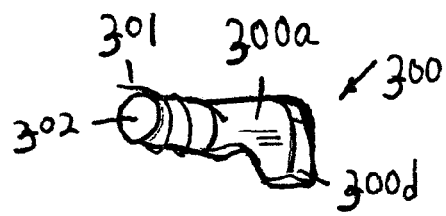
FIG. 49 is a perspective view of the cable carrier pawl of the second embodiment.

A cable carrier pawl 300, shown best in FIG. 49, is rotatably mounted in transverse opening 292a. Cable carrier pawl 300 includes a curved lever 300a having a post 302 integrally fixed at one end thereof. A downwardly extending catch 300d is formed at the free end of curved upper lever 300a and extends down therefrom at an angle of about ninety degrees. Post 302 is rotatably mounted in transverse opening 292a of cable carrier rack 292 such that curved lever 300a is positioned within cut-out area 297a. A torsion spring 301 (FIG. 49) is also mounted around post 302 for connection between cable carrier rack 292 and cable carrier pawl 300 for normally biasing catch 300d in a downward direction into engagement with teeth to be described hereafter.

Figure 50:
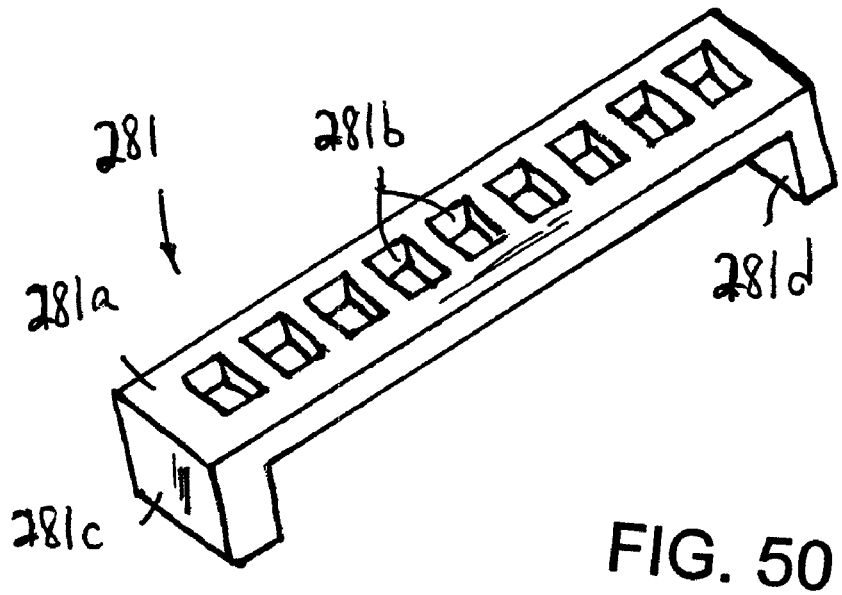
FIG. 50 is a perspective view of the pawl index grate.

In accordance with the second embodiment, shift control mechanism 280 includes a pawl index grate 281, shown best in FIG. 50, formed by a rectangular plate 281a having a plurality of rectangular openings 281b evenly spaced therealong, and opposite legs 281c and 281d which are fixed in carrier housing 30 such that openings 281b are positioned immediately below rectangular parallelepiped block 297 and cable carrier pawl 300. In this manner, catch 300d can extend into engagement with one opening 281b to lock cable carrier rack 292 in position corresponding to a desired bicycle gear.

Figure 51:
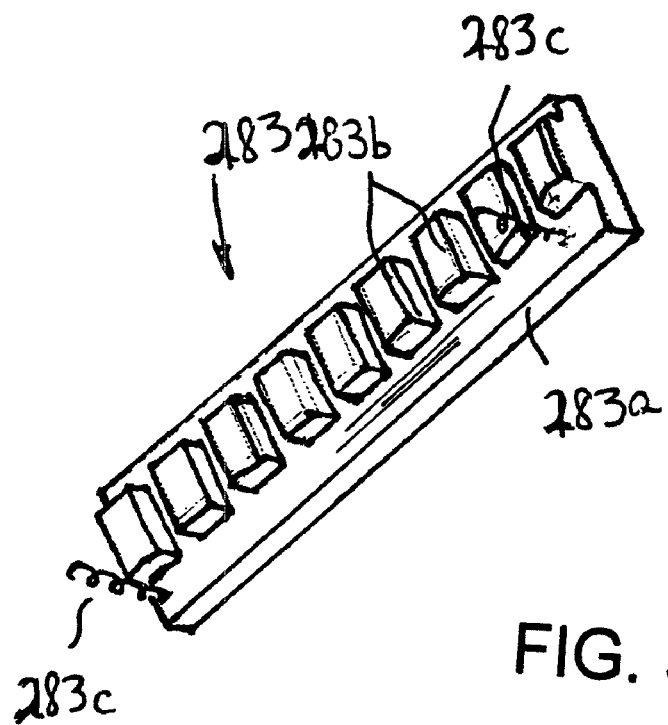
FIG. 51 is a perspective view of the pawl grate release.
Figure 52:
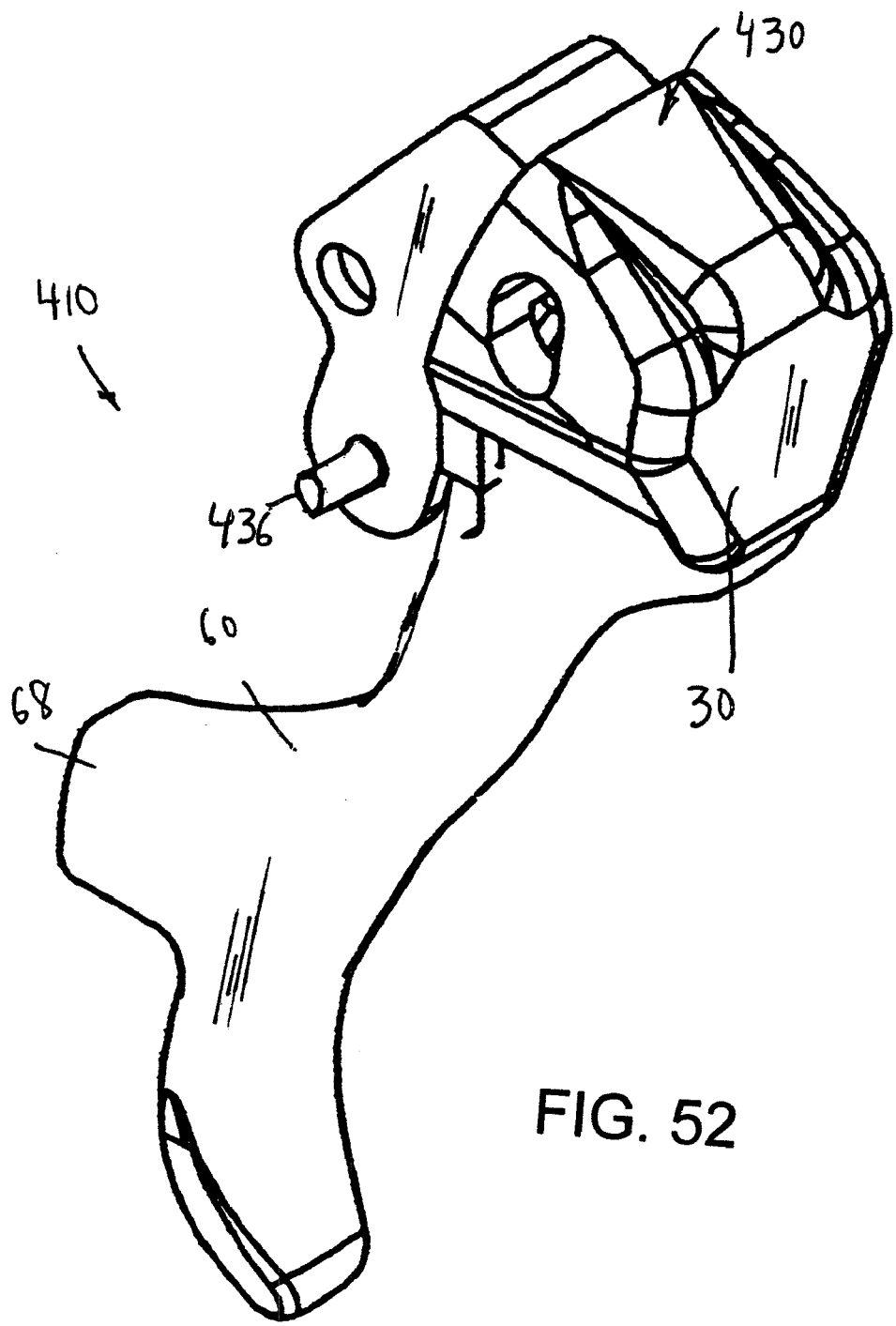
FIG. 52 is a perspective view of a combination shift and brake lever arrangement for a bicycle according to a third embodiment of the present invention, viewed from the top and right side thereof, detached from the main housing.
Figure 53:
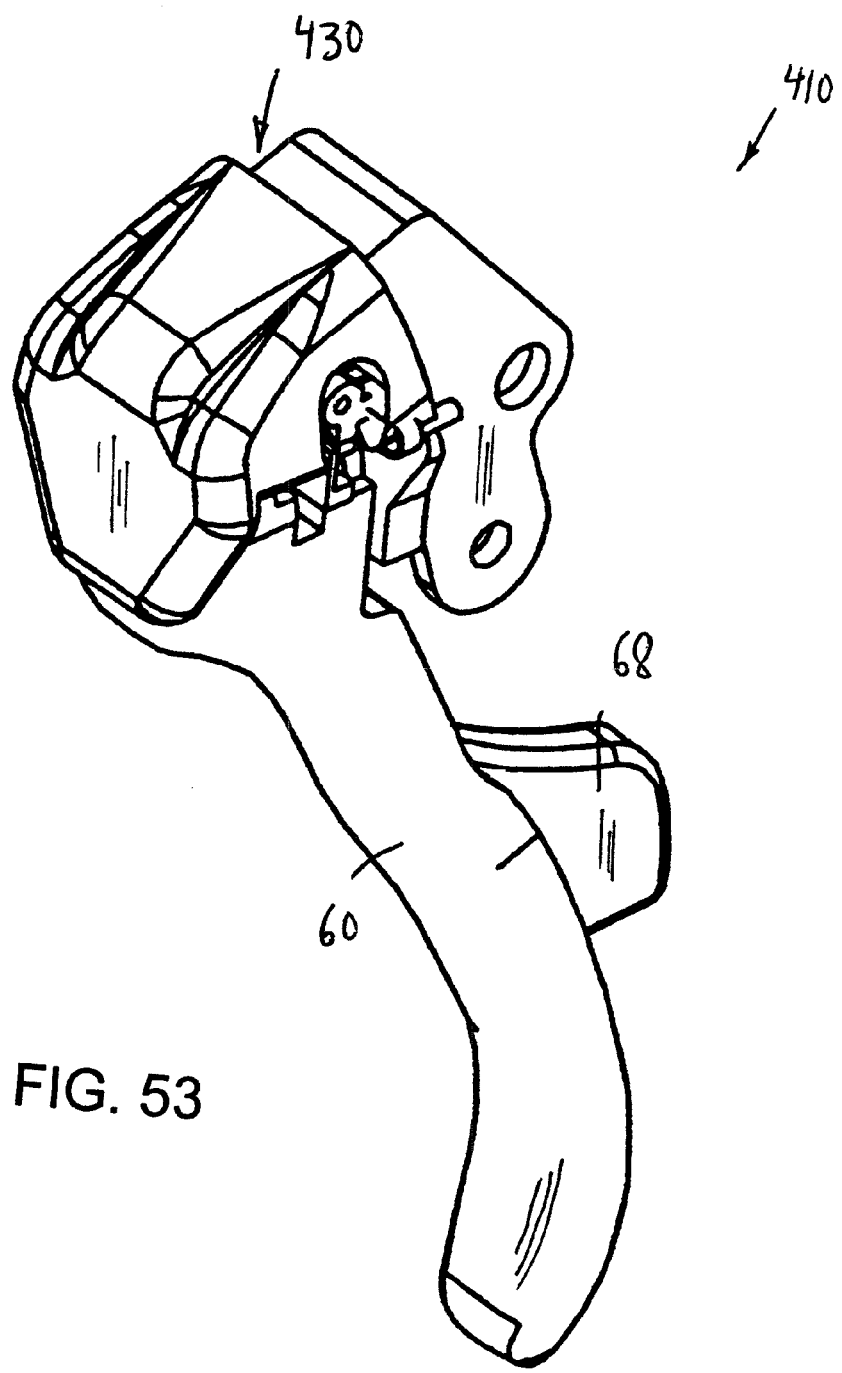
FIG. 53 is a perspective view of the combination shift and brake lever arrangement of FIG. 52, viewed from the top and left side thereof.
Figure 54:
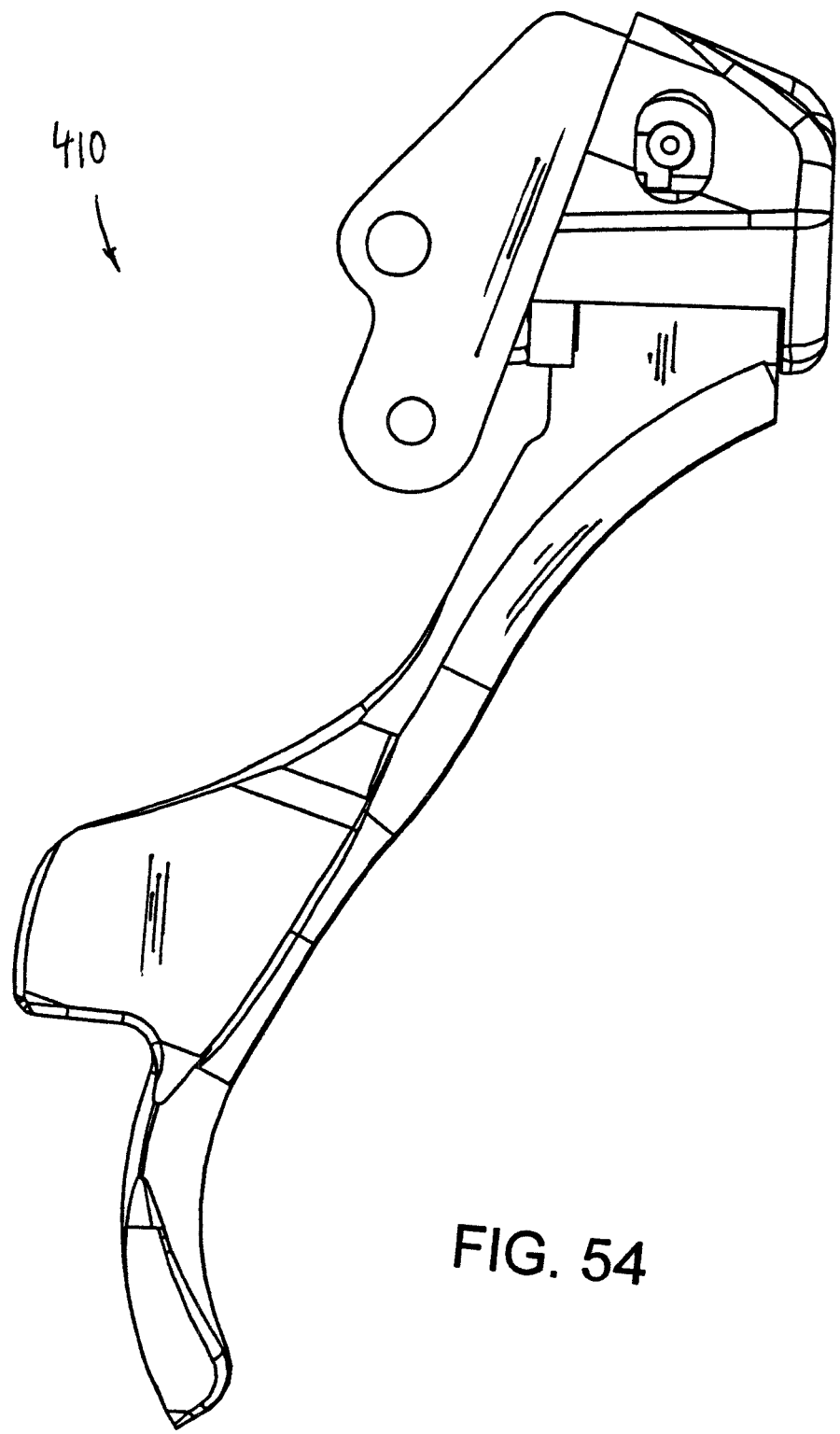
FIG. 54 is a right side elevational view of the combination shift and brake lever arrangement of FIG. 52.
Figure 55:
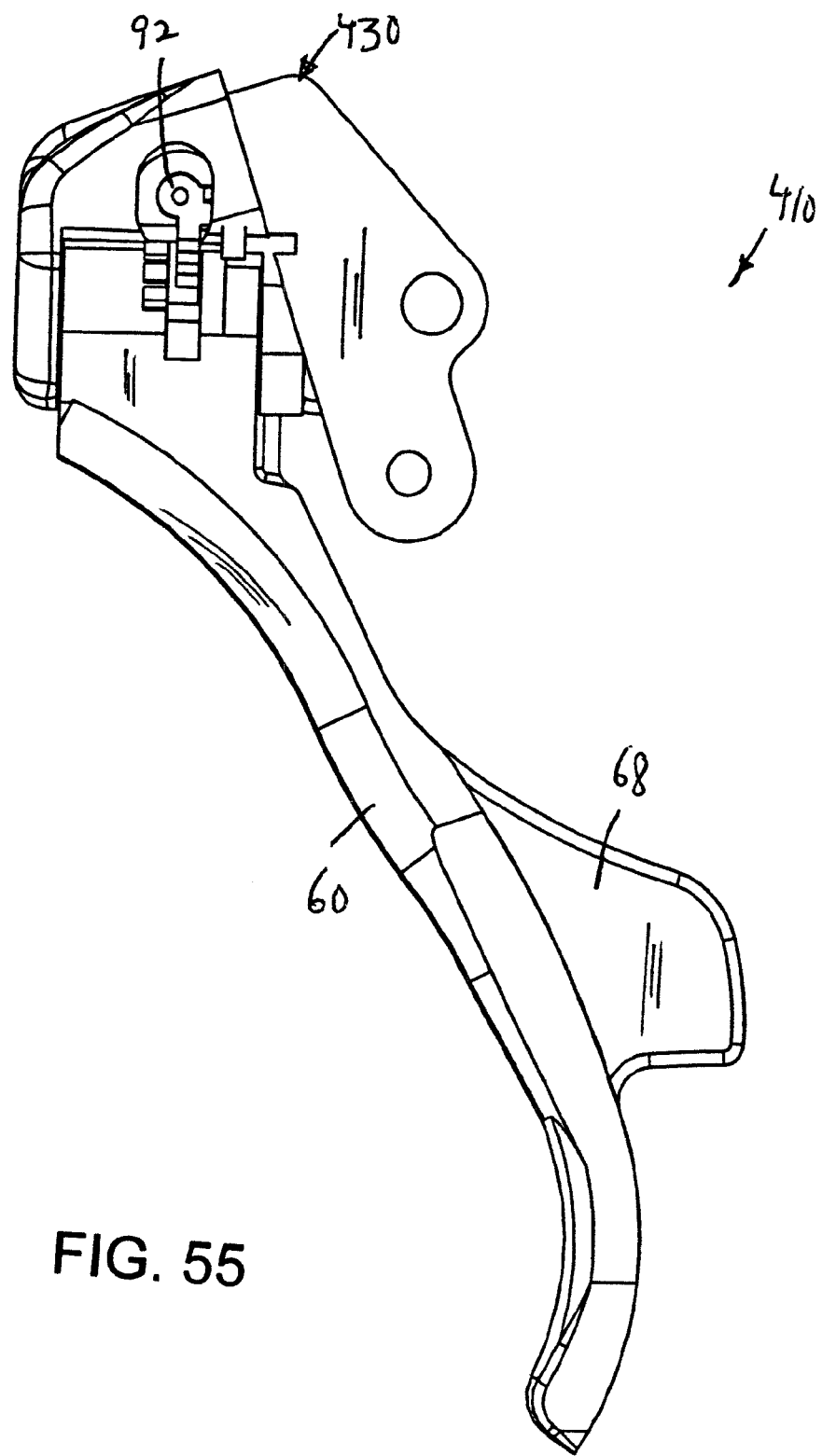
FIG. 55 is a left side elevational view of the combination shift and brake lever arrangement of FIG. 52.
Figures 56, 57:
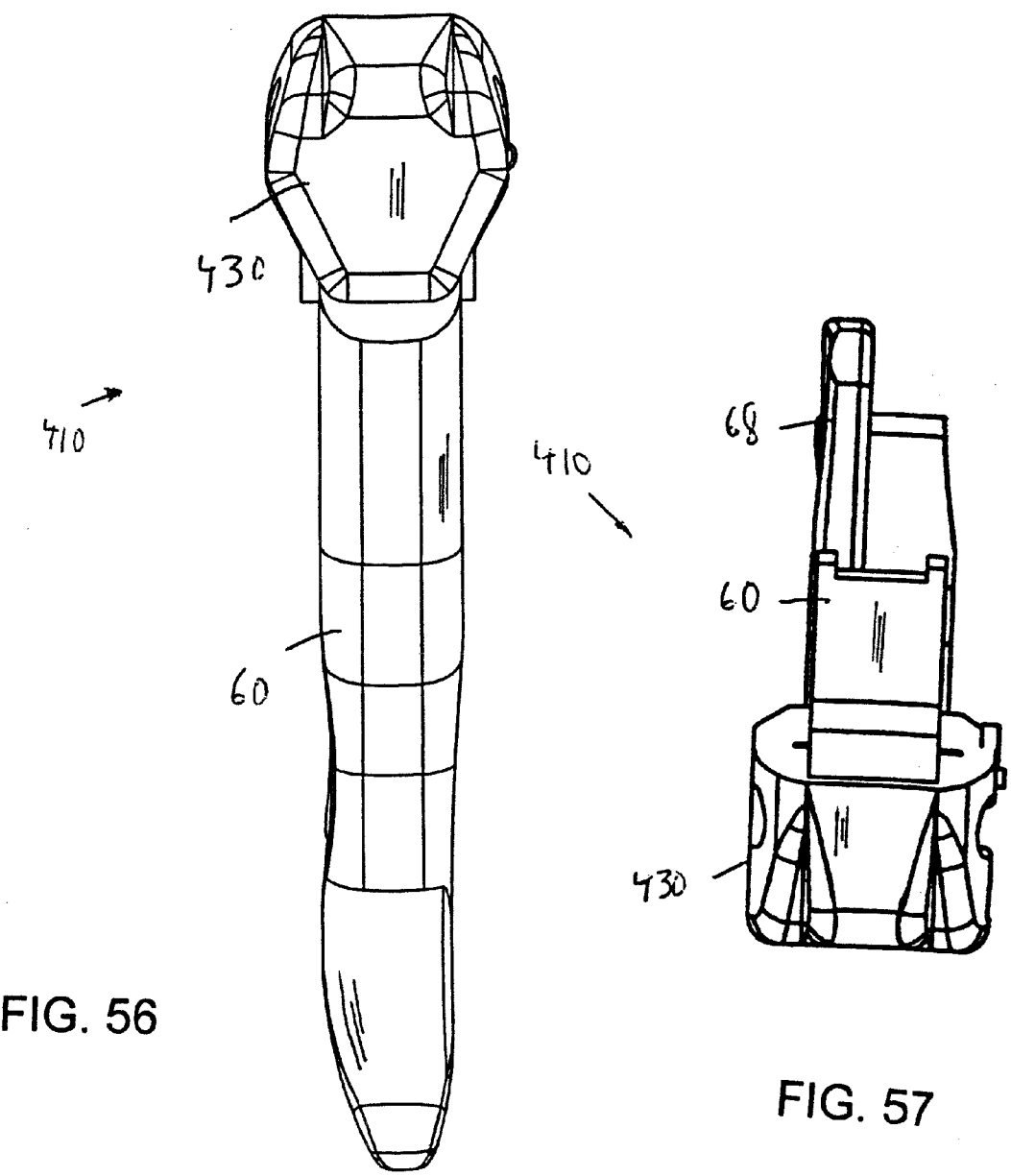
FIG. 56 is a front elevational view of the combination shift and brake lever arrangement of FIG. 52.
FIG. 57 is a top plan view of the combination shift and brake lever arrangement of FIG. 52.
Figure 58:
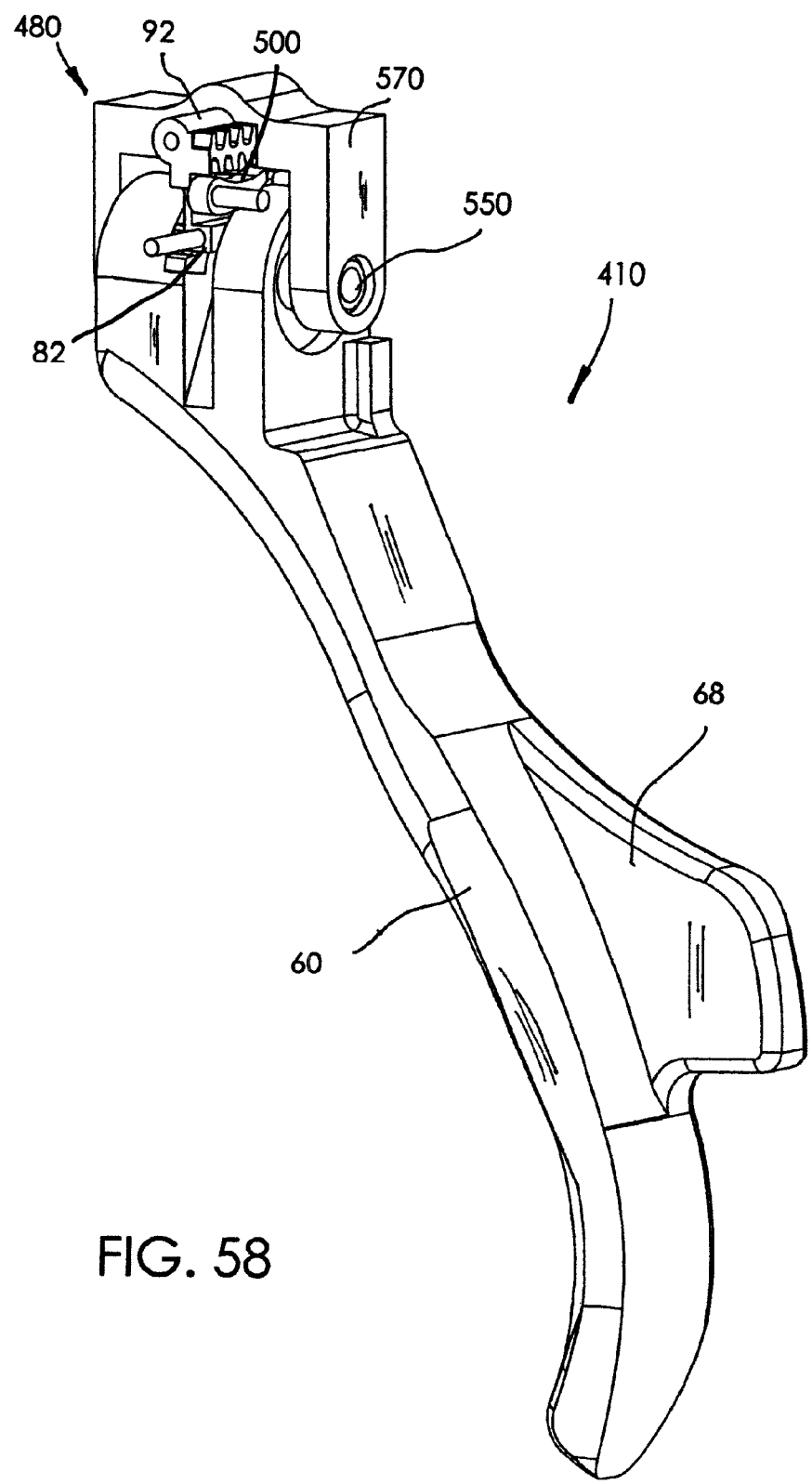
FIG. 58 is a perspective view of the combination shift and brake lever arrangement of FIG. 52, with the carrier housing removed.

A pawl grate release 283 shown in FIG. 51 is formed by a rectangular plate 283a having a plurality of rectangular parallelepiped projections 283b evenly spaced thereon and extending upwardly therefrom, with the same spacing, shape and dimensions as openings 281b so as to fit therein. The height of each projection 283b is greater than the height of each opening 281b so as to project above the upper surface of plate 281a when positioned therein. Rectangular plate 283a is positioned immediately above slightly enlarged head 74a of plunger rod 74, and immediately below pawl index grate 281, with coil springs 283c at opposite ends and in engagement with pawl index grate 281 for normally biasing pawl grate release 283 away from pawl index grate 281.

In addition, brake housing 310 is the same as brake housing 110, except that hold down pin 118a is eliminated, hold down extension 318 extends forwardly in an almost perpendicular manner from an upper portion of the front edge of the right side wall 312, and another hold down extension 318' extends forwardly in an almost perpendicular manner from an upper portion of the front edge of the left side wall 312'.

Carrier housing 30 mounts to brake housing 310 in the same sliding manner as carrier housing 30 to brake housing 110 of the first embodiment.

The braking operation is the same as the first embodiment.

For a shifting operation, when a person pivots combination shift/brake lever 60 about pivot pin 50, gear teeth 64d of enlarged head 64 of shift/brake lever 60 engage with gear teeth 86 of actuating rack 82 to move actuating rack 82 in transverse groove 64b of enlarged head 64. As a result, carrier pull pawl 90 is no longer restrained by hold down wall 58, so that spring 91 associated therewith rotates pawl lever 90a about post 88 to move pawl catch 90c upwardly to engage inclined gear teeth 296 of cable carrier rack 292. As actuating rack 82 continues moving, carrier pull pawl 90 pulls cable carrier rack 292 with it. This movement of cable carrier rack 292 forces catch 300d of cable carrier pawl 300 out of engagement with its then engaged opening 281b of pawl index grate 281, riding up over pawl index grate 281 and into engagement with the next opening 281b. The inclinations of the walls of openings 281b and catch 300d are arranged to provide for such movement, in a similar manner to downwardly extending catch 100d and upper gear teeth 98 of the first embodiment.

When the biasing force on shift/brake lever 60 is released, torsion spring 61 associated therewith moves shift/brake lever 60 back to its neutral position. At this time, gear teeth 64d of enlarged head 64 of shift/brake lever 60 engage with gear teeth 86 of actuating rack 82 to move actuating rack 82 back to its original position in transverse groove 64b of enlarged head 64. Because of the inclination of gear teeth 296, pawl catch 90c of pawl 90 rides over teeth 296 in a ratchet like manner until shift/brake lever 60 returns to its neutral unbiased position where inclined surface 58a of hold down tab 58 once again engages upwardly inclined surface 90d of pawl 90 to rotate pawl lever 90 in the opposite direction such that lower end surface 90b once again rests on floor 84c of rectangular cut-away section 84a. As a result, pawl catch 90c is moved down out of engagement with inclined gear teeth 296. However, at this time, cable carrier rack 292 has already moved the distance of one gear, where it is locked in position by catch 300d. As a result of this operation, cable carrier rack 292 has been moved by a distance to change the tension on the shift cable, causing a change of one gear at the respective derailleur.

To provide a reverse shifting operation, the person's thumb pushes up on concave underside 68a of rear finger extension 68. At this time, carrier pull pawl 90 is held down by hold down wall 58. Because of the sliding relation between carrier housing 30 and brake housing 310 through T-shaped parallelepiped guide 54 and the central longitudinal recesses in side walls 212, shift/brake lever 60 and carrier housing 30 slide up relative to brake housing 310. At this time, hold down extension 318 of brake housing 310 engages the upper surface of pawl index grate 281 and prevents movement thereof. However, the upward movement of shift/brake lever 60 carries pawl grate release 283 with it to move pawl grate release 283 upwardly such that rectangular parallelepiped projections 283b thereof enter rectangular openings 281b of pawl index grate 281. As a result, catch 300d of cable carrier pawl 300 is contacted by the upper surface of a projection 283b and is moved out of its respective opening 281b about the axis of post 302 on which it is mounted.

The tension on the shift cable connected to cable carrier rack 292 results in cable carrier rack 292 being moved in the reverse direction. However, rectangular parallelepiped projections 283b are pushed up such that upper surfaces thereof extend above the upper surface of rectangular plate 281a. Thus, as cable carrier rack 292 moves back, catch 300d of cable carrier pawl 300 rides over the top of the upper surface of the respective pushing projection 283b. Once it passes the respective pushing projection 283b, it is biased down again by torsion spring 301 so that it engages the side edge of the next projection 283b which extends above the upper surface of rectangular plate 281a, to prevent further movement of cable carrier rack 292.

Then, when shift/brake lever 60 is released, the torsion spring pushes carrier housing 30 (and thereby shift/brake lever 60 with it) relative to brake housing 310. Springs 283c then force pawl grate release 283 down and out of engagement with pawl index grate 281. At this time, catch 300d is no longer held by the side edge of a projection 283b of pawl grate release 283. This results in catch 300d being pivoted down into engagement with the next opening 281b of pawl index grate 281 as cable carrier rack 92 is further moved back. This results in a reverse changing of the derailleur gear to a different gear. As a result of this operation, cable carrier rack 92 has been moved by a distance which changes the tension on the shift cable, causing a reverse change of one gear at the respective derailleur.

Referring now to FIGS. 52-66, a combination shift and brake lever arrangement 410 including a shift control mechanism 480 according to a third embodiment of the present invention will now be discussed, in which elements corresponding to combination shift and brake lever arrangement 10 of the first embodiment are identified by the same reference numerals, but augmented by 400.

Specifically, shift control mechanism 480 includes a combination shift/brake lever 60, actuating rack 82, carrier pull pawl 90 and cable carrier rack 92 which are identical with the corresponding elements of shift control mechanism 80 and are therefore numbered the same. Accordingly, a detailed discussion thereof will be omitted for the sake of brevity.

Figure 59:
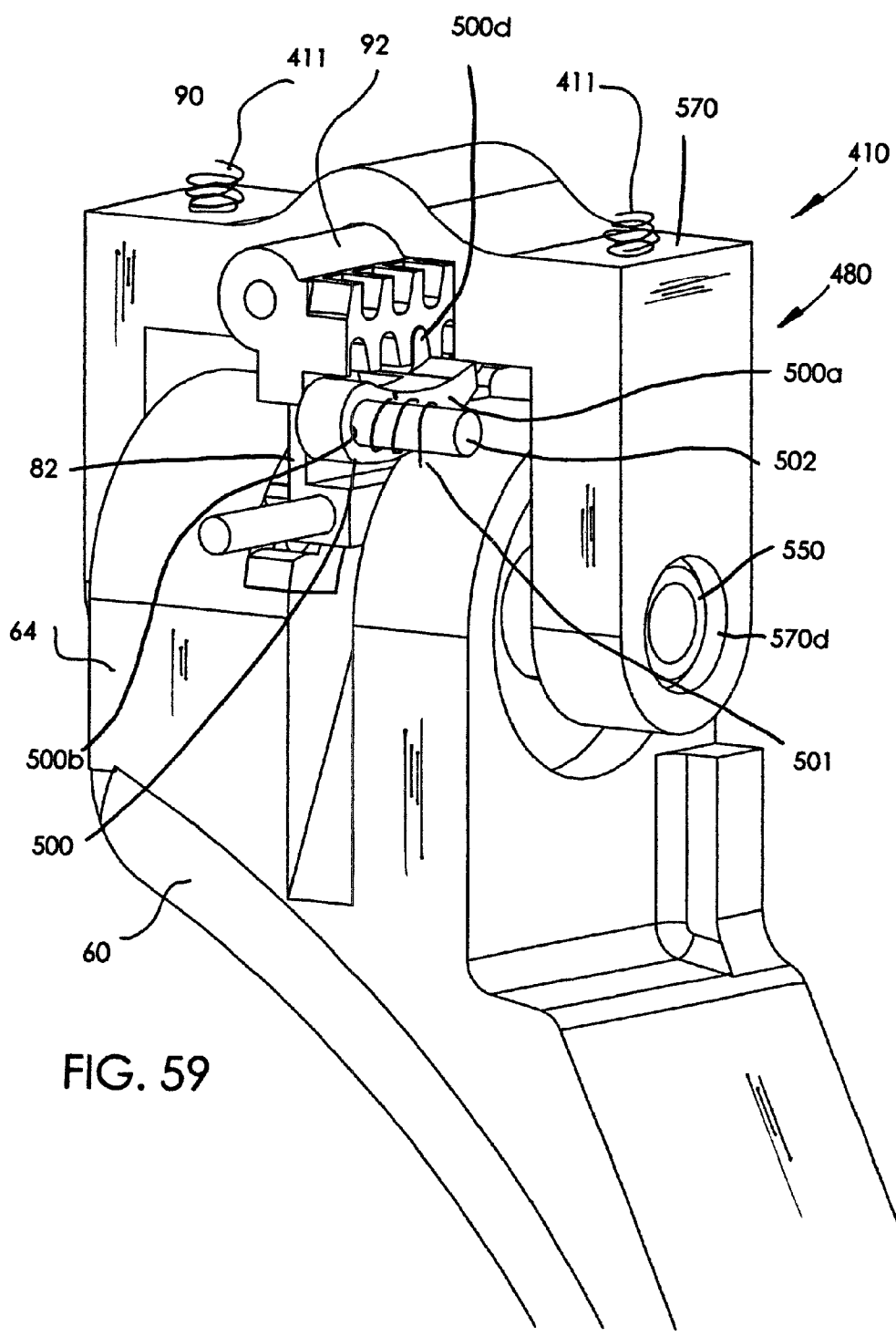
FIG. 59 is an enlarged perspective view of the shift mechanism of the combination shift and brake lever arrangement of FIG. 58.
Figure 65:
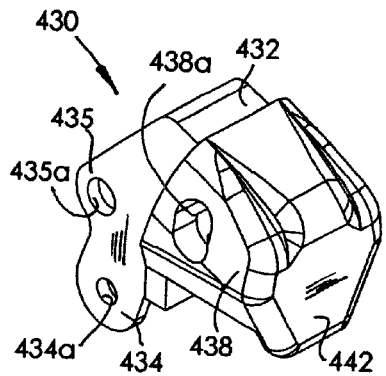
FIG. 65 is a perspective view of the carrier housing of the combination shift and brake lever arrangement of FIG. 52, viewed from the top and front thereof.
Figure 62:
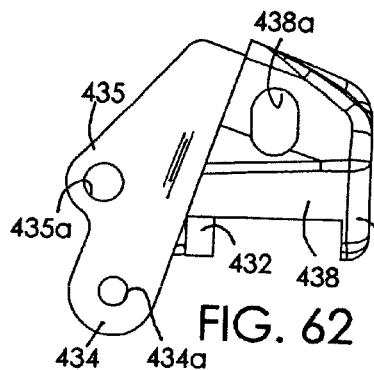
FIG. 62 is a right side elevational view of the carrier housing of the combination shift and brake lever arrangement of FIG. 52.
Figures 61, 63:
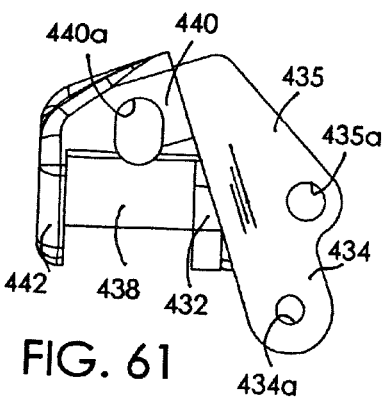
FIG. 61 is a right side elevational view of the carrier housing of the combination shift and brake lever arrangement of FIG. 52.
FIG. 63 is a front elevational view of the carrier housing of the combination shift and brake lever arrangement of FIG. 52.
Figure 60:
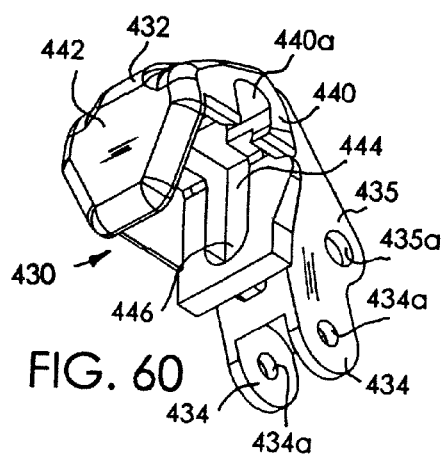
FIG. 60 is a perspective view of the carrier housing of the combination shift and brake lever arrangement of FIG. 52 from the bottom front, right side.

As shown best in FIG. 59, cable carrier pawl 500 is identical to cable carrier pawl 100, except that extension 100f is eliminated. Therefore, cable carrier pawl 500 includes a curved lever 500a having an opening 500b at one end thereof which is fixedly mounted on a post 502. Alternatively, post 502 can be made an integral part of cable carrier pawl 500. An upwardly extending catch 500d is formed at the opposite end of curved upper lever 500a and extends from one side therefrom.

Post 502 is rotatably mounted in carrier housing 530, such that catch 500d is positioned below lower gear teeth 95 of cable carrier rack 92 for engagement therewith. A torsion spring 501 is also mounted between carrier housing 530 and cable carrier pawl 500 for normally biasing catch 500d in an upward direction into engagement with lower gear teeth 95.

Figure 66:
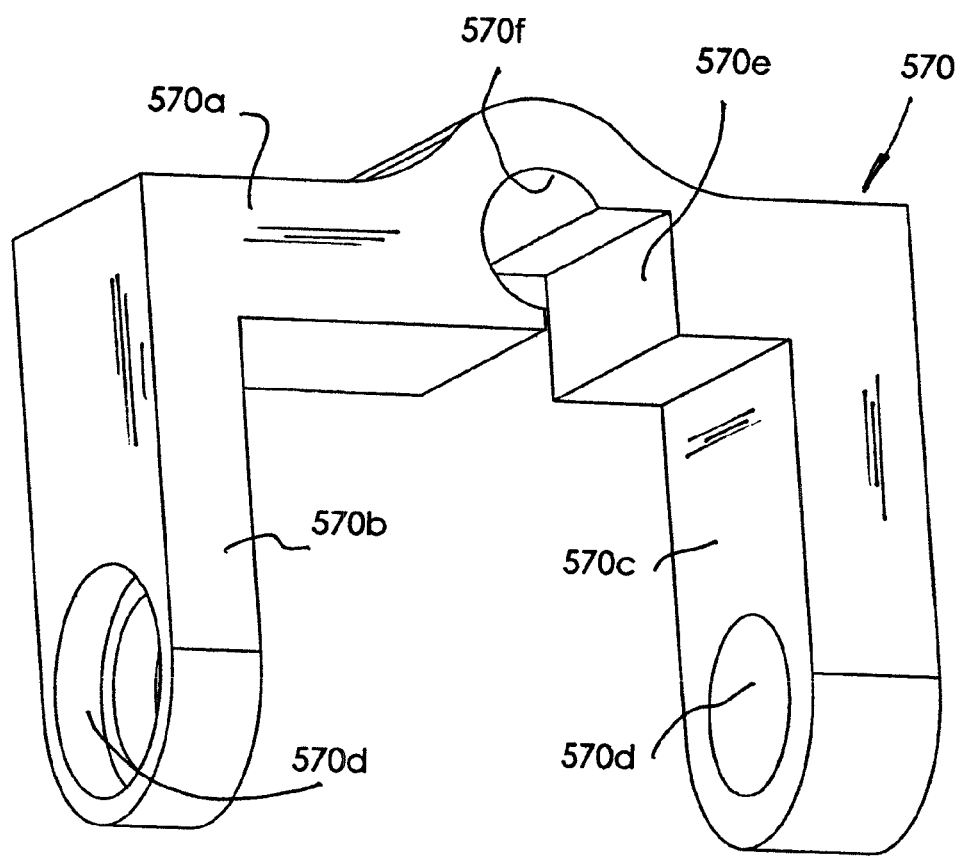
FIG. 66 is a perspective view of the knuckle of the carrier housing of the combination shift and brake lever arrangement of FIG. 52.
Figure 67:
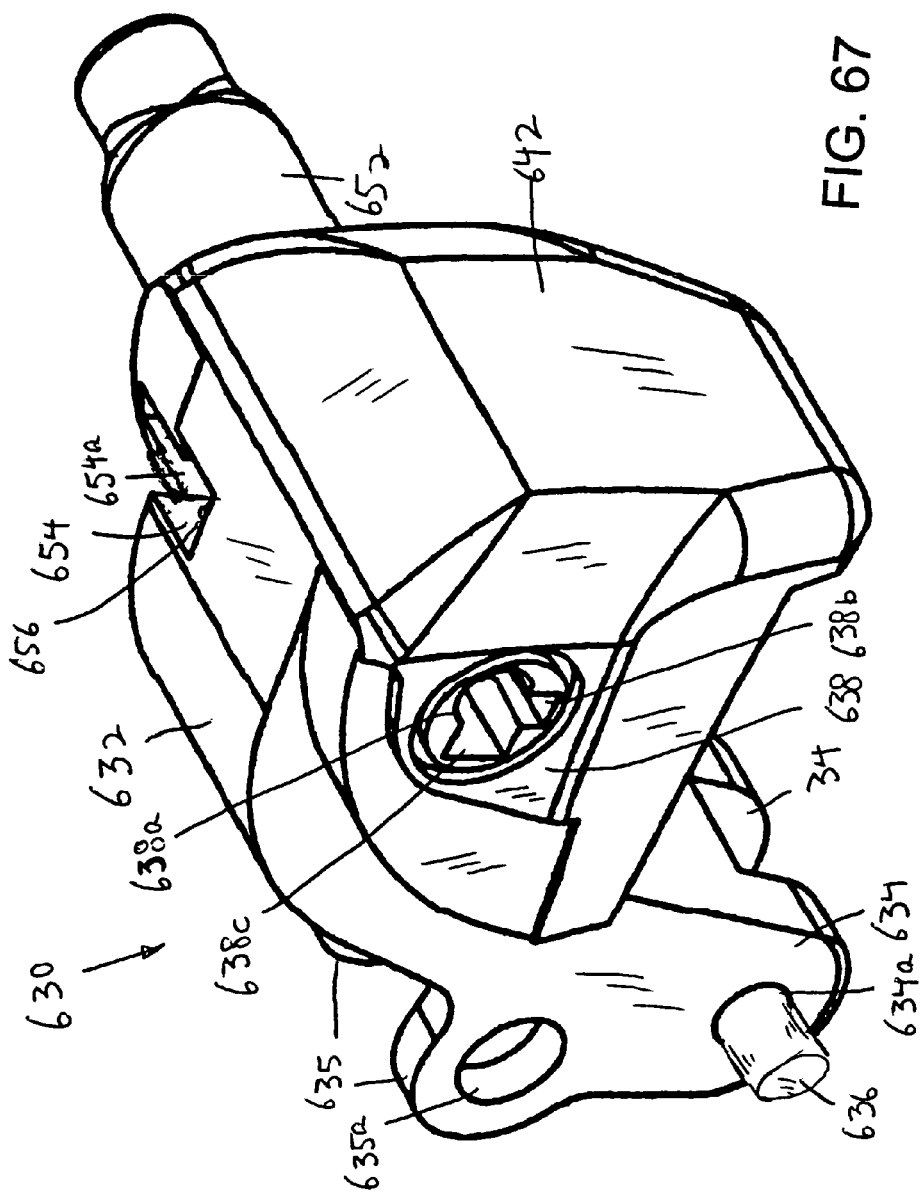
FIG. 67 is a perspective view of the carrier housing of the fourth embodiment from the top front, left side.
Figure 68:
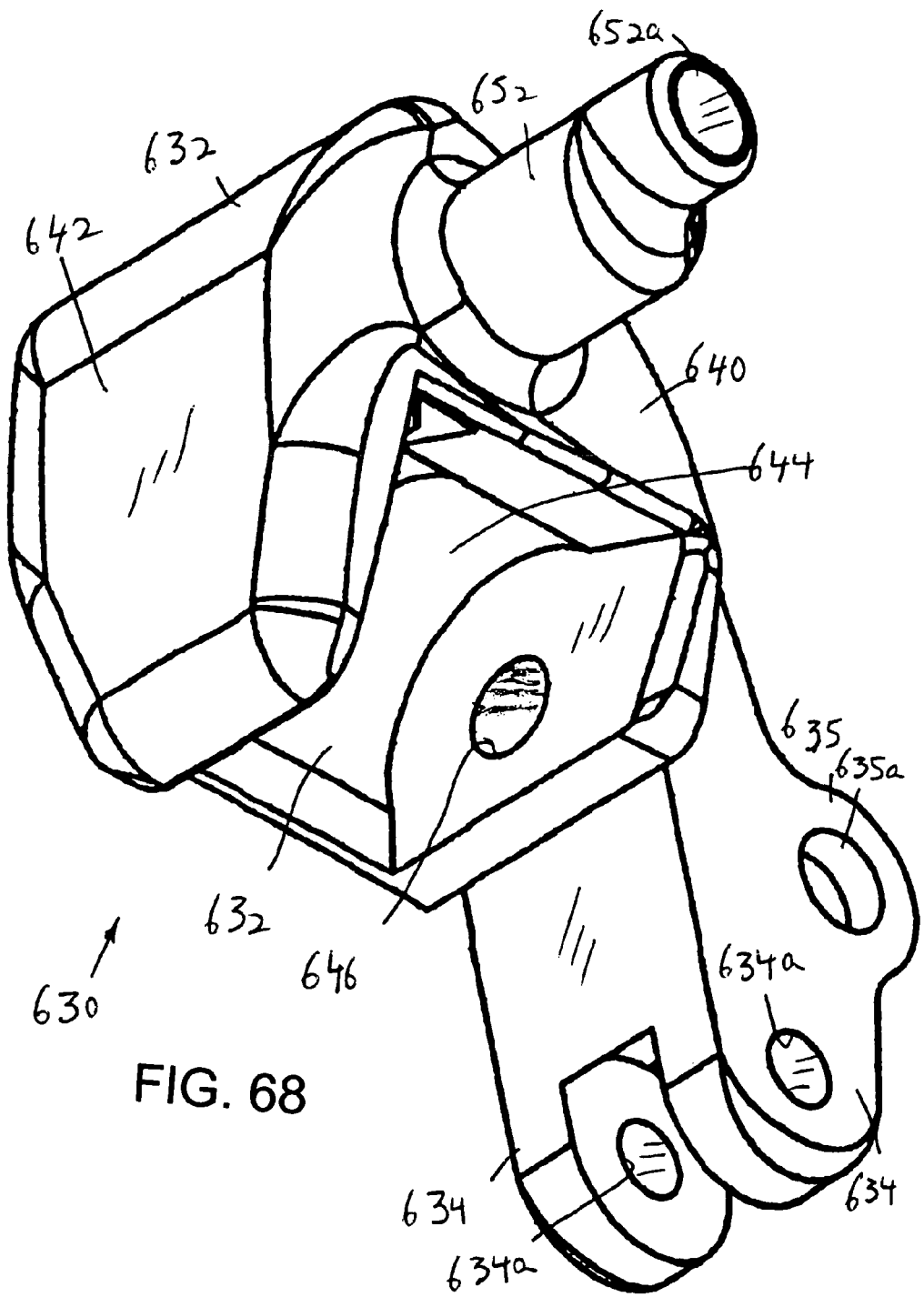
FIG. 68 is a perspective view of the carrier housing of FIG. 67 from the bottom front, right side.

As shown best in FIG. 66, a knuckle 570 is formed in a generally inverted U-shaped configuration with a generally rectangular cross-section. Knuckle 570 includes an upper hold down bar 570a having two downwardly extending legs 570b and 570c at opposite ends of hold down bar 570. The free ends of legs 570b and 570c each have an opening 570d in alignment with each other. Upper hold down bar 570a includes a rectangular cut-out area 570e in open communication with a circular cut-out area 570f. A pivot pin 550 (FIG. 59) extends through bore 64a of enlarged head 64 for pivotally supporting shift/brake lever 60 in left and right, that is, side to side, directions of carrier housing 530 for a shifting operation. Pivot pin 550 also extends through openings 570d, and in this position, gear teeth 98 of cable carrier rack 92 are partially covered and slidably held down by rectangular cut-out area 570e and cylindrical block 94 of cable carrier rack 92 is slidably held in circular cut-out area 570f.

In the present embodiment, an effective combination of carrier housing 50 and brake housing 110 are fixed to each other to form a carrier housing 430 that is pivotally connected to front section 18 of main housing 12.

As shown best in FIGS. 60-65, carrier housing 430 includes a combined arcuate back/top wall 432 that corresponds generally in dimensions and shape to combined arcuate back/top wall 18d. The lower end of combined arcuate back/top wall 432 terminates in two parallel spaced apart lower walls 434 that fit within side walls 18b and 18c and which are each provided with an aligned opening 434a. Openings 434a are in alignment with openings 18e, and a pivot pin 436 (FIG. 63) is mounted therethrough to pivotally connect carrier housing 430 to main housing 12.

Two parallel, spaced apart circular tab walls 435 extend out from arcuate back/top wall 432 at a position immediately above lower walls 434 and are in parallel planar relation to lower walls 434. Each tab wall 435 includes an opening 435a, with openings 435a of both tab walls 435 being in alignment with each other. A yoke (not shown) is connected between openings 435a in a known manner, and a brake cable (not shown) is tied at one end to the yoke, extends through bore 26 and is connected to either the rear or front brake assembly, in a known manner.

Carrier housing 430 further includes two substantially planar side walls 438 and 440 of a substantially quarter circular shape and which are connected to the side edges of combined arcuate back/top wall 432 and extend to the front edge of combined arcuate back/top wall 432, and a front wall 442 that connects the front edge of combined arcuate back/top wall 432 and front edges of side walls 438 and 440. As a result, a large open area 444 is defined between combined arcuate back/top wall 432, left and right side walls 438 and 440, and front wall 442 for housing the shift control mechanism comprised of actuating rack 82, carrier pull pawl 90, cable carrier rack 92 and cable carrier pawl 500.

An elongated vertical recess 446 is formed in combined arcuate back/top wall 432 at a position above spaced apart lower walls 434. An elongated vertical recess 448 is formed in front wall 442 in alignment with through recess 446, and legs 470b and 470c are slidably mounted therein to permit sliding movement and pivotal movement of shift/brake lever 60 relative to carrier housing 430. Coil springs 411 (FIG. 59) between carrier housing 430 and shift/brake lever 60 normally bias shift/brake lever 60 down relative to carrier housing 430.

Left side wall 438 includes an oval opening 438a and right side wall 440 in like manner includes an oval opening 440a in alignment with opening 438a to permit movement of shift control mechanism 480 in carrier housing 430.

Figure 64:
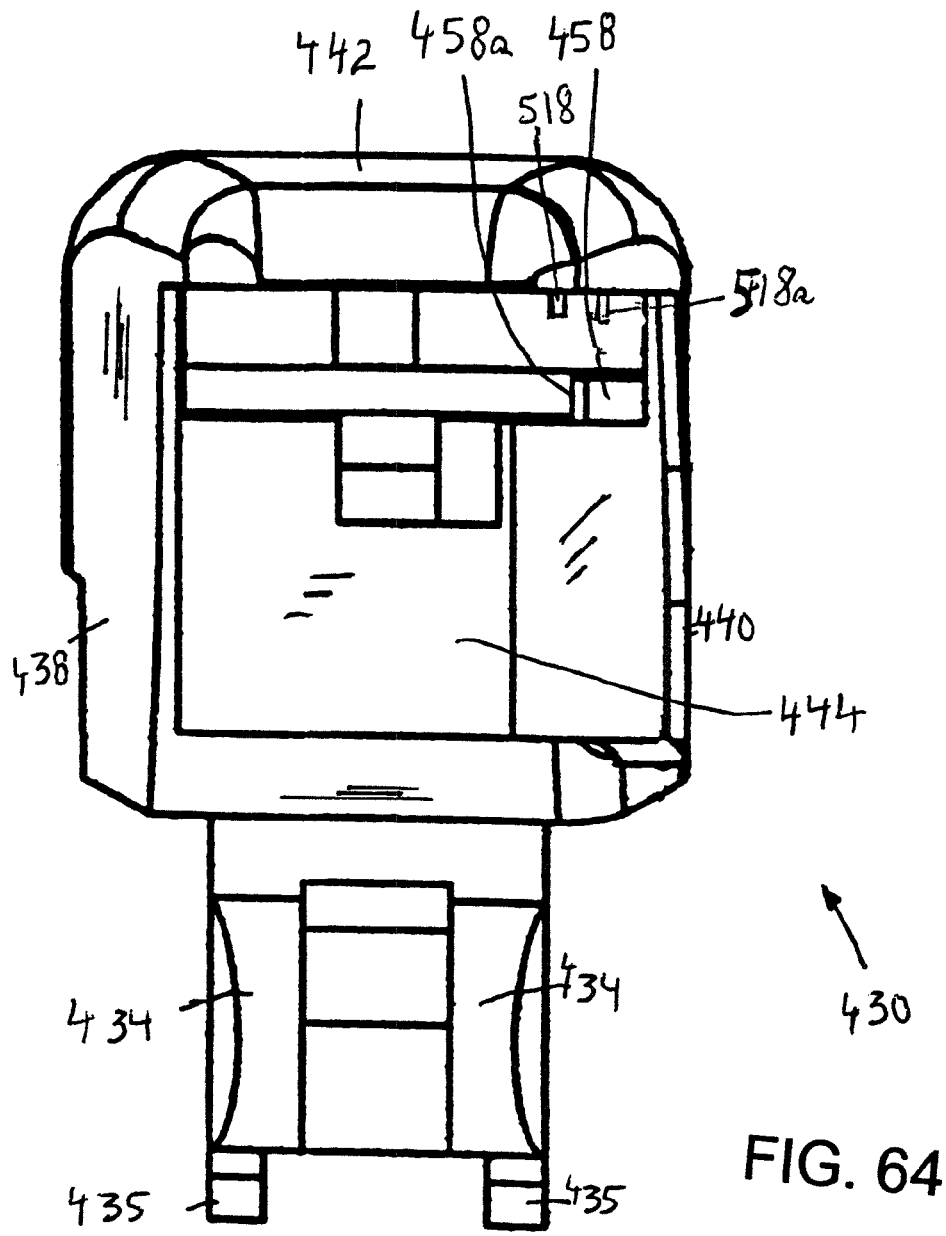
FIG. 64 is a bottom plan view of the carrier housing of the combination shift and brake lever arrangement of FIG. 52.

As shown in FIG. 64, carrier housing 430 also includes a hold down wall 458 extending from the inner surface of right side wall 440 adjacent oval opening 440a therein, with hold down wall 458 having an inclined or beveled surface 458a at the free end thereof, the purpose for which will become apparent from the discussion hereafter. Carrier housing 430 also includes a hold down pin 518a extending from the inner surface of front wall, the purpose for which will become apparent from the discussion hereafter.

The braking operation is the same as the first embodiment. Specifically, for a braking operation, when shift/brake lever 60 is grasped and pulled toward the person, carrier housing 430 is caused to pivot relative to main housing 12 around pivot pin 436. This results in a pulling of the brake cable connected to the yoke in carrier housing 430, and a resultant braking operation. The torsion spring connected between main housing 12 and carrier housing 430 normally brings shift/brake lever 60, along with carrier housing 430 back to a neutral position after a pivoting force which has been applied by the user thereto to perform a braking operation is removed.

Second, for a shifting operation in a first direction, when a person pivots combination shift/brake lever 60 about pivot pin 50, gear teeth 64d of enlarged head 64 of shift/brake lever 60 engage with gear teeth 86 of actuating rack 82 to move actuating rack 82 in transverse groove 64b of enlarged head 64. As a result, carrier pull pawl 90 is no longer restrained by hold down tab 58, so that spring 91 associated therewith rotates pawl lever 90a about post 88 to move pawl catch 90c upwardly to engage inclined gear teeth 96 of cable carrier rack 92. As actuating rack 82 continues moving, carrier pull pawl 90 pulls cable carrier rack 92 with it. At this time, because of the U-shaped inclination of lower gear teeth 95 of cable carrier rack 92, this movement of cable carrier rack 92 forces catch 500d of cable carrier pawl 500 out of engagement with its then engaged lower gear tooth 95 and into engagement with the next lower gear tooth 95.

When the biasing force on shift/brake lever 60 is released, torsion spring 61 associated therewith moves shift/brake lever 60 back to its neutral position. At this time, gear teeth 64d of enlarged head 64 of shift/brake lever 60 engage with gear teeth 86 of actuating rack 82 to move actuating rack 82 back to its original position in transverse groove 64b of enlarged head 64. Because of the inclination of gear teeth 96, pawl catch 90c of pawl 90 rides over teeth 96 in a ratchet like manner until shift/brake lever 60 returns to its neutral unbiased position where hold down wall 58 once again engages upwardly inclined surface 90d of pawl 90 to rotate pawl lever 90 in the opposite direction such that lower end surface 90b once again rests on floor 84c of rectangular cut-away section 84a. As a result, pawl catch 90c is moved down out of engagement with inclined gear teeth 96. However, at this time, cable carrier rack 92 has already moved the distance of one gear, where it is locked in position by catch 500d. As a result of this operation, cable carrier rack 92 has been moved by a distance of one tooth 95 which changes the tension on the shift cable, causing a change of one gear at the respective derailleur.

Third, to provide a reverse shifting operation, the person's thumb pushes up on concave underside 68a of rear finger extension 68. At this time, carrier pull pawl 90 is held down by hold down wall 458. Because of the sliding relation between shift/brake lever 60 and carrier housing 430 through legs 570b and 570c of knuckle 570 in elongated vertical recesses 446 and 448, shift/brake lever 60 slides up relative to carrier housing 430. At this time, a hold down extension 518 (FIG. 64) of carrier housing 430 which extends from the inner surface of front wall 442, engages the upper surface of cable carrier pawl 500 during its upward travel with respect to carrier housing 430, and thereby disengages catch 500d thereof from lower gear teeth 95. At the same time, however, hold down pin 518a of carrier housing 430 is moved into locking engagement with one upper gear tooth 98. Hold down pin 518a is offset by one-half of a gear tooth 98. As a result, during this engagement of an upper gear tooth 98 by hold down pin 518a, hold down pin 518a serves to move cable carrier rack 92 by one half gear tooth. When shift/brake lever 60 is released, a torsion spring (not shown) between shift/brake lever 60 and carrier housing 430 pushes shift/brake lever 60 back down relative to carrier housing 430. This means that hold down pin 518a disengages from upper gear teeth 98. However, at the same time, cable carrier pawl 500 is no longer held down by hold down extension 518.

The tension on the shift cable connected to cable carrier rack 92 results in cable carrier rack 92 being moved in the reverse direction. At this time, torsion spring 501 associated therewith biases catch 500d of cable carrier pawl 500 into engagement with the next lower gear tooth 95. Because of the one-half gear differential position between catch 500d and hold down pin 518a, catch 500d is one-half gear out of position. Therefore, when it engages with the next lower gear tooth 95, it moves cable carrier rack 92 another one-half gear step, and locks cable carrier rack 92 in position thereat. As a result of the two half gear movements of cable carrier rack 92, caused by hold down pin 518a and then by catch 500d, cable carrier rack 92 has been moved back by one gear.

Although the above embodiments have described constructions where shift/brake lever 60 moves up in a linear direction, it is also possible for only a portion of shift/brake lever 60 to move up in this linear manner instead of the entire shift/brake lever 60.

Referring now to FIGS. 67-94, a combination shift and brake lever arrangement 610 including a shift control mechanism 680 according to a fourth embodiment of the present invention will now be discussed, in which elements corresponding to combination shift and brake lever arrangement 410 of the third embodiment are identified by the same reference numerals, but augmented by 200.

Specifically, shift control mechanism 680 includes an actuating rack 82 and carrier pull pawl 90 which are identical with the corresponding elements of shift control mechanism 80 and are therefore numbered the same. Accordingly, a detailed discussion thereof will be omitted for the sake of brevity.

A carrier housing 630 is secured to front section 18 of main housing 12. As shown best in FIGS. 67-74, carrier housing 630 includes a combined arcuate back/top wall 632 that corresponds generally in dimensions and shape to combined arcuate back/top wall 18d. The lower end of combined arcuate back/top wall 632 terminates in two parallel spaced apart lower walls 634 that fit within side walls 18b and 18c and which are each provided with an aligned opening 634a. Openings 634a are in alignment with openings 18e, and a pivot pin 636 (FIG. 67) is mounted therethrough to pivotally connect carrier housing 630 to main housing 12.

Two parallel, spaced apart circular tab walls 635 extend out from arcuate back/top wall 632 at a position immediately above lower walls 634 and are in parallel planar relation to lower walls 634. Each tab wall 635 includes an opening 635a, with openings 635a of both tab walls 635 being in alignment with each other. A yoke (not shown) is connected between openings 635a in a known manner, and a brake cable (not shown) is tied at one end to the yoke, extends through bore 26 and is connected to either the rear or front brake assembly, in a known manner.

Carrier housing 630 further includes two substantially planar side walls 638 and 640 of a substantially quarter circular shape and which are connected to the side edges of combined arcuate back/top wall 632 and extend to the front edge of combined arcuate back/top wall 632, and a front wall 642 that connects the front edge of combined arcuate back/top wall 632 and front edges of side walls 638 and 640. As a result, a large open area 644 is defined between combined arcuate back/top wall 632, left and right side walls 638 and 640, and front wall 642 for housing the shift control mechanism to be described hereafter.

A through bore 646 is formed in combined arcuate back/top wall 632 at a position above spaced apart lower walls 634. A circular recess 648 is formed in front wall 642 in alignment with through bore 646, and a pivot pin 650 is connected therebetween for pivotally supporting the shift/brake lever in left and right directions for a shifting operation, as will be understood from the explanation hereafter.

Left side wall 638 includes a circular opening 638a, a lower rectangular guide 638b in open communication with circular opening 638a at around the seven o'clock position thereof, and a rear rectangular guide 638c in open communication with circular opening 638a at around the nine o'clock position thereof. Right side wall 640 in like manner includes a circular opening 640a in alignment with opening 638a, a lower rectangular guide 640b (FIG. 74) in open communication with circular opening 640a at around the five o'clock position thereof and in alignment with lower rectangular guide 638b, and a rear rectangular guide 640c (FIG. 74) in open communication with circular opening 640a at around the three o'clock position thereof and in alignment with rear rectangular guide 638c.

A tubular guide 652 extends outwardly from right side wall 640 and has an opening 652a in alignment with opening 640a in right side wall 640. An L-shaped cut-out area 654 is provided in the top of combined arcuate back/top wall 632 adjacent to tubular guide 652, and a small through bore 656 (FIGS. 67 and 72) is provided in one of the walls 654a (FIGS. 67 and 72) defining L-shaped cut-out area 654.

Figure 71:
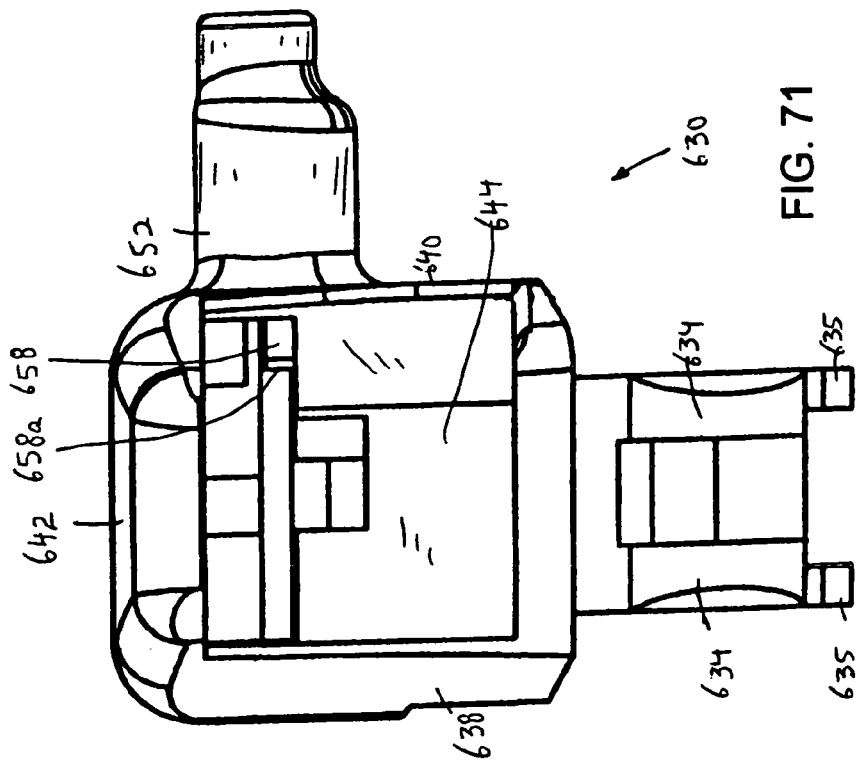
FIG. 71 is a bottom plan view of the carrier housing of FIG. 67.
Figure 70:
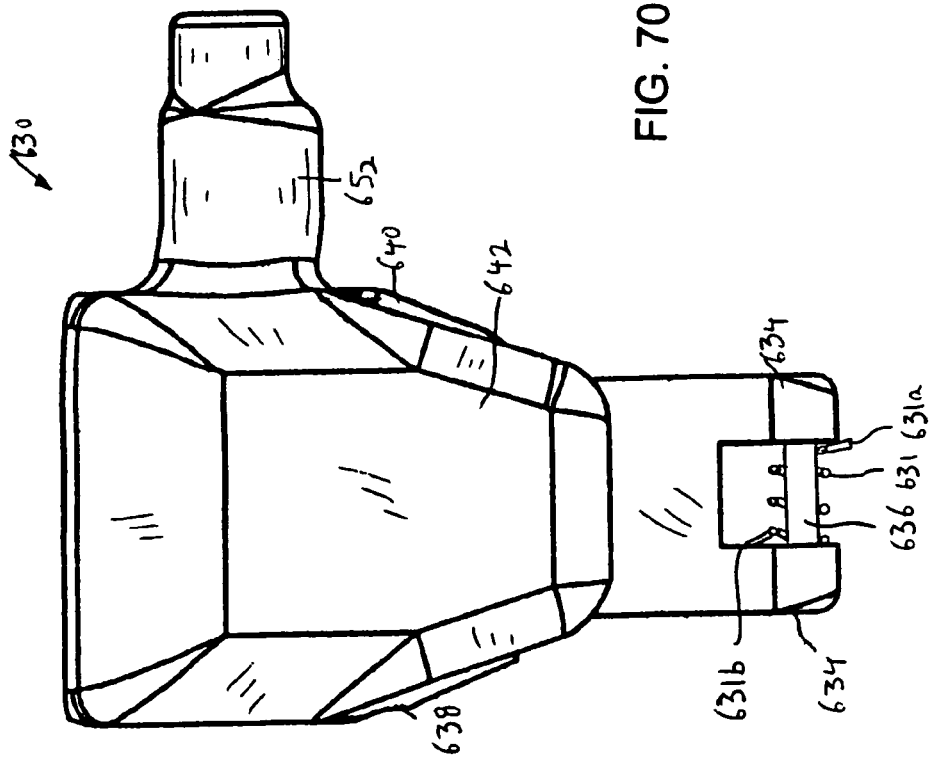
FIG. 70 is a front elevational view of the carrier housing of FIG. 67.
Figure 72:
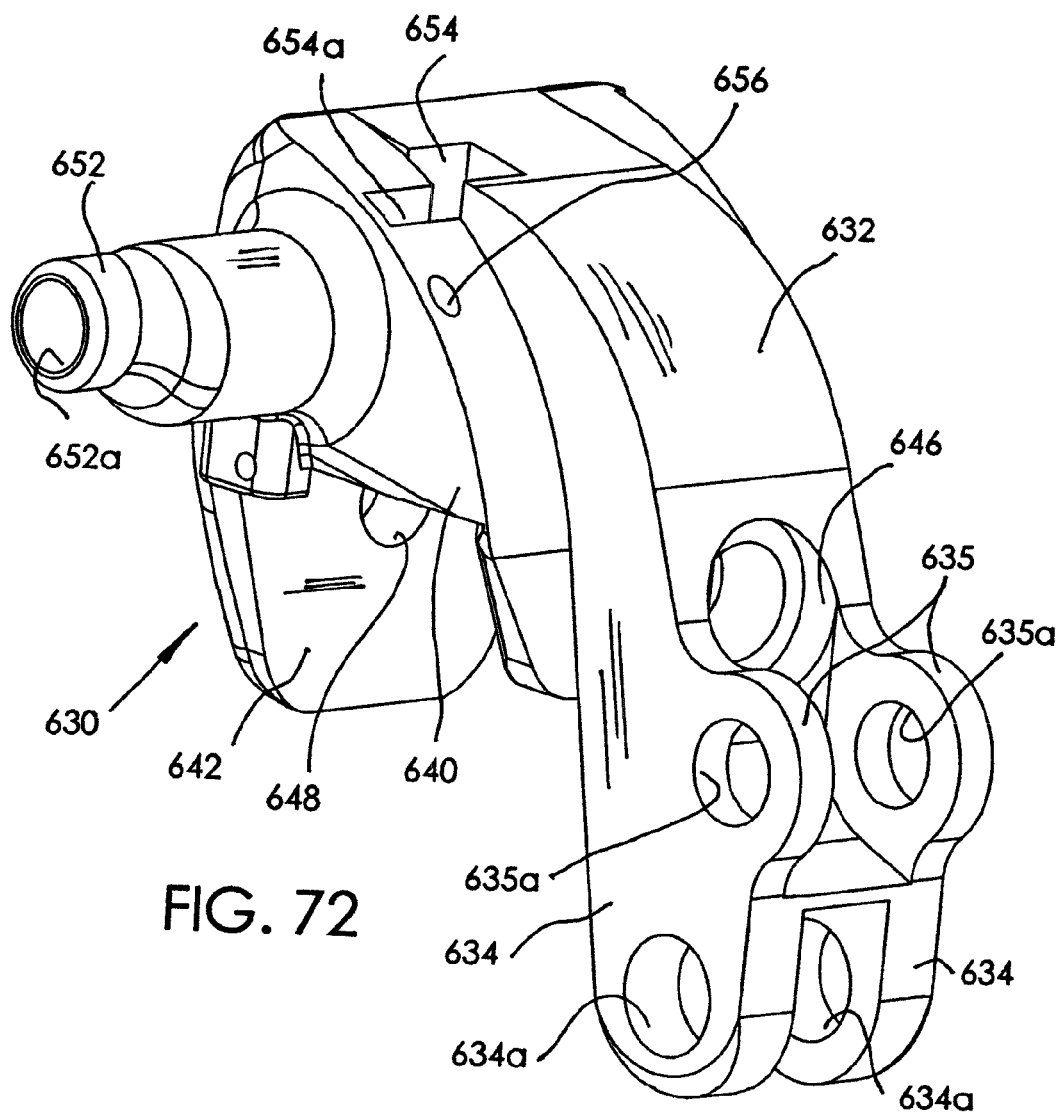
FIG. 72 is a perspective view of the carrier housing of FIG. 67 from the rear, right side.
Figure 73:
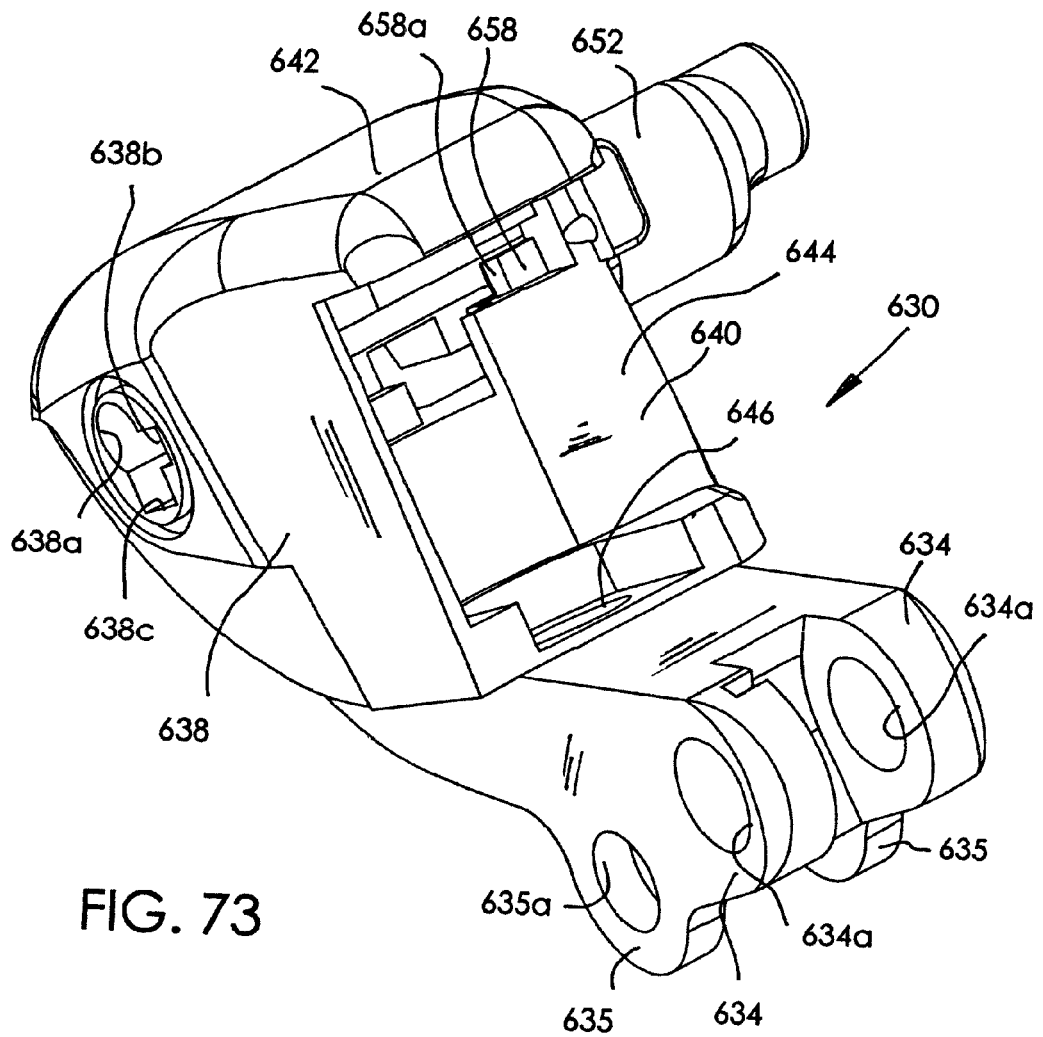
FIG. 73 is a bottom perspective view of the carrier housing of FIG. 67.
Figure 74:
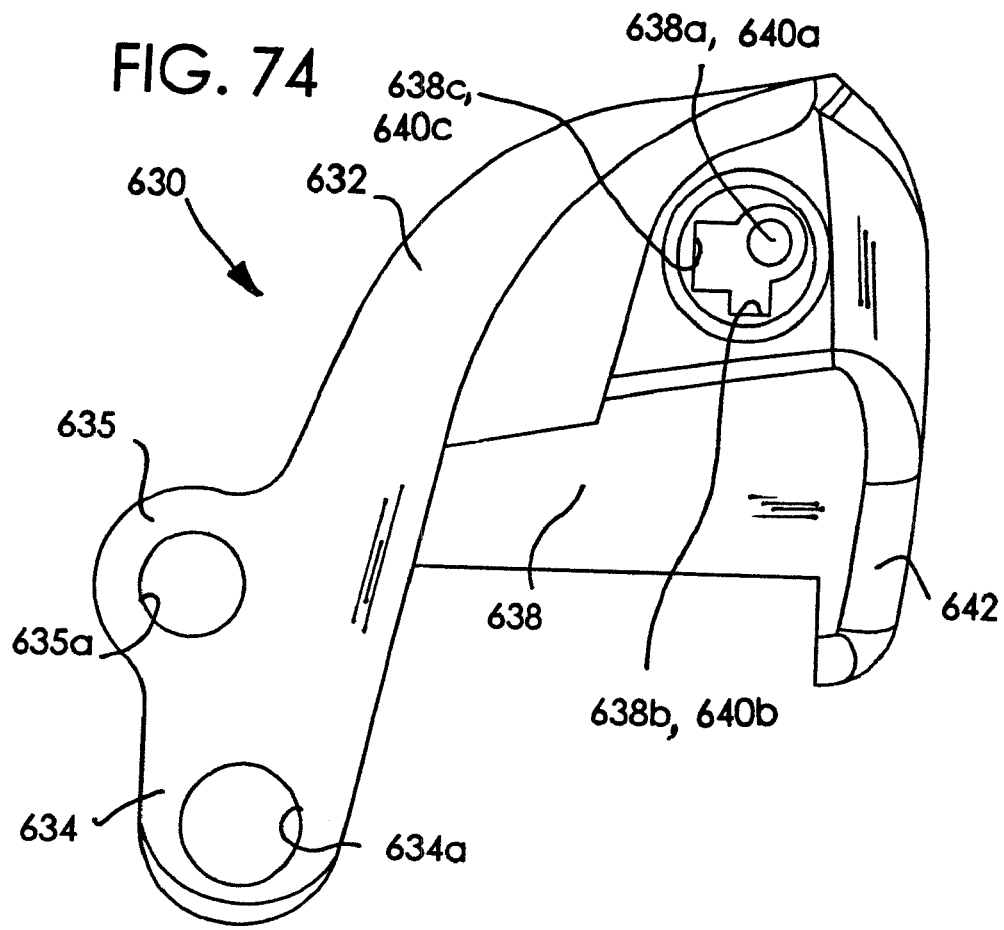
FIG. 74 is a left side elevational view of the carrier housing of FIG. 67.
Figure 75:
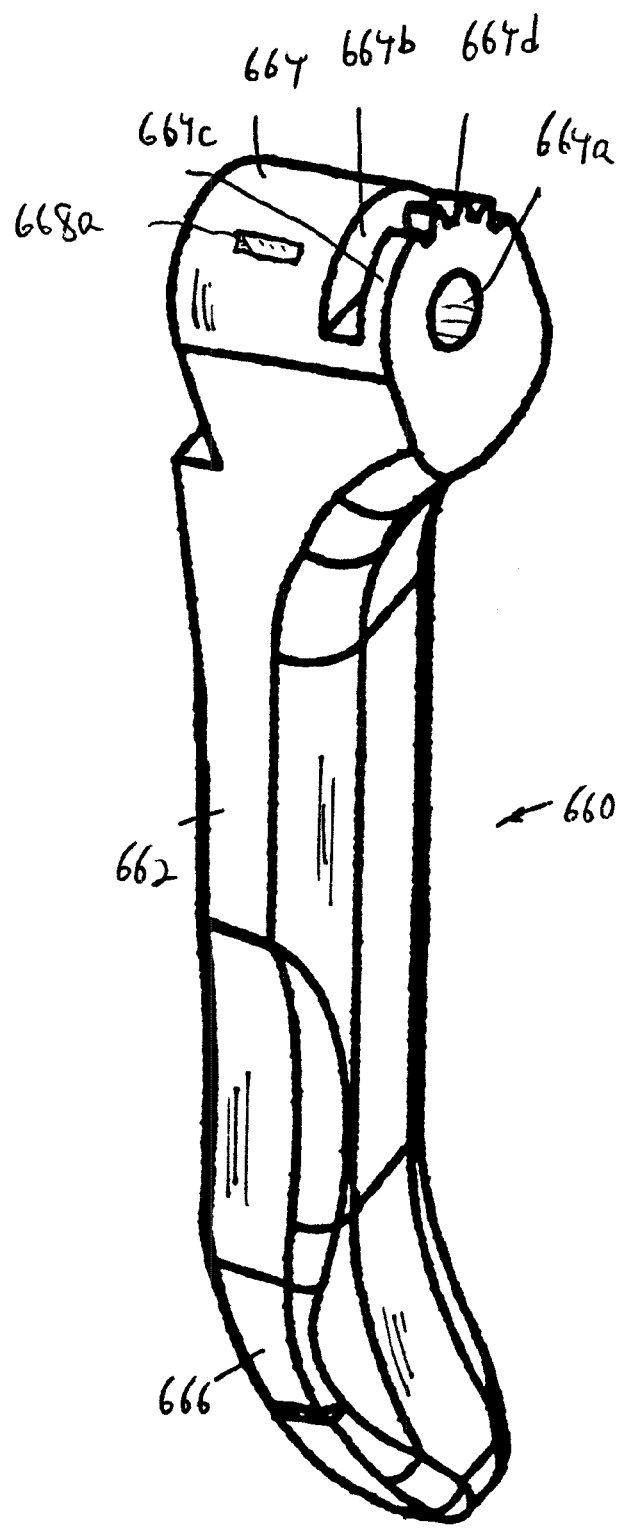
FIG. 75 is a perspective view of the combination shift/brake lever from the top and front of the fourth embodiment.
Figure 79:
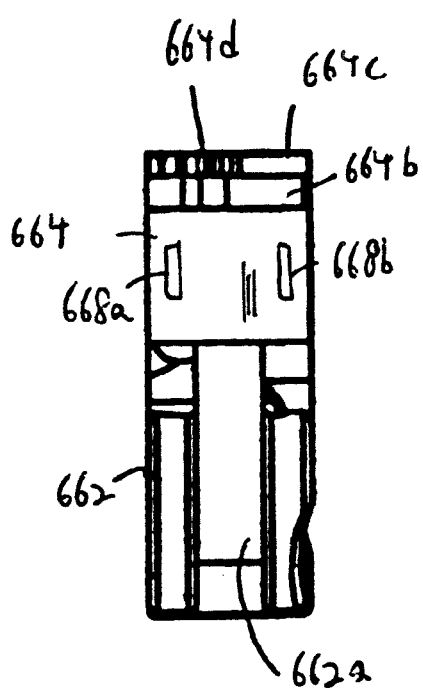
FIG. 79 is a top plan view of the combination shift/brake lever of FIG. 75.
Figure 76:
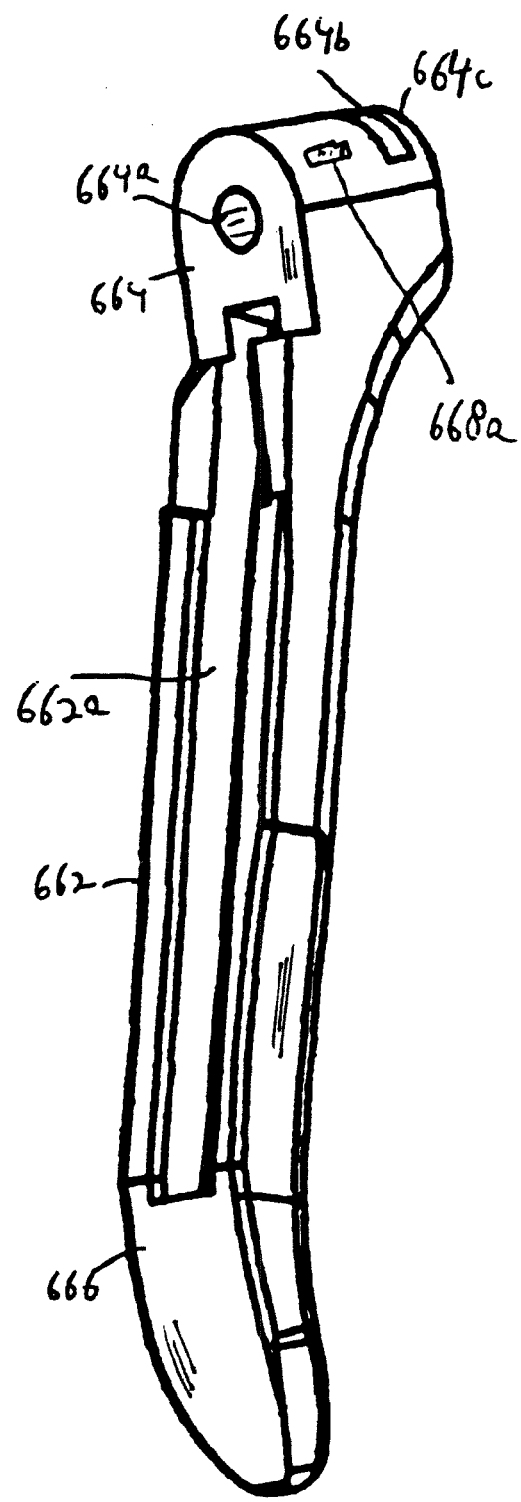
FIG. 76 is a perspective view of the combination shift/brake lever of FIG. 75 from the top and rear.
Figure 77:
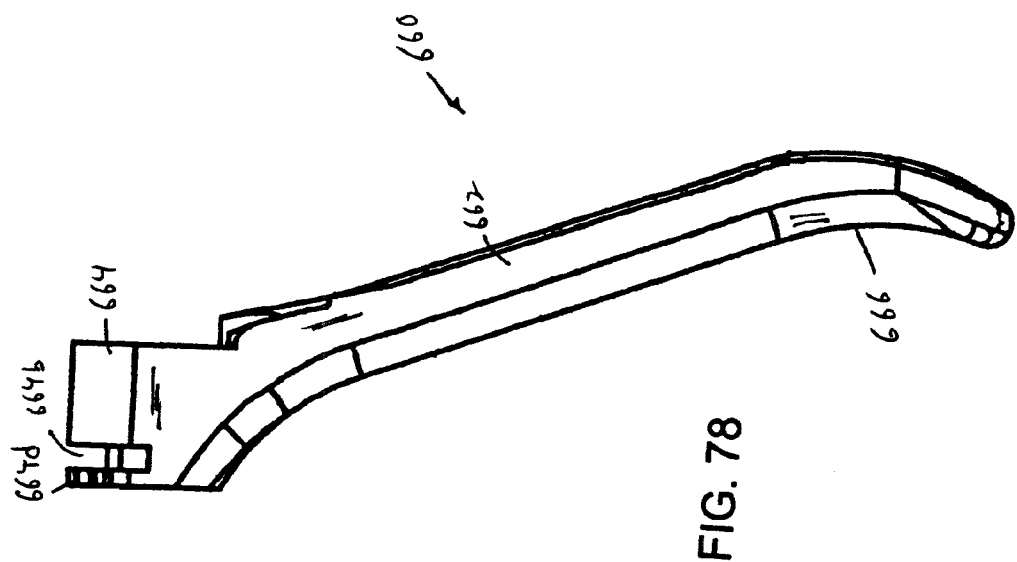
FIG. 77 is a right side elevational view of the combination shift/brake lever of FIG. 75.
Figure 78:
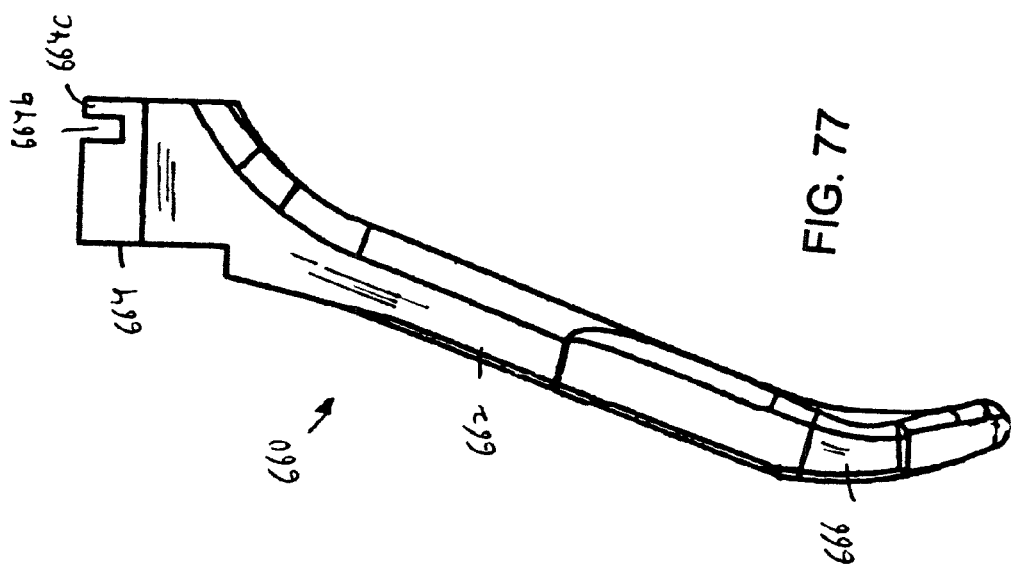
FIG. 78 is a left side elevational view of the combination shift/brake lever of FIG. 75.
Figure 81:
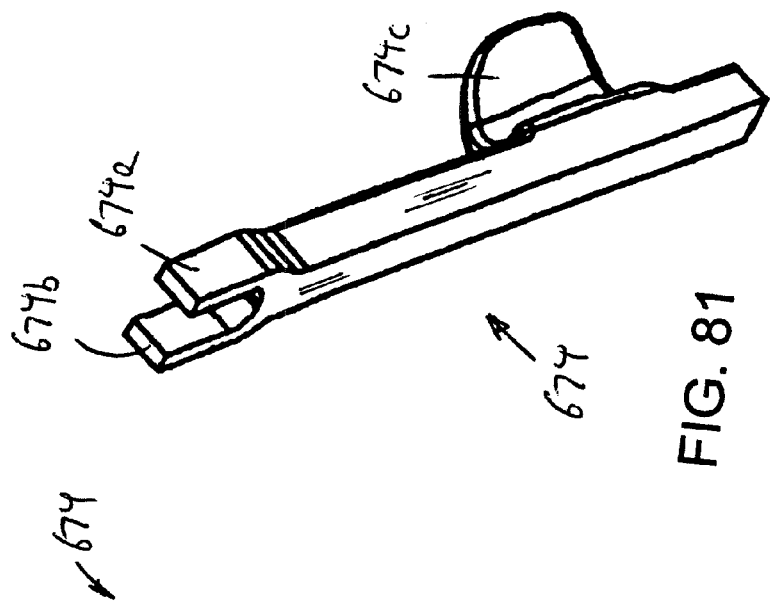
FIG. 81 is a left side perspective view of the actuating bar of the fourth embodiment.
Figure 82:
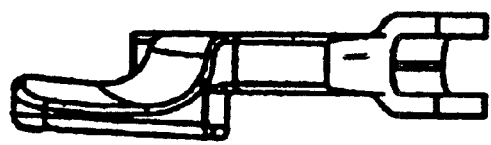
FIG. 82 is a top plan view of the actuating bar of the fourth embodiment.
Figure 80:
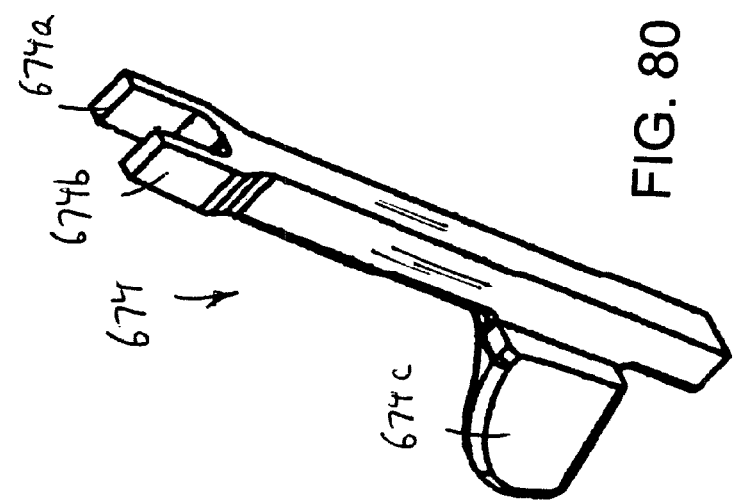
FIG. 80 is a right side perspective view of the actuating bar of the fourth embodiment.
Figures 83, 84, 85:
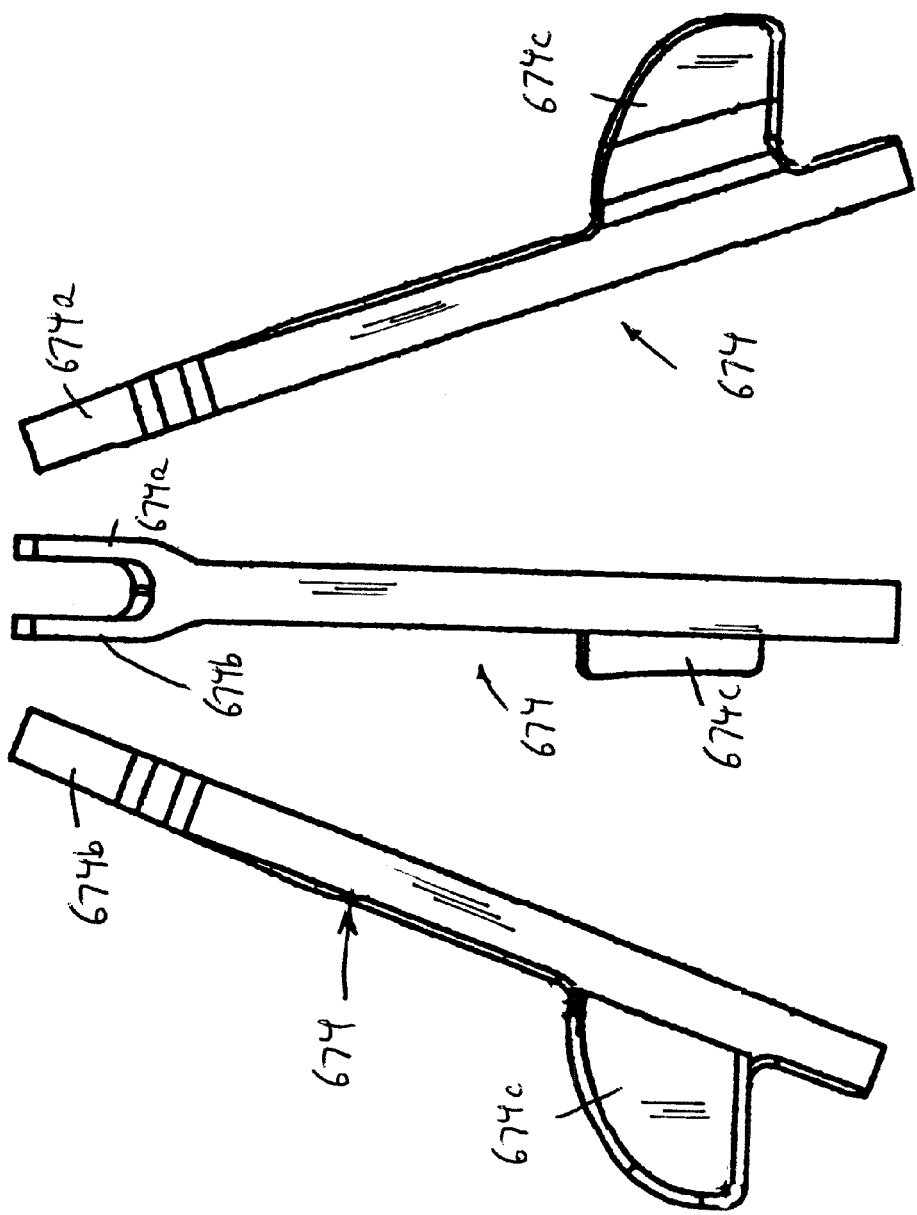
FIG. 83 is a right side elevational view of the actuating bar of the fourth embodiment.
FIG. 84 is a left side elevational view of the actuating bar of the fourth embodiment.
FIG. 85 is a bottom plan view of the actuating bar of the fourth embodiment.

As shown in FIGS. 71 and 73, carrier housing 630 also includes a hold down tab 658 extending from the inner surface of right side wall 640 adjacent the lower rectangular guide 640b therein, with hold down tab 658 having an inclined or beveled surface 658a at the free end thereof, the purpose for which will become apparent from the discussion hereafter.

Figure 94:
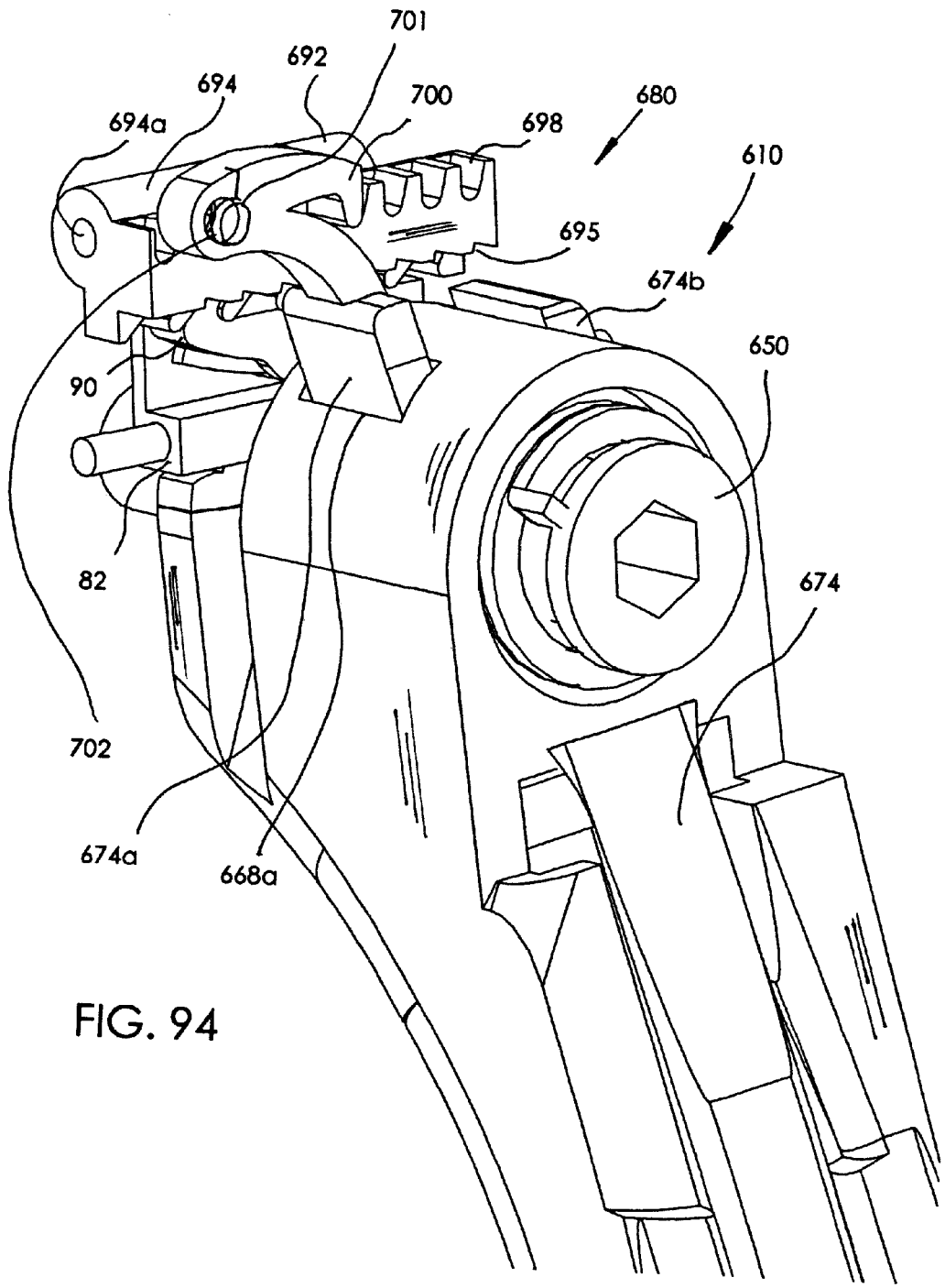
FIG. 94 is an enlarged perspective view of the shift mechanism of the combination shift and brake lever arrangement of FIG. 88.

As shown best in FIGS. 93 and 94, cable carrier rack 692 is formed in substantially the same manner as cable carrier rack 92, with the same cylindrical block 694 having a central through bore 694a, inclined gear teeth 696 extending downwardly from the lower side of cylindrical block 694 and U-shaped upper gear teeth 698. However, cable carrier rack 692 differs from cable carrier rack 92 by a second set of shallow lower gear teeth 695 provided directly below upper gear teeth 698 and which have an angle of inclination opposite to that of inclined gear teeth 696.

Further, combination shift/brake lever 660 is mounted to carrier housing 630. Specifically, as shown best in FIGS. 75-79, shift/brake lever 660 includes an elongated body 662 having a substantially cylindrical shaped enlarged head 664 at the upper end thereof and a substantially foot shaped lower end 666. Enlarged head 664 has a front to back through bore 664a through which pivot pin 650 extends for pivotally supporting shift/brake lever 660 in left and right, that is, side to side, directions of carrier housing 630 for a shifting operation. With this arrangement, when shift/brake lever 660 is grasped and pulled toward the person, carrier housing 630 is caused to pivot relative to main housing 12 around pivot pin 636. This results in a pulling of the brake cable connected to carrier housing 630, and a resultant braking operation. A torsion spring 631 (FIG. 70) has one end 631a connected to main housing 12 and an opposite end 631b connected to carrier housing 630 in a conventional manner to normally bring shift/brake lever 660 and carrier housing 630 back to a neutral position after a pivoting force applied by the user thereto to perform a braking operation is removed.

Enlarged head 664 has an arcuate transverse groove 664b at the upper surface thereof, at a position above through bore 664a so as not to interfere with the side to side pivoting action of shift/brake lever 660 around pivot pin 50. As a result, a front arcuate wall 664c is formed as one boundary of transverse groove 664b. A plurality of gear teeth 664d are formed on the upper surface of arcuate wall 664c, the purpose for which will be understood from the description hereafter.

Elongated body 662 has a recessed guide track 662a (FIG. 76) which extends for a substantial distance along the length thereof at its rear surface. Two spaced bores 668a and 668b extend vertically through enlarged head 664 and are open in spaced relation at the upper surface of enlarged head 664. Bores 668a and 668b are in open communication with recessed guide track 662a at their lower ends.

An actuating bar 674, shown best in FIGS. 80-84, slidably extends in guide track 662a and has a bifurcated end with two prongs 674a and 674b that extend through bores 668a and 668b, respectively. Actuating bar 674 also includes a thumb engagement projection 674c that a user can engage to bias actuating bar 674 upwardly in guide track 662a against the downward force of a linear coil spring 675.

With this arrangement, rectangular block 84 of actuating rack 82 is slidably held in lower rectangular guides 38b and 40b, and extends into transverse groove 664b of enlarged head 64 of shift/brake lever 660 for sliding movement therein. Gear teeth 686 engage with gear teeth 664d of enlarged head 664 of shift/brake lever 660. A carrier pull pawl 90 shown best in FIG. 29 is rotatably mounted on post 88 of actuating rack 82. Carrier pull pawl 90 is rotatably mounted on post 88 of actuating rack 82. Cable carrier rack 692 is slidably held in rear rectangular guides 638c and 640c.

Figure 86:
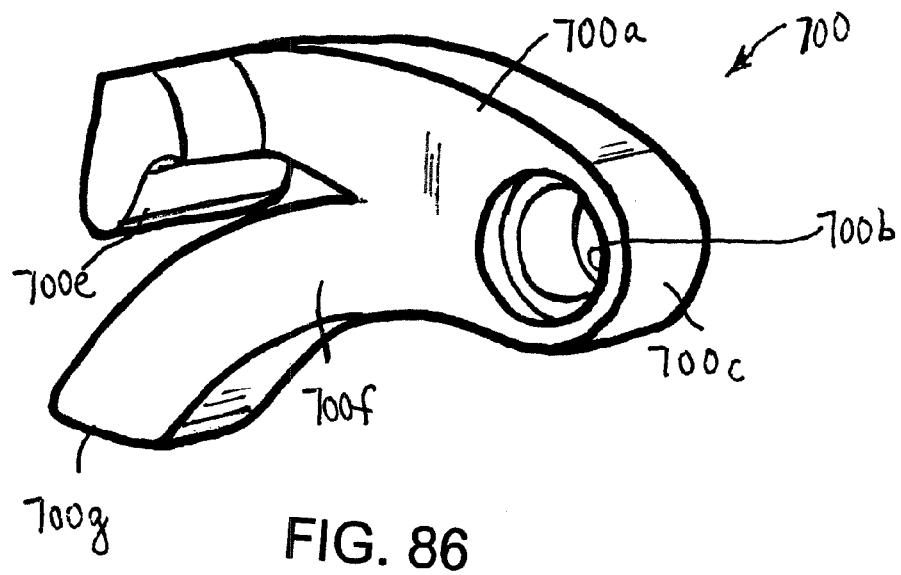
FIG. 86 is a perspective view of the cable carrier pawl viewed from the left side of the fourth embodiment.
Figure 87:
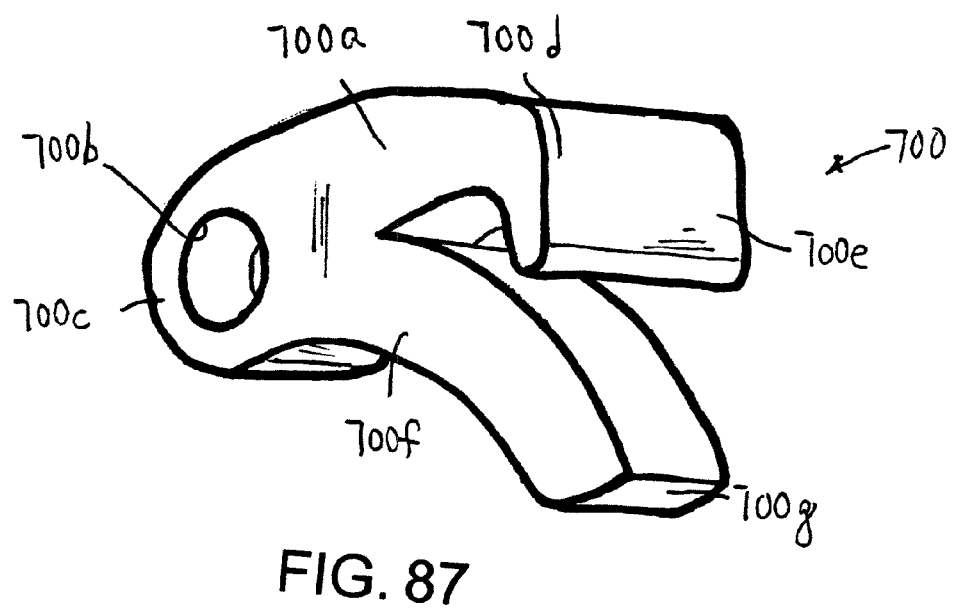
FIG. 87 is a perspective view of the cable carrier pawl viewed from the right side of the fourth embodiment.
Figure 89:
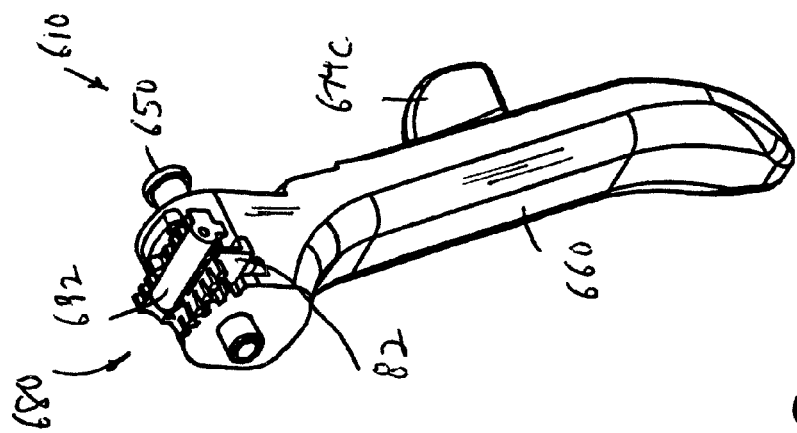
FIG. 89 is a perspective view of the combination shift and brake lever arrangement of FIG. 88, viewed from the top and left side thereof.
Figure 90:
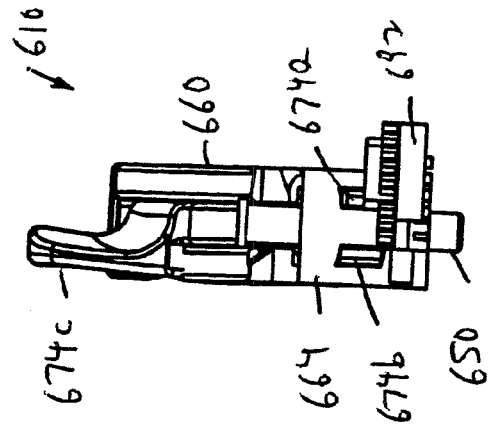
FIG. 90 is a top plan view of the combination shift and brake lever arrangement of FIG. 88.
Figure 88:
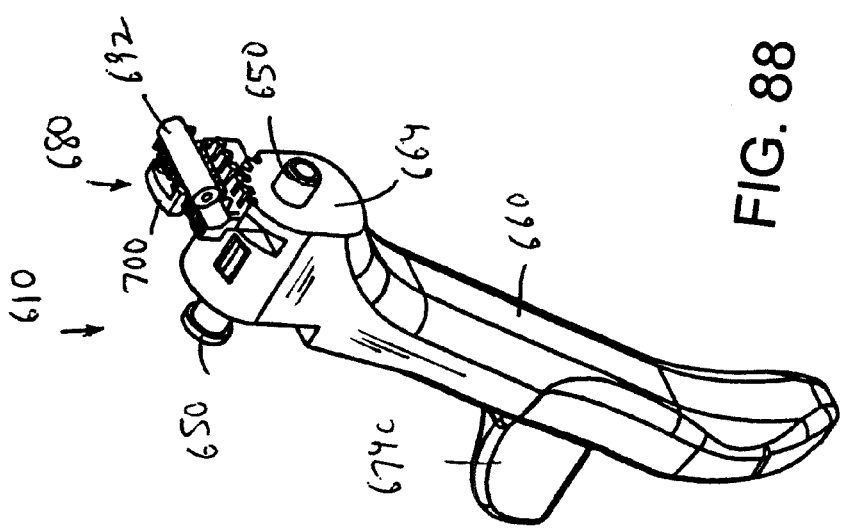
FIG. 88 is a perspective view of the combination shift and brake lever arrangement for a bicycle according to the fourth embodiment of the present invention, viewed from the top and right side thereof, detached from the main housing and with the carrier housing removed.

In addition, a cable carrier pawl 700, shown best in FIGS. 86 and 87, is provided for engaging upper gear teeth 98. Specifically, cable carrier pawl 700 includes a curved upper lever 700a having an opening 700b at one end 700c thereof which is fixedly mounted on a post 702 (FIG. 94). Alternatively, post 702 can be made an integral part of cable carrier pawl 700. A downwardly extending catch 700d is formed at the upper end of curved upper lever 700a and extends down therefrom at an angle of about 135 degrees. Catch 700d has a width about twice that of upper lever 700a so as to provide a laterally directed catch extension 700e extending outwardly therefrom. Cable carrier pawl 700 further includes a lower curved lever 700f which extends in the same direction as upper lever 700a from end 700c, but is positioned below upper lever 700a. Lower curved lever 700f has a free engagement end 700g.

Post 702 is rotatably mounted in small bore 656, and cable carrier pawl 700, and particularly upper lever 700a, catch 700d and catch extension 700e, are thereby mounted for movement in L-shaped cut-out area 654, such that catch extension 700e is positioned above upper gear teeth 698 of cable carrier rack 692 for engagement therewith. A torsion spring 701 (FIG. 94) is also mounted between carrier housing 630 and cable carrier pawl 700 for normally biasing catch extension 700e in a downward direction into engagement with upper gear teeth 698.

Further, in this arrangement, the upper surface of prong 674a is positioned directly beneath free engagement end 700g of lower curved lever 700f of cable carrier pawl 700. When actuating bar 674 is pushed up, the upper end of prong 674a pushes up free engagement end 700g, thereby rotating cable carrier pawl 700 in an upward direction opposite to the force of torsion spring 701. As a result, catch extension 700e disengages from upper gear teeth 698 to permit cable carrier rack 692 to be moved in its lengthwise direction.

The operation of combination shift and brake lever arrangement 610 will now be discussed in relation to FIGS. 33-43.

First, for a braking operation, when shift/brake lever 660 is grasped and pulled toward the person, carrier housing 630 is caused to pivot relative to main housing 12 around pivot pin 636. This results in a pulling of the brake cable connected to the yoke in carrier housing 630, and a resultant braking operation. Torsion spring 631 connected between main housing 12 and carrier housing 630 normally brings shift/brake lever 660 and carrier housing 630 back to a neutral position after a pivoting force which has been applied by the user thereto to perform a braking operation is removed.

Second, for a shifting operation, when a person pivots combination shift/brake lever 660 about pivot pin 650, gear teeth 664d of enlarged head 664 of shift/brake lever 660 engage with gear teeth 686 of actuating rack 682 to move actuating rack 682 in transverse groove 664b of enlarged head 664. As a result, carrier pull pawl 90 is no longer restrained by hold down tab 658, so that a torsion spring (not shown) associated therewith rotates pawl lever 90a about post 88 to move pawl catch 90c upwardly to engage inclined gear teeth 696 of cable carrier rack 692. As actuating rack 82 continues moving, carrier pull pawl 90 pulls cable carrier rack 692 with it. At this time, because of the U-shaped inclination of upper gear teeth 698 of cable carrier rack 692, this movement of cable carrier rack 692 forces catch extension 700e of cable carrier pawl 700 out of engagement with its then engaged upper gear tooth 698 and into engagement with the next upper gear tooth 698.

When the biasing force on shift/brake lever 660 is released, torsion spring 661 associated therewith moves shift/brake lever 660 back to its neutral position. At this time, gear teeth 664d of enlarged head 664 of shift/brake lever 660 engage with gear teeth 86 of actuating rack 82 to move actuating rack 82 back to its original position in transverse groove 664b of enlarged head 664. Because of the inclination of gear teeth 696, pawl catch 90c of pawl 90 rides over teeth 696 in a ratchet like manner until shift/brake lever 660 returns to its neutral unbiased position where inclined surface 658a of hold down tab 658 once again engages upwardly inclined surface 90d of pawl 90 to rotate pawl lever 90 in the opposite direction such that lower end surface 90b once again rests on floor 84c of rectangular cut-away section 84a. As a result, pawl catch 90c is moved down out of engagement with inclined gear teeth 96. However, at this time, cable carrier rack 692 has already moved the distance of one gear, where it is locked in position by catch extension 700e. As a result of this operation, cable carrier rack 692 has been moved by a distance of one tooth 698 which changes the tension on the shift cable, causing a change of one gear at the respective derailleur.

Third, to provide a reverse shifting operation, thumb engagement projection 674c of actuating bar 674 is pushed up, thereby moving actuating bar 674 up in the vertical direction in recessed guide track 662a. As a result, the upper end of prong 674a engages free engagement end 700g of cable carrier pawl 700 so as to pivot cable carrier pawl 700 about the axis of post 702 on which it is mounted. This results in catch extension 700e disengaging from upper gear teeth 698 of cable carrier rack 692.

The tension on the shift cable connected to cable carrier rack 692 results in cable carrier rack 692 being moved in the reverse direction. However, the upper end of prong 674a also engages lower gear teeth 695 just after cable carrier rack 692 has moved back one gear in order to hold cable carrier rack 692 in this position. This engagement occurs just at the time that cable carrier rack 692 moves back one tooth. Since shift/brake lever 660 is not pivoted about pivot pin 650, carrier pull pawl 90 is still held by hold down tab 658.

Then, when thumb engagement projection 674c is released, actuating bar 674 is forced down by a linear coil spring (not shown) and no longer engages free engagement end 700g of cable carrier pawl 700 and no longer engages lower gear teeth 695. This results in catch extension 700e being pivoted down into engagement with a new upper tooth 698 of cable carrier rack 692 which results in a changing of the derailleur gear to a different gear. Thus, as lower gear teeth 695 are released by the upper end of prong 674a, upper gear teeth 698 are again engaged by catch extension 700e. Since cable carrier rack 692 has already moved the reverse distance of one gear, it is locked in position by catch extension 700e. As a result of this operation, cable carrier rack 692 has been moved by a distance of one tooth 698 which changes the tension on the shift cable, causing a reverse change of one gear at the respective derailleur.

It will be appreciated that the above construction of the fourth embodiment can be modified by providing a separate linearly movable lever adjacent to shift/brake lever 660 for providing the function of actuating bar 674.

It will also be appreciated that reference to a linear direction in the fourth embodiment can be a purely linear movement or a slightly curved track in which there is linear displacement along the curved track. In other words, the movement need not be strictly along a curved line, and reference to a first linear direction or linear displacement is intended to encompass such movement.

Although the present invention has been discussed above in regard to a mechanical shift lever, it could also be used with shift levers that are actuated by hydraulic, pneumatic or electric operation. In such case, the single lever would actuate a pneumatic valve, a hydraulic piston, or electrical switch, etc., and in such case, the pawl elements and rack elements would be eliminated. For example, the switch could send an electric signal to the gear changing device mounted on or near the drive train of the bicycle. The pneumatic valve would apply air pressure through a line to the drive train. The hydraulic piston would apply pressure to a hydraulic line that would actuate the drive train.

Having described specific preferred embodiments of the invention with reference to the accompanying drawings, it will be appreciated that the present invention is not limited to those precise embodiments and that various changes and modifications can be effected therein by one of ordinary skill in the art without departing from the scope or spirit of the invention as defined by the appended claims.

What is claimed is:

1. A combination shift and brake lever arrangement for a bicycle, comprising:
   a hand-actuated single lever extending in a first longitudinal direction,
   a braking arrangement for mounting the single lever for movement in a first pivoting direction to perform a braking operation,
   a first shifting arrangement for mounting the single lever for movement in a second pivoting direction different from the first pivoting direction, said first shifting arrangement including at least one housing and a pivot arrangement for pivotally mounting said single lever to said at least one housing for pivotal movement in said second pivoting direction,
   a shift control mechanism for controlling shifting of gears of the bicycle in a first shifting direction upon movement of the single lever in the second pivoting direction,
   a second shifting arrangement for mounting at least a portion of a reverse shifting lever for linear movement in said first longitudinal direction, said at least a portion of the reverse shifting lever includes said single lever,
   a reverse control including an engagement arrangement for changing over the shift control mechanism to control shifting of the gears of the bicycle in a second opposite shifting direction solely upon linearly displaceable movement of said single lever in the first longitudinal direction, without pivoting of the single lever,
   a first housing for mounting said combination shift and brake lever arrangement to a handlebar of a bicycle, and
   wherein said first shifting arrangement includes:
      a brake housing pivotally mounted to said first housing for pivotal movement in said first pivoting direction, and
      a carrier housing mounted to said brake housing in a linearly displaceable manner and housing said shift control mechanism, and said first lever being pivotally mounted to said carrier housing for pivotal movement in said second pivoting direction,
   wherein said second shifting arrangement includes an engagement arrangement for engagement with said reverse control to change over the shift control mechanism to control shifting of the gears of the bicycle in the second shifting direction upon linearly displaceable movement of said single lever and said carrier housing relative to said brake housing,
   wherein said reverse control includes an extension on said brake housing which engages with the shift control mechanism to control shifting of the gears of the bicycle in a second opposite shifting direction upon linear displacement of said single lever and said carrier housing relative to said brake housing,
   wherein:
   said shift control mechanism includes:
      a first actuator coupled with said single lever for moving in response to pivotal movement of said single lever in said second pivoting direction,
      a second actuator coupled with a shift cable of a bicycle for changing a gear of a derailleur of a bicycle,
      an engagement arrangement associated with said first and second actuators for shifting said second actuator in response to movement of said first actuator, and
   said extension of said reverse control upon linear displacement of said single lever and said carrier housing relative to said brake housing, engages with one of:
   said second actuator, and
   said engagement arrangement:
   said single lever includes a first set of teeth,
   said first actuator includes an actuating rack having a second set of teeth for meshing with said first set of teeth such that pivotal movement of said single lever results in translation movement of said actuating rack,
   said second actuator includes a cable carrier rack having a third set of teeth, and
   said engagement arrangement includes a first pawl mounted to said actuator rack for engaging with said third set of teeth to move said cable carrier rack with said actuator rack upon pivotal movement of said single lever.

2. A combination shift and brake lever arrangement according to claim 1, wherein said first pivoting direction is a front to back direction, and said second pivoting direction is a side to side direction.

3. A combination shift and brake lever arrangement according to claim 1, wherein said third set of teeth are inclined in a first direction of movement of said cable carrier rack.

4. A combination shift and brake lever arrangement according to claim 1, wherein:
   said cable carrier rack includes a fourth set of teeth,
   said engagement arrangement includes a second pawl mounted to said carrier housing for engaging with said fourth set of teeth to releasably lock said cable carrier rack in a desired position after said cable carrier rack has been moved with said actuator rack upon pivotal movement of said single lever, and said cable carrier rack includes a fifth set of teeth which are engaged by said extension of said reverse control upon linear displacement of said single lever and said carrier housing relative to said brake housing.

5. A combination shift and brake lever arrangement according to claim 1, wherein said shift control mechanism includes:

a grate having a plurality of openings therein mounted in said carrier housing, and said engagement arrangement includes a second pawl mounted to said cable carrier rack for engagement with said openings in said grate to releasably lock said cable carrier rack in a desired position after said cable carrier rack has been moved with said actuator rack upon pivotal movement of said single lever.

6. A combination shift and brake lever arrangement according to claim 5, wherein said reverse control includes an arrangement for disengaging said second pawl from said openings in said grate and for engaging said second pawl after said cable carrier rack has been moved upon linear displacement of said single lever and said carrier housing relative to said brake housing.

7. A combination shift and brake lever arrangement according to claim 6, wherein said arrangement for disengaging includes a grate release movable with said carrier housing between a first position out of engagement with said grate and a second position in engagement with said openings in said grate so as to move said second pawl from said openings in said grate after said cable carrier rack has been moved with said actuator rack upon linear displacement of said single lever and said carrier housing relative to said brake housing and for engaging said second pawl after said second pawl has been removed from said openings, and wherein at such time, said extension on said brake housing engages with said grate to prevent movement thereof.

* * * * *